(12) United States Patent
Kreienkamp et al.

(10) Patent No.: US 11,251,913 B2
(45) Date of Patent: Feb. 15, 2022

(54) METHODS AND APPARATUSES FOR CONTROLLING A BANDWIDTH USED FOR PROCESSING A BASEBAND TRANSMIT SIGNAL, RECEIVER FOR A WIRELESS COMMUNICATION SYSTEM, AND METHOD FOR A RECEIVER

(71) Applicant: Intel IP Corporation, Santa Clara, CA (US)

(72) Inventors: Rainer Dirk Kreienkamp, Duesseldorf (DE); Stefan Kaehlert, Moenchengladbach (DE); Giuseppe Li Puma, Bochum (DE); Markus Hammes, Dinslaken (DE); Thorsten Clevorn, Munich (DE); Jan Ellenbeck, Gruenwald (DE); Tobias Scholand, Essen (DE); Matthias Malkowski, Berg (DE); Narayan Vishwanathan, San Diego, CA (US); Chandra Gupta, Bochum (DE); Markus Schlamann, Moers (DE); Romeo Lopez Soto, Hamminkeln (DE); Lijun Zhang, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 131 days.

(21) Appl. No.: 16/641,243

(22) PCT Filed: Sep. 28, 2017

(86) PCT No.: PCT/US2017/053864
§ 371 (c)(1),
(2) Date: Feb. 23, 2020

(87) PCT Pub. No.: WO2019/066833
PCT Pub. Date: Apr. 4, 2019

(65) Prior Publication Data
US 2020/0228264 A1 Jul. 16, 2020

(51) Int. Cl.
*H04L 5/00* (2006.01)
*H04L 1/00* (2006.01)

(52) U.S. Cl.
CPC .......... *H04L 5/0044* (2013.01); *H04L 1/0021* (2013.01); *H04L 1/0057* (2013.01);
(Continued)

(58) Field of Classification Search
CPC . H04L 5/0044; H04L 27/2608; H04L 5/0046; H04L 5/0048; H04L 5/005; H04L 5/0051; H04L 5/0064; H04L 5/0082
See application file for complete search history.

(56) References Cited

U.S. PATENT DOCUMENTS

| 2012/0127993 A1 | 5/2012 | Turlington et al. |
| 2014/0064101 A1 | 3/2014 | Hart et al. |

(Continued)

FOREIGN PATENT DOCUMENTS

| WO | 2010063185 A1 | 6/2010 | |
| WO | WO-2018203727 A1 * | 11/2018 | .......... H04J 13/0062 |

OTHER PUBLICATIONS

Machine translation of WO2010/063185A1, Jun. 10, 2010, retrieved from https://worldwide.espacenet.com, 5 pages. (Year: 2010).*

*Primary Examiner* — Hoon J Chung
(74) *Attorney, Agent, or Firm* — 2SPL Patent Attorneys PartG mbB; Kieran O'Leary

(57) ABSTRACT

A method for controlling a bandwidth used for processing a baseband transmit signal by a transmit path of a transmitter is provided. The method includes generating a first comparison result by comparing, to a threshold value, a first number of physical resource blocks allocated to the transmitter for a first transmission time interval. Further, the method includes generating a second comparison result by comparing, to the threshold value, a second number of (Continued)

physical resource blocks allocated to the transmitter for a subsequent second transmission time interval. The method additionally includes adjusting the bandwidth based on the first and the second comparison results.

25 Claims, 23 Drawing Sheets

(52) U.S. Cl.
CPC .......... *H04L 5/0023* (2013.01); *H04L 5/0048* (2013.01); *H04L 5/0064* (2013.01); *H04L 5/0082* (2013.01)

(56) References Cited

U.S. PATENT DOCUMENTS

| | | |
|---|---|---|
| 2015/0365890 A1 | 12/2015 | Rajendran et al. |
| 2016/0233929 A1 | 8/2016 | van Zelst et al. |
| 2020/0008102 A1* | 1/2020 | Yokomakura ......... H04L 1/0003 |

* cited by examiner

3302 — controlling the switch        3300

METHODS AND APPARATUSES FOR CONTROLLING A BANDWIDTH USED FOR PROCESSING A BASEBAND TRANSMIT SIGNAL, RECEIVER FOR A WIRELESS COMMUNICATION SYSTEM, AND METHOD FOR A RECEIVER

FIELD

The present disclosure relates to efficient signal processing. In particular, examples relate to methods and apparatuses for controlling a bandwidth used for processing a baseband transmit signal, a receiver for a wireless communication system, and a method for a receiver.

BACKGROUND

Mobile wireless devices benefit from power-optimized modem architectures since the amount of available energy is limited by the battery.

Hence, there may be a desire for power-optimized transmitters and receivers.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
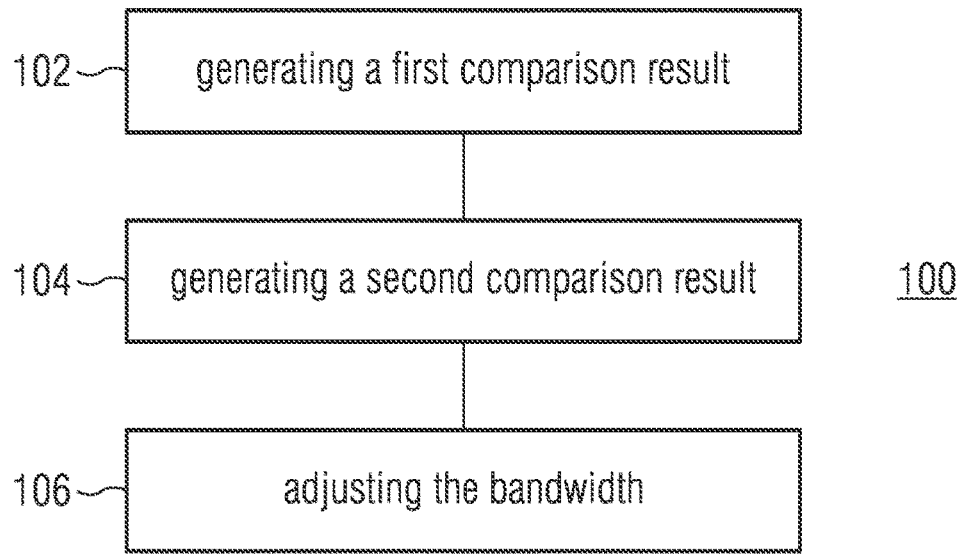
FIG. 1 illustrates a flowchart of an example of a method for controlling a bandwidth used for processing a baseband transmit signal.

FIG. 1 illustrates a method 100 for controlling a bandwidth used for processing a baseband transmit signal by a transmit path of a transmitter.

A transmit path comprises components or circuitry required to generate a wireless communication signal that may, for example, be provided to an antenna element so as to be radiated into the environment. Some examples of transmit paths, therefore, may comprise circuitry for processing (filtering, symbol mapping) information of the baseband transmit signal. In a wireless communication system, transmit paths may optionally further include a modulation circuit in order to convert the information of the baseband transmit signal according to the presently used modulation scheme (e.g. using an inverse Fourier transformation). Further, a subsequent mixing circuitry to up-convert the baseband transmit signal to the radio frequency signal used to radiate the information may be present. However, the term transmit path as used herein shall not be construed to include all the components technically necessary in order to generate a radio frequency signal. To the contrary, a transmit path used in the context of the present description may comprise only a subset of those components or elements.

In addition, the transmitter may optionally comprises one or more further transmit paths.

The method 100 comprises generating 102 a first comparison result by comparing, to a threshold value, a first number of Physical Resource Blocks (PRB) allocated to the transmitter for a first Transmission Time Interval (TTI). A PRB may be understood as the smallest unit of resources that can be allocated to a transmit path/transmitter/modem/mobile device for an uplink or downlink data transfer to/from a base station. A PRB may, e.g., be 180 kHz wide in frequency and 0.5 ms long in time. In frequency, a PRB may, e.g., be 12×15 kHz subcarriers or 24×7.5 kHz subcarriers wide. The TTI is related to encapsulation of data from higher layers into frames for transmission on the radio link layer. TTI refers to the duration of a transmission on the radio link (e.g. a TTI may be 1 ms long in time).

Further, the method 100 comprises generating 104 a second comparison result by comparing, to the threshold value, a second number of PRBs allocated to the transmitter for a subsequent second TTI.

The method 100 additionally comprises adjusting 106 the bandwidth used for processing the baseband transmit signal based on the first and the second comparison results. For example, adjusting 106 the bandwidth may comprise supplying a control signal to the transmit path or processing circuitry of the transmit path that is indicative of the bandwidth to be used for processing the baseband transmit signal.

Figure 2:
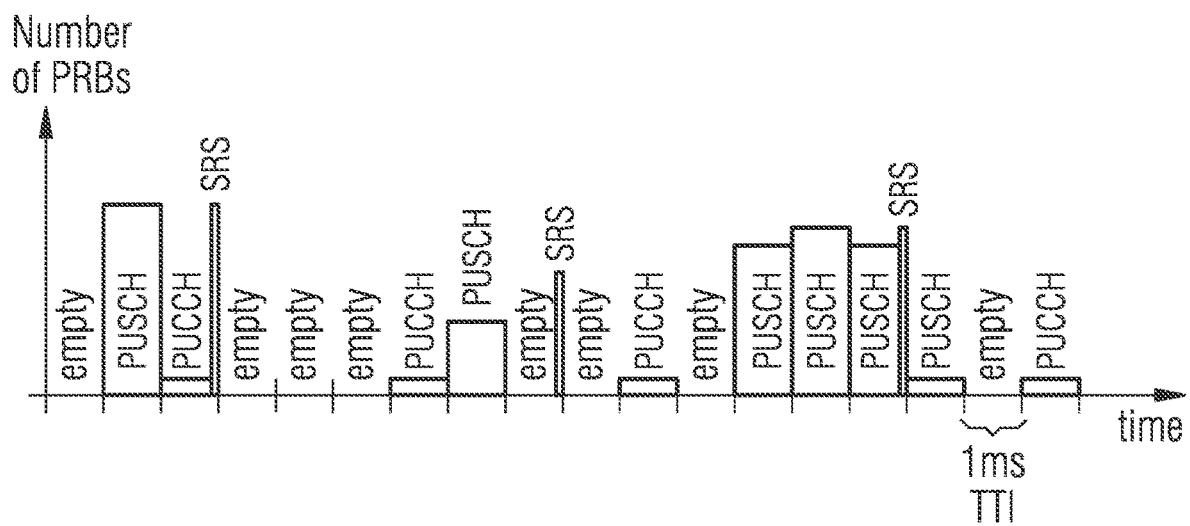
FIG. 2 illustrates an example of a course of a number of allocated physical resource blocks.

The higher the bandwidth used by the transmit path for processing the baseband transmit signal, the higher is the power consumed by the transmit path. The allocation of PRBs to the transmitter may vary from TTI to TTI. This is exemplarily illustrated in FIG. 2. FIG. 2 illustrates the respective number of allocated PRBs for a plurality of consecutive TTIs. In some TTIs no uplink data is transmitted, i.e., the TTIs are empty. In some TTIs Physical Uplink Shared CHannel (PUSCH) data is transmitted, whereas in other TTIs Physical Uplink Control Channel (PUCCH) data or a Sounding Reference Signal (SRS) is transmitted. It is evident that the number of allocated PRBs may vary dynamically between consecutive TTIs. For example, a single PRB may be allocated for transmitting PUCCH data, whereas 2, 6, 10, 20, 50 or more PRBs may be allocated for transmitting PUSCH data.

For a small number of allocated PRBs, a small bandwidth for processing the same may be sufficient, whereas a higher bandwidth may be required for a higher number of allocated PRBs. Processing the baseband signal with a high bandwidth if only a small number of PRBs is allocated may result in non-usage of (vast) parts of the available bandwidth for processing. For example, if only one PRB is allocated and 20 MHz processing is used by the transmit path, the baseband transmit signal may be only 180 kHz wide in frequency, so that more than 19 MHz of the processing bandwidth are unused. Hence, by adjusting the bandwidth based on the actual number of allocated PRBs for a certain TTI, processing the baseband signal with an unnecessary high bandwidth may be avoided. As a consequence, a power consumption of the transmit path and, hence, the transmitter may be lowered. In other words, a power-efficiency of the transmitter may be increased by method 100.

The first TTI may, in some examples, immediately precede the second TTI. In other examples, the first TTI may be the last TTI preceding the second TTI for which a non-zero number of PRBs is allocated to the transmitter.

Adjusting 106 the bandwidth used by the transmit path may, e.g., comprise maintaining the bandwidth unchanged, if both of the first and the second comparison result respectively indicate that the number of allocated PRBs is below the threshold value, if both of the first and the second comparison result respectively indicate that the number of allocated PRBs is above the threshold value, or if the second number of allocated PRBs is zero.

On the contrary, if one of the first and the second comparison results indicates that the number of allocated PRBs is below the threshold value and the other one of the first and the second comparison results indicates that the number of allocated PRBs is above the threshold value, adjusting 106 the bandwidth may comprise changing the bandwidth from a first bandwidth to a second bandwidth.

The second bandwidth may be smaller than the first bandwidth, and vice versa. For example, if the second bandwidth is smaller than the first bandwidth, the threshold value may be based on (e.g. be equal to) a ratio of the second bandwidth to the width of a PRB in frequency (i.e. the maximum number of PRBs that may be transmitted using the smaller second bandwidth). Similarly, if the first bandwidth is smaller than the second bandwidth, the threshold value may be based on (e.g. be equal to) a ratio of the first bandwidth to the width of a PRB in frequency (i.e. the maximum number of PRB s that may be transmitted using the smaller first bandwidth).

In addition to the bandwidth, also further processing parameters within the transmit path may be adapted. For example, method 100 may further comprise controlling the transmit path to process the baseband transmit signal using a first sample rate for the first bandwidth, and controlling the transmit path to process the baseband transmit signal using a second sample rate for the second bandwidth. Further, method 100 may comprise controlling the transmit path to process the baseband transmit signal using an inverse Fourier transformation (e.g. an inverse Fast Fourier Transformation, iFFT) of a first size for the first bandwidth, and controlling the transmit path to process the baseband transmit signal using an inverse Fourier transformation of a second size for the second bandwidth. Accordingly, a lower sample rate and/or an inverse Fourier transformation of smaller size may be used together with a smaller bandwidth for processing the baseband transmit signal. By adapting one or more further processing parameters, the processing of the baseband transmit signal by the transmit path may be further optimized in terms of energy-efficiency.

In a cell of a cellular network, the serving base station typically allocates a certain bandwidth for radio frequency transmit signals to a mobile device. Hence, method 100 may further ensure that the frequency of the baseband transmit signal complies with the allocated bandwidth. For example, if the second bandwidth is smaller than the first bandwidth and a bandwidth of a radio frequency transmit signal generated by the transmit path based on the baseband transmit signal is the first bandwidth (i.e. the allocated bandwidth is the first bandwidth), method 100 may further comprise controlling the transmit path to shift a frequency of the baseband transmit signal processed by the transmit path using the second bandwidth to a frequency assigned to the first bandwidth. As a consequence, after shifting the baseband transmit signal to the frequency assigned to the first bandwidth, the baseband transmit signal is at the same frequency position as if it had been processed by the transmit path using the higher first band-width. Accordingly, the subsequent generation of the resulting radio frequency transmit signal is not affected by processing the baseband transmit signal using the lower second bandwidth. However, since the baseband transmit signal was processed by the transmit path using the lower second bandwidth, the baseband transmit signal is processed more power-efficient.

It is to be noted that adjusting the bandwidth used for processing a baseband transmit signal by a transmit path may, in some examples, be based on the numbers of PRBs allocated to the transmitter for one or more further TTIs. For example, method 100 may further comprise generating a third comparison result by comparing, to the threshold value, a third number of PRBs allocated to the transmitter for a third TTI succeeding the second TTI. Accordingly, adjusting 106 the bandwidth used for processing a baseband transmit signal may be further based on the third comparison result. Taking into account further numbers of allocated PRBs may allow to avoid unnecessary switching between different bandwidths. For example, if the number of allocated PRBs is above the threshold value for the first and the third TTI and below the threshold value for the second TTI, taking into account only the number of allocated PRBs for two consecutive TTIs may lead to changing the bandwidth from a first bandwidth to a second bandwidth and back to the first bandwidth for the first to third TTIs. On the other hand, when in addition to the numbers of allocated PRBs for the first and second TTIs also the number of allocated PRBs for the third TTI is considered, it may be determined that the bandwidth is only changed for one TTI. Considering possible signal errors of a resulting radio frequency transmit signal due to adjusting the bandwidth, taking into account numbers of allocated PRBs for further TTIs may, hence, allow deciding to not change the bandwidth, i.e. maintain the bandwidth unchanged. Accordingly, a trade-off between power saving and signal errors of the resulting radio frequency transmit may be enabled.

In some examples, method 100 may further comprise adjusting a start time for changing the bandwidth from the first bandwidth to the second bandwidth. As said above, changing the bandwidth from the first bandwidth to the second bandwidth may cause signal errors in the resulting radio frequency transmit signal. By adjusting the start time for changing the bandwidth from the first bandwidth to the second bandwidth, the start time may be set such that the signal errors in the resulting radio frequency transmit signal are minimized or occur in a TTI for data that may tolerate signal errors.

In the foregoing, changing the bandwidth from a first bandwidth to a second bandwidth was exemplarily described. However, it is to be noted that one or more additional bandwidths for processing the baseband transmit signal may be used. For example, the first, the second and optionally further numbers of allocated PRBs may be compared to one or more further threshold values in order to decide on changing the bandwidth for processing the baseband transmit signal. For example, method 100 may further comprise generating a fourth comparison result by comparing, to a second threshold value, the first number of PRBs allocated to the transmitter for the first TTI, and generating a fifth comparison result by comparing, to the second threshold value, the second number of PRBs allocated to the transmitter for the second TTI.

Accordingly, adjusting the bandwidth may be further based on the fourth and the fifth comparison results. For example, adjusting the bandwidth may comprise changing the bandwidth from the first bandwidth to a third bandwidth, if one of the fourth and the fifth comparison results indicates that the number of allocated PRBs is below the second threshold value and the other one of the fourth and the fifth comparison results indicates that the number of allocated PRBs is above the threshold value. Using more bandwidths for processing the baseband transmit signal may allow to find an optimum (minimum) bandwidth for different numbers of allocated PRBs in terms of energy efficiency.

Method 100 may, hence, enable a "breathing" transmitter. Method 100 may be understood as a smart switching mechanism for a breathing transmitter with a single transmit chain (transmit path). For example, if two transmit chains are implemented in the transmitter, one may be fixed to, e.g., one PRB, wherein the proposed control method may be applied to switch the other transmit chain between different bandwidths larger than one PRB. As discussed above, the method (e.g. implemented as algorithm) may put the switching at positions (in time) where it has no or minimal impact. The algorithm may, e.g., consider the number of PRBs used in the last and the next TTI to make a decision. That is, one advantage of the proposed method may be that a breathing transmitter improves the power-efficiency by scaling down the generated bandwidth if only a low number of PRBs needs to be transmitted. Further, a breathing transmitter with one transmit chain instead of two transmit chains may be smaller in size and cheaper (however, in its short switching times the generated signal may be deteriorated). Therefore, the proposed switching algorithm may ensure that the switching times happen at positions where they have either no impact or where their impact is negligible.

For simplicity, only two bandwidths for the breathing transmitter are considered in the following description, i.e. "large" and "small" and one threshold. For example, a threshold of 6 may be chosen, so that the small bandwidth refers to an allocation of <6 PRBs and the large bandwidth to >6 PRBs. As discussed above, different values may be chosen for the threshold and the method may be extended to more thresholds/bandwidths.

Figure 3:
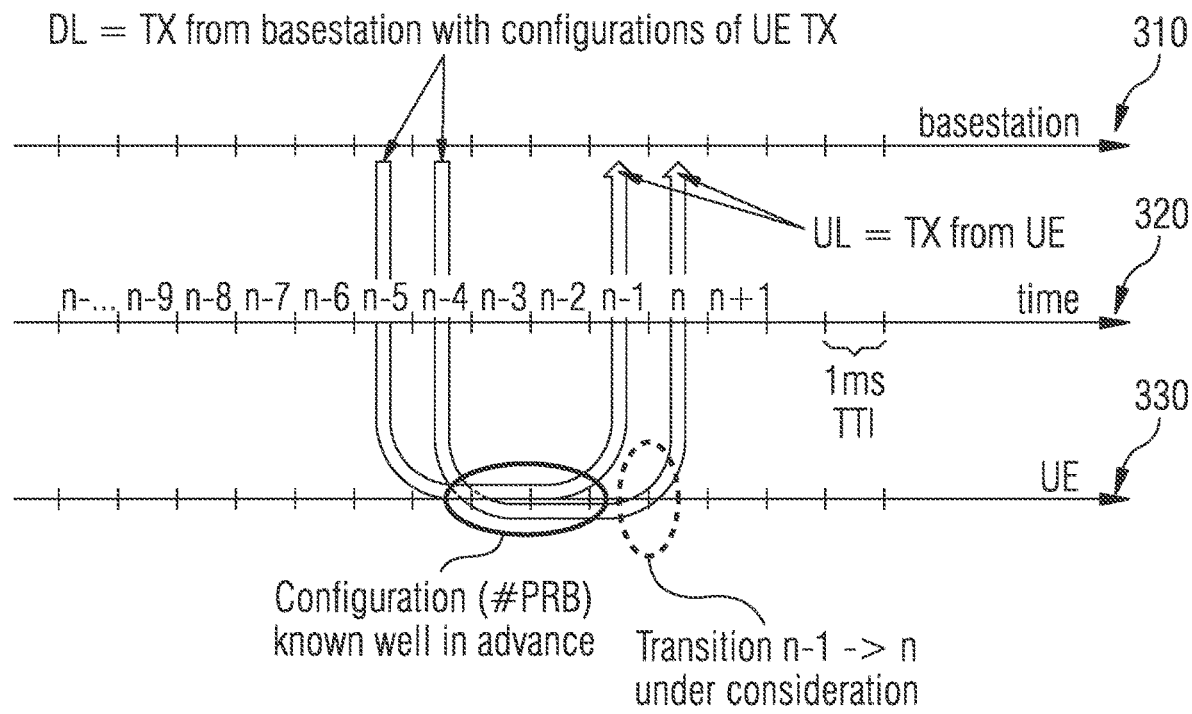
FIG. 3 illustrates an example of timing scheme for a wireless communication system.

The number of allocated PRBs (and other relevant information like the type of data, e.g., PUCCH, PUSCH or SRS) is known to a mobile device well in advance of the possible switching point at the boundary between first and second TTIs n−1 and n. FIG. 3 illustrates an exemplary timing scheme for a wireless communication system (e.g. according to the Long Term Evolution (LTE) standard of the Generation Partnership Project, 3GPP). Three timelines 310, 320 and 330 are illustrated in FIG. 3. The timelines are scaled in units of 1 ms long TTIs. Timeline 310 is related to a base station of the wireless communication system. Timeline 320 is used as reference for illustrative purposes, and timeline 330 relates to mobile device (user equipment) of the wireless communication system.

As illustrated in FIG. 3, the configuration of the mobile device for the first TTI n−1 (including the number of allocated PRBs for this TTI) is transmitted to the mobile device by the base station in a downlink channel at TTI n−5. Accordingly, the configuration of the mobile device for the second TTI n is transmitted by the base station at TTI n−4.

The mobile device may typically receive the configurations about one TTI after their transmission by the base station. The switching duration (i.e. a time period required by a transmit path of the mobile device for changing the bandwidth used for processing a baseband transmit signal from a first bandwidth to a second bandwidth) as well as necessary pre-calculation may take (much) less than one TTI. Accordingly, knowing the configuration four TTIs in advance may be (by far) sufficient for changing the bandwidth of the transmit path.

Figure 4:
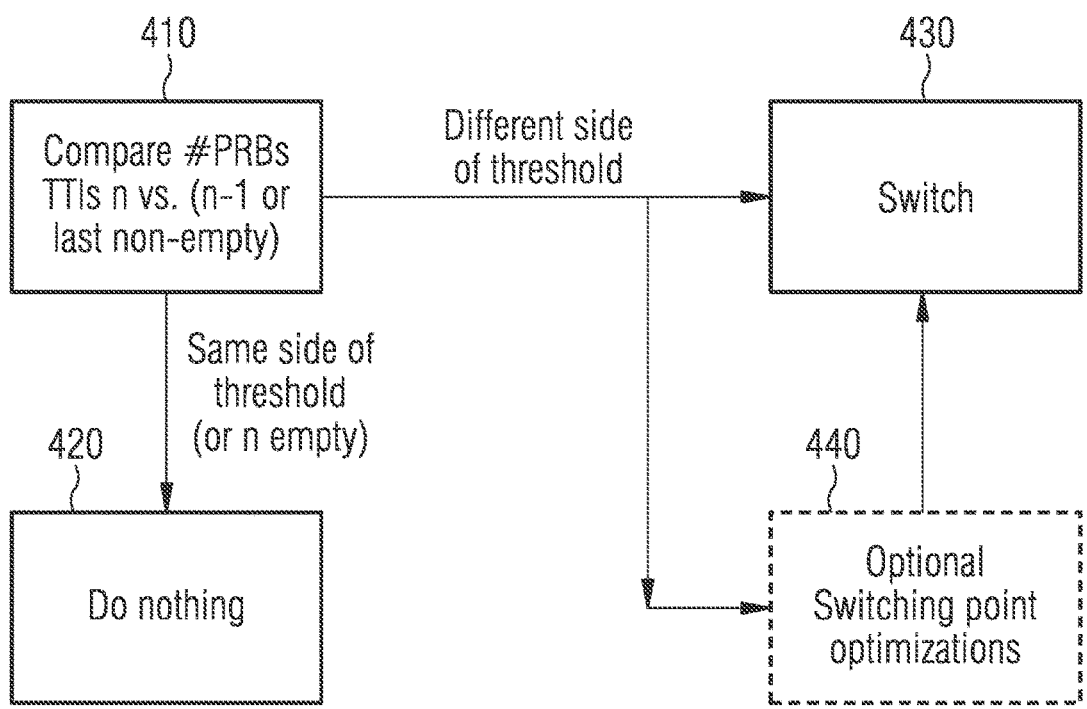
FIG. 4 illustrates an example of a block diagram of a method for controlling a bandwidth used for processing a baseband transmit signal.

FIG. 4 illustrates a block diagram of a switching trigger according to the proposed method. In a comparison block 410, the second number of PRBs allocated to the transmitter (or the mobile device) for the second TTI n is compared to a threshold value in order to generate a second comparison result. Accordingly, the first number of PRBs allocated to the transmitter for the first TTI is compared in the comparison block 410 to the threshold value in order to generate a first comparison result. As described above, the first TTI may be the TTI n−1 that immediately precedes the second TTI n, or be the last TTI preceding the second TTI n for which a non-zero number of PRBs is allocated to the transmitter (i.e. be the last non-empty TTI).

Switching the bandwidth may be only needed and may be only done, if the number of allocated PRBs crosses in TTI n the defined threshold with respect to the last transmitted number of PRBs (e.g. in TTI n−1 or the last non-empty TTI). As described above, multiple additional thresholds may be used.

Hence, if the first and the second comparison results are on the same side of the threshold (i.e. both of the first and the second comparison result respectively indicate that the number of allocated PRBs is below the threshold value, or both of the first and the second comparison result respectively indicate that the number of allocated PRBs is above the threshold value), or if the second TTI n is empty (i.e. the second number of allocated PRBs is zero), no bandwidth switching is done. The method, hence, proceeds to maintenance block 420 where the bandwidth is maintained unchanged.

If the first and the second comparison results are on different sides of the threshold (i.e. one of the first and the second comparison results indicates that the number of allocated PRBs is below the threshold value and the other one of the first and the second comparison results indicates that the number of allocated PRBs is above the threshold value), the bandwidth is switched. The method, hence, proceeds to switching block 430 where the bandwidth is changed from a first bandwidth to a second bandwidth.

As discussed above, if the decision is to switch, the switching point (e.g. at the end of TTI n−1 or the beginning of TTI n) may be optimized in optimization block 440. This is illustrated in FIGS. 5 and 6 which illustrate exemplary courses of the number of allocated PRBs.

Figure 5:
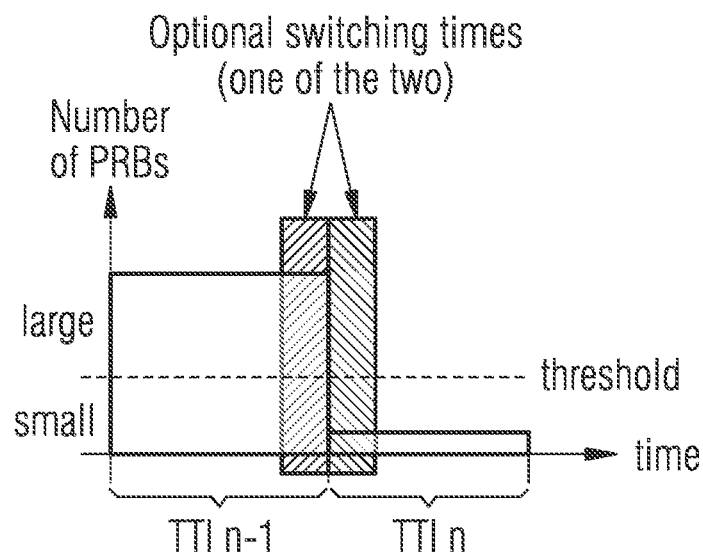
FIG. 5 illustrates another example of a course of a number of allocated physical resource blocks.

FIG. 5 illustrates a first exemplary course of the number of allocated PRBs for two consecutive TTIs. In the first TTI n−1, the number of allocated PRBs is above the threshold. Accordingly, the baseband transmit signal is to be processed using a higher first bandwidth. In the second TTI n, the number of allocated PRBs is below the threshold so that the baseband transmit signal may be processed using a lower second bandwidth. That is, FIG. 5 illustrates a transition from a large bandwidth to a small bandwidth.

As indicated in FIG. 5, one may switch the bandwidth either before or after the TTI boundary. That is, the start time for changing the bandwidth from the first bandwidth to the second bandwidth may be adjusted so that changing the bandwidth from the first bandwidth to the second bandwidth is finished before the transmit path starts processing data of the baseband transmit signal related to the second TTI n, or the start time for changing the bandwidth from the first bandwidth to the second bandwidth may be adjusted to a point in time at which the transmit path processes data of the baseband transmit signal related to the second TTI n.

Figure 6:
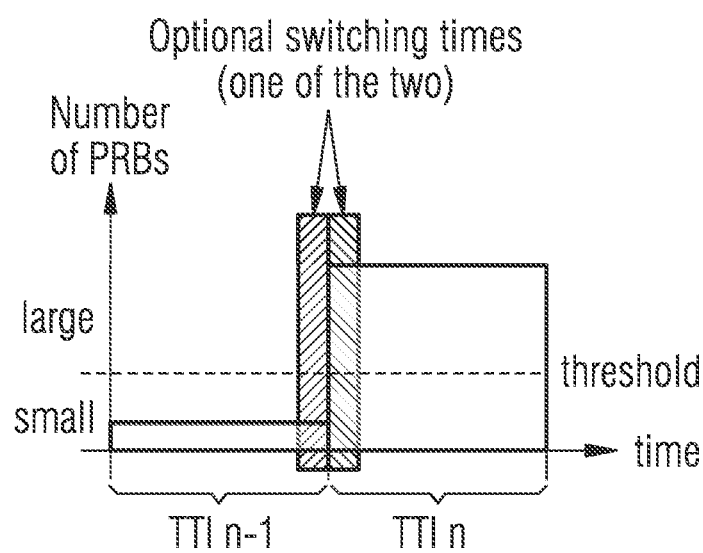
FIG. 6 illustrates a further example of a course of a number of allocated physical resource blocks.

FIG. 6 illustrates a second exemplary course of the number of allocated PRBs for two consecutive TTIs. In the first TTI n−1, the number of allocated PRBs is below the threshold. Accordingly, the baseband transmit signal may be processed using a lower first bandwidth. In the second TTI n, the number of allocated PRBs is above the threshold so that the baseband transmit signal is to be processed using a higher second bandwidth. That is, FIG. 6 illustrates a transition from a small bandwidth to a large bandwidth.

Similarly to the situation illustrated in FIG. 5, one may switch the bandwidth either before or after the TTI boundary.

Different criteria may be used for selecting the switching point. Some are described in the following with reference to FIGS. 7 to 16. It is to be noted that though the criteria are described individually for illustrative purposes, they may be combined in some examples.

Figure 7:
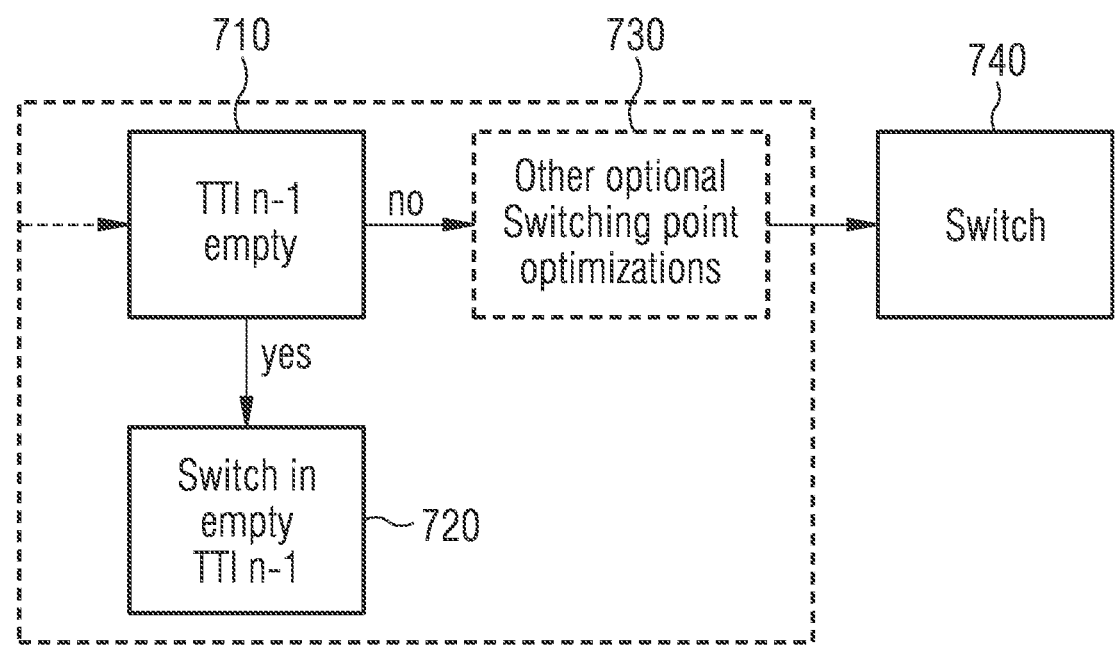
FIG. 7 illustrates an example of a block diagram of a first criterion for selecting a point in time for changing the bandwidth used for processing a baseband transmit signal.

FIG. 7 illustrates a first criterion based on the number of allocated PRBs for the first TTI n−1. If it is determined in determination block 710 that the last TTI n−1 is empty (i.e. the first number of allocated PRBs is zero), the method may proceed to switching block 720 and switch the bandwidth in the first TTI n−1 (e.g. at the end of the first TTI n−1). That is, based on a time period required by the transmit path for changing the bandwidth from the first bandwidth to the second bandwidth, the method may comprise adjusting the start time so that changing the bandwidth from the first bandwidth to the second bandwidth is finished before the transmit path starts processing data of the baseband transmit signal related to the second TTI. This may be beneficial since for empty TTIs no data is processed by the transmit path. Accordingly, no signal degradation due to the bandwidth change may occur.

Figure 8:
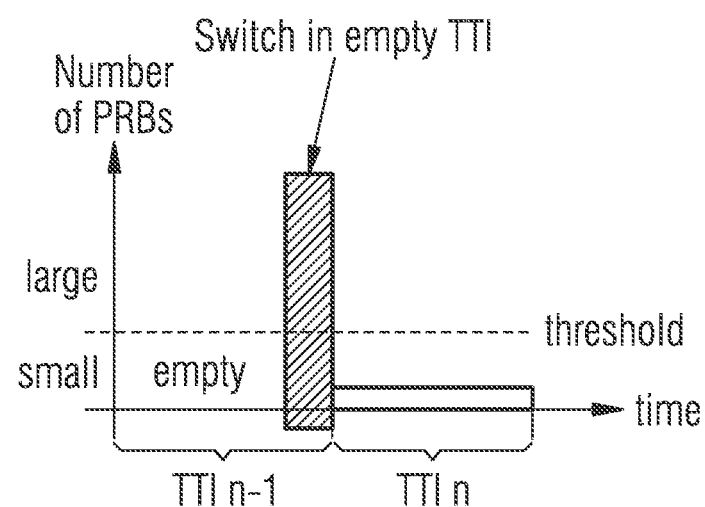
FIG. 8 illustrates a still further example of a course of a number of allocated physical resource blocks.
Figure 9:
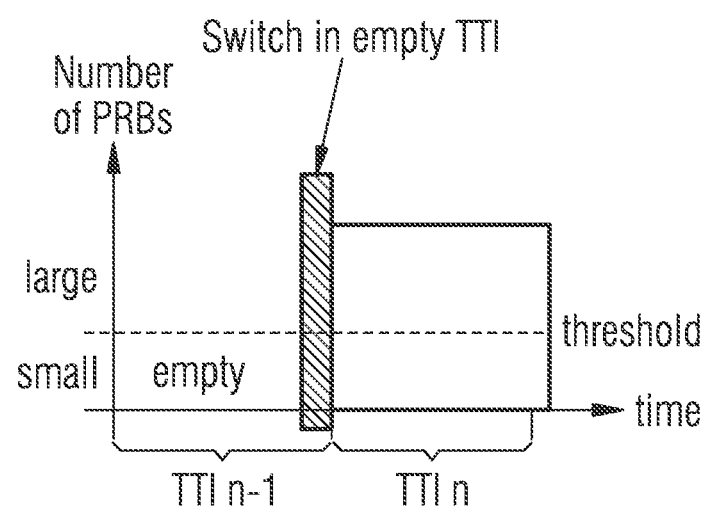
FIG. 9 illustrates still another example of a course of a number of allocated physical resource blocks.

This is illustrated in FIGS. 8 and 9. FIG. 8 illustrates another exemplary course of the number of allocated PRBs for two consecutive TTIs. In the first TTI n−1, the number of allocated PRBs is zero and the bandwidth is adjusted to a higher first bandwidth. In the second TTI n, the number of allocated PRBs is non-zero and below the threshold so that the baseband transmit signal may be processed using a lower second bandwidth. Initially, the baseband transmit signal is processed using the first bandwidth. As discussed in connection with FIG. 7, the switching of the bandwidth takes place in the empty TTI n−1. That is, based on a time period required by the transmit path for changing the bandwidth from the first bandwidth to the second bandwidth, the start time is adjusted so that changing the bandwidth from the first bandwidth to the second bandwidth is finished before the transmit path starts processing data of the baseband transmit signal related to the second TTI n.

Similarly, FIG. 9 illustrates a further exemplary course of the number of allocated PRBs for two consecutive TTIs. In the first TTI n−1, the number of allocated PRBs is again zero but the bandwidth is adjusted to a lower first bandwidth. In the second TTI n, the number of allocated PRBs is non-zero and above the threshold so that the baseband transmit signal is to be processed using a higher second bandwidth. Initially, the baseband transmit signal is processed using the first bandwidth. Again, the switching of the bandwidth takes place in the empty TTI n−1 in order to avoid signal degradation in the second TTI n comprising data.

Going back to the block diagram of FIG. 7, if it is determined in determination block 710 that the last TTI n−1 is not empty (i.e. the first number of allocated PRBs is non-zero), the method may proceed to optimization block 730 employing one or more other criteria for selecting the switching point and, further, to switching block 740 for switching the bandwidth.

Some criteria for selecting the switching point may also be based on the number of allocated PRBs for the second TTI n. That is adjusting the start time for changing the bandwidth from a first bandwidth to a second bandwidth may be based on at least one of the first number of allocated PRBs (for the first TTI) and the second number of allocated PRBs (for the second TTI).

Moreover, the switching times (i.e. the time periods required by the transmit path for changing the bandwidth from a first bandwidth to a second bandwidth, or vice versa) may be different for different transitions so that different optimizations depending on the direction of the transition may be used. For example, the transmit path may require a shorter time for a transition from a small to a large bandwidth than for a transition from a large to a small bandwidth. This is illustrated in FIG. 10.

Figure 10:
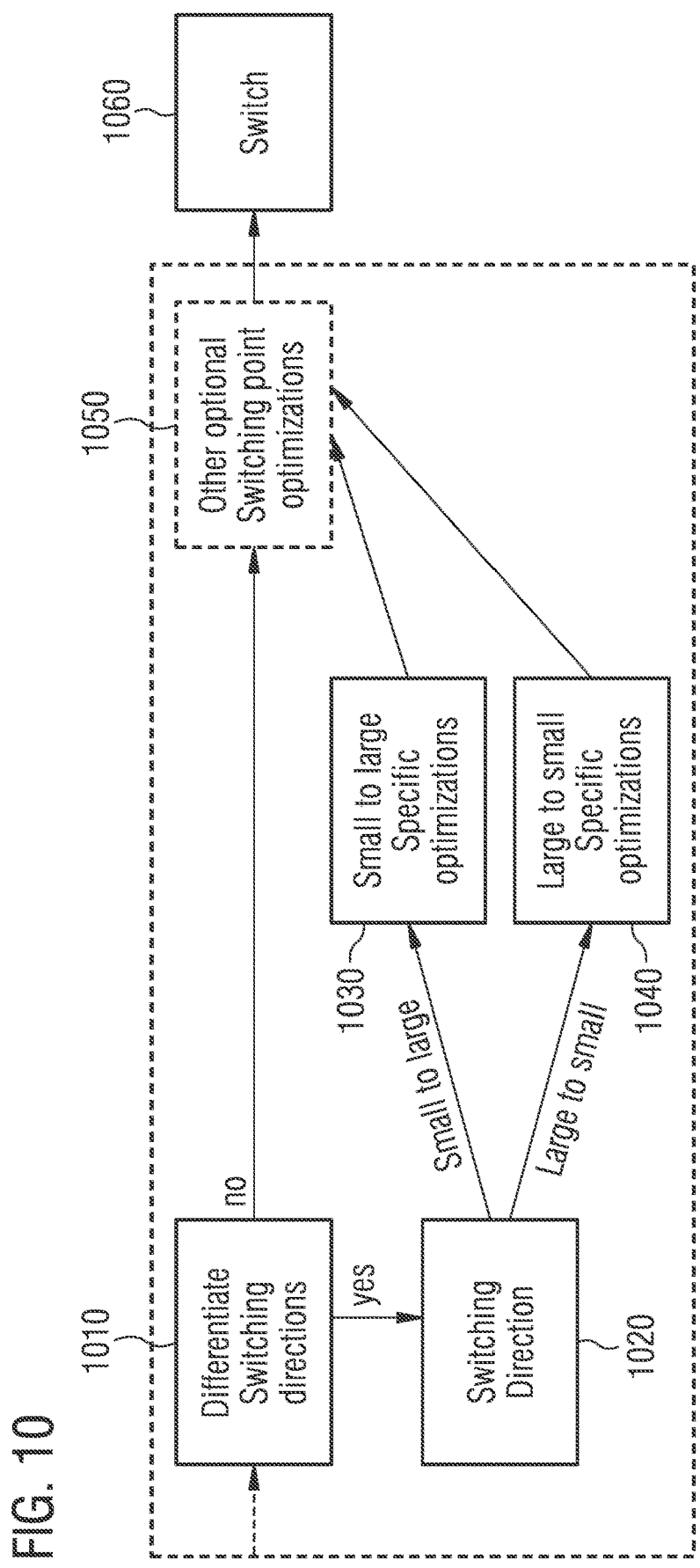
FIG. 10 illustrates an example of a block diagram of a second criterion for selecting a point in time for changing the bandwidth used for processing a baseband transmit signal.

FIG. 10 illustrates another block diagram for selecting the switching point. In a determination block 1010 it is determined if the method differentiates between the directions of switching (changing) the bandwidth used for processing the baseband transmit signal. If the method differentiates between the directions of switching, the current switching direction is determined in direction determination block 1020 (i.e. large to small, or small to large).

If the switching direct is determined to be small to large, specific optimizations of the switching (starting) point for this direction may be determined by first optimization block 1030. If the switching direct is determined to be large to small, specific optimizations of the switching (starting) point for this reverse direction may be determined by second optimization block 1040.

For example, if the first number of allocated PRBs (for the first TTI) is below the threshold value and the second number of allocated PRBs (for the second TTI) is above the threshold value (i.e. small to large bandwidth switch), the method may comprise adjusting the start time for changing the bandwidth to a point in time at which the transmit path processes data of the baseband transmit signal related to the second TTI. A small to large transition may be so short (additionally, the coding of the large number of PRBs in the second TTI n may be so robust) that the impact on the second TTI is negligible if the switch is in the second TTI (e.g. at the beginning).

As indicated in FIG. 10, further optimizations of the switching point may be applied by an optional additional optimization block 1050. Switching of the bandwidth is then done by switching block 1060.

For example, for a transition from large to small bandwidth (which may require more time) with a small second TTI n (comprising e.g. PUCCH data), the additional optimization block 1050 may enable further optimizations (e.g. increase of transmit power).

If the method does not differentiate between the directions of switching, the method may directly proceed to additional optimization block 1050 and switching block 1060.

Selecting the switching point may, in some examples, also be based on the type of data of the baseband transmit signal. For example, the method may comprises adjusting the start time for changing the bandwidth from a first bandwidth to a second bandwidth based on at least one of a type of data of the baseband transmit signal related to the first TTI and the type of data of the baseband transmit signal related to the second TTI. This is described in the following with reference to FIGS. 11 to 13

Figure 11:
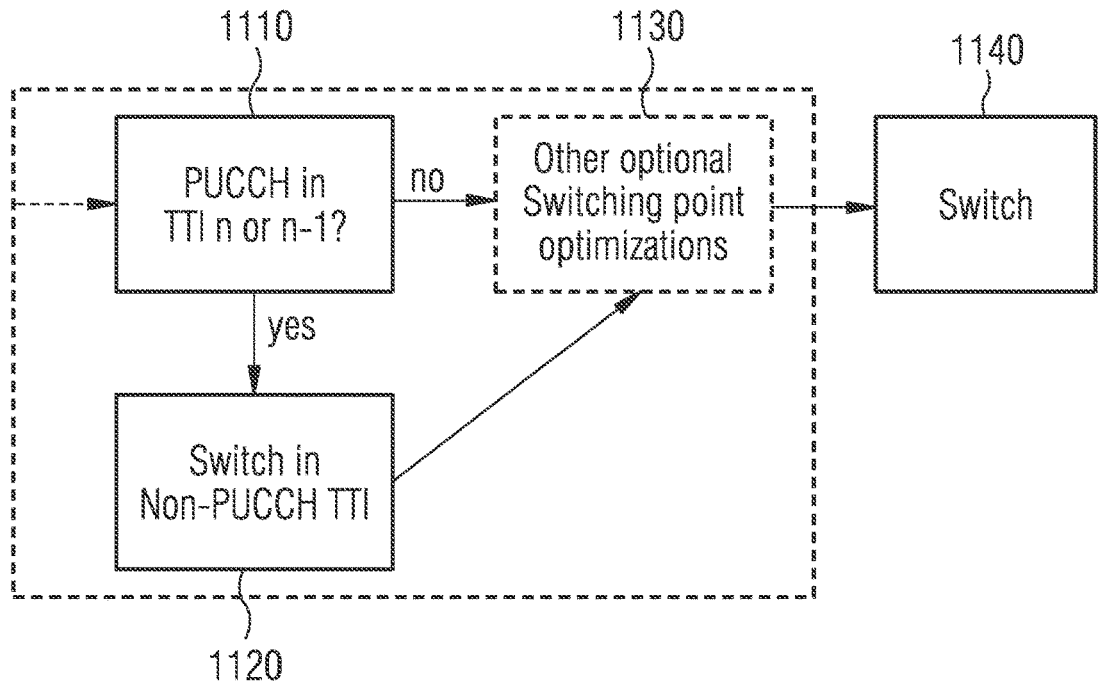
FIG. 11 illustrates an example of a block diagram of a third criterion for selecting a point in time for changing the bandwidth used for processing a baseband transmit signal.

FIG. 11 illustrates a criterion based on the presence of PUCCH data in one of the TTIs. While the PUSCH has a Hybrid Automatic Repeat Request (HARD) scheme and is usually controlled to a 10% BLock Error Rate (BLER) by the base station, the PUCCH may be more important to be received correctly by the base station. Hence, determination block 1110 determines if PUCCH data is to be transmitted in one of the first and second TTIs n−1 and n. If PUCCH data is to be transmitted in one of the first and second TTIs n−1 and n, selection block 1120 determines that the switch takes place in the other TTI.

Optionally, optimization block 1130 may determine further optimizations of the switching point before switching block 1140 switches the bandwidth used for processing the baseband transmit signal.

The PUCCH is very robust and PUCCH data is often transmitted with low signal power. Hence, an increase of the signal power may be well suited for the PUCCH, and be determined by the optimization block 1130.

If PUCCH data is to be transmitted in both of the first and second TTIs n−1 and n, no bandwidth switching may be done since the PUCCH has always one PRB.

Figure 12:
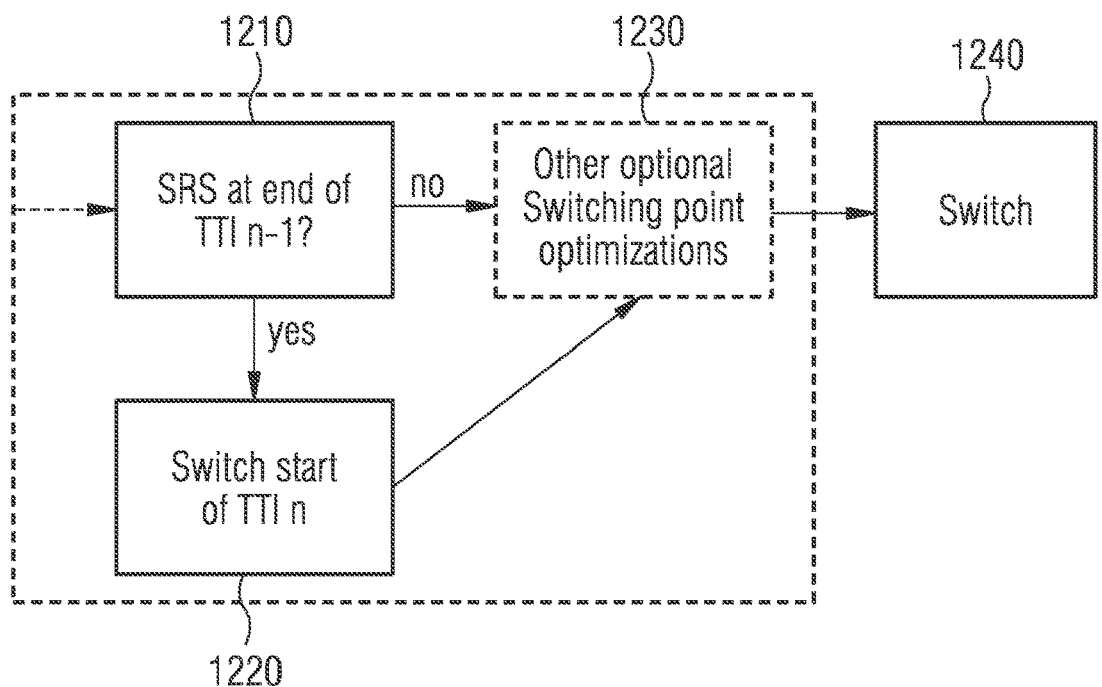
FIG. 12 illustrates an example of a block diagram of a fourth criterion for selecting a point in time for changing the bandwidth used for processing a baseband transmit signal.

FIG. 12 illustrates another criterion based on the presence of SRS data in one of the TTIs. SRS symbols are important for the channel estimation of the base station. They may, e.g., be transmitted in the last Orthogonal Frequency-Division Multiplexing (OFDM) symbol of a TTI.

Hence, determination block 1210 determines if SRS data is to be transmitted in the first TTI n−1. If SRS data is to be transmitted in in the first TTI n−1, selection block 1220 determines that the switch takes place in the second TTI n.

Optionally, optimization block 1230 may determine further optimizations of the switching point before switching block 1240 switches the bandwidth used for processing the baseband transmit signal.

Figure 13:
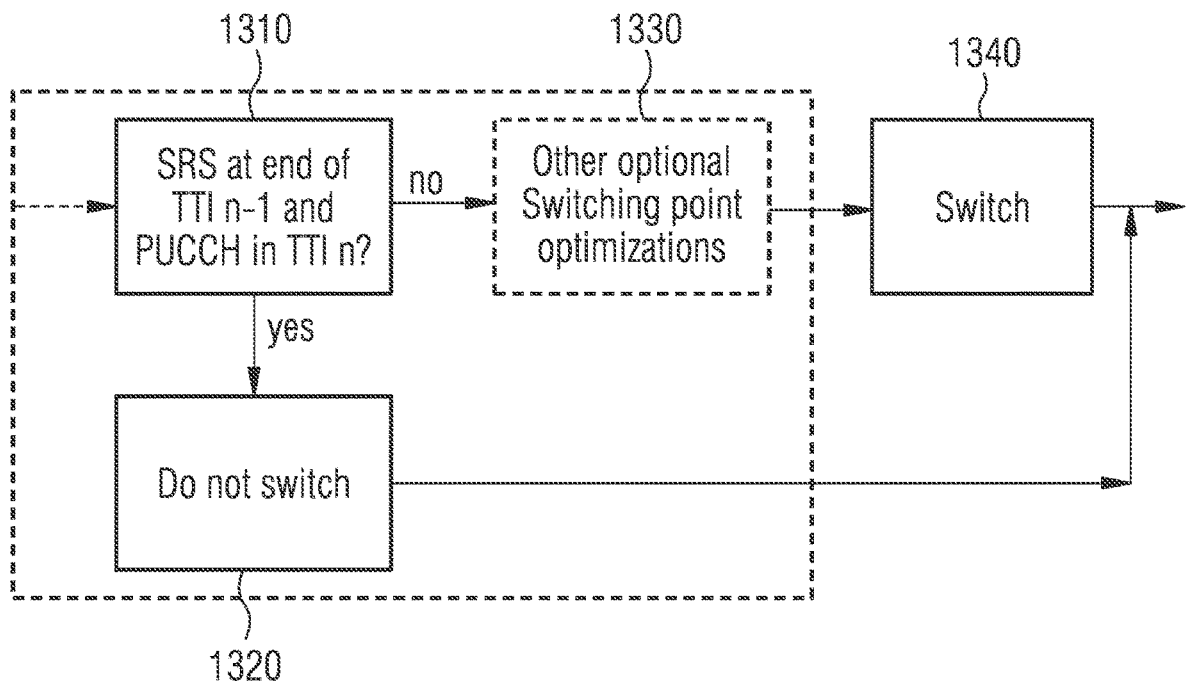
FIG. 13 illustrates an example of a block diagram of a criterion for deciding on changing the bandwidth used for processing a baseband transmit signal.

FIG. 13 illustrates another criterion for switching based on the presence of SRS data and PUCCH in the TTIs. Determination block 1310 determines if SRS data is to be transmitted in the first TTI n−1 and additionally PUCCH data is to be transmitted in the second TTI n. If SRS data is to be transmitted in in the first TTI n−1 and PUCCH data is to be transmitted in the second TTI n, selection block 1320 determines that the bandwidth is not switched. Else, an optional optimization block 1330 may determine optimizations of the switching point before switching block 1340 switches the bandwidth used for processing the baseband transmit signal.

That is, if the type of data of the baseband transmit signal related to the first TTI or the second TTI is a predefined type of data, the start time for changing the bandwidth from a first bandwidth to a second bandwidth may be adjusted so that changing the bandwidth from the first bandwidth to the second bandwidth takes place while the transmit path processes data of the baseband transmit signal related to the other of the first TTI and the second TTI. Of course, adjusting the start time is based on the time period required by the transmit path for changing the bandwidth from the first bandwidth to the second bandwidth.

Further, if the type of data of the baseband transmit signal related to the first TTI and the type of data of the baseband transmit signal related to the second TTI are both predefined types of data, the bandwidth may be maintained unchanged.

As described above, the predefined type of data may, e.g., be data for a PUCCH, data for a SRS, or data for re-transmission.

Selecting the switching point may, in some examples, also be based on the coding robustness of data of the baseband transmit signal. This is described in the following with reference to FIGS. 14 and 15.

The coding robustness denotes the data's vulnerability to errors, e.g., introduced while processing the data within the transmission path or while transmission of the data by means of the generated radio frequency signal. For example, a first coding robustness of data of the baseband transmit signal related to the first TTI may be based on at least one of a code rate (i.e. the proportion of the data that is useful/non-redundant), a transport block size, a Modulation and Coding Scheme (MCS), a modulation, a code block size and a code type of the data of the baseband transmit signal related to the first TTI.

The switching times (i.e. the time periods required by the transmit path for changing the bandwidth from a first bandwidth to a second bandwidth) may be rather short compared to a TTI. For example, the switching time may be less than 20 μs, which means that only a small portion of only one out of the, e.g., 12 or 14 OFDM symbols in a TTI is affected. As discussed above, the switching times may be different for different transitions of the bandwidth (e.g. small to large may be much faster than large to small).

Figure 14:
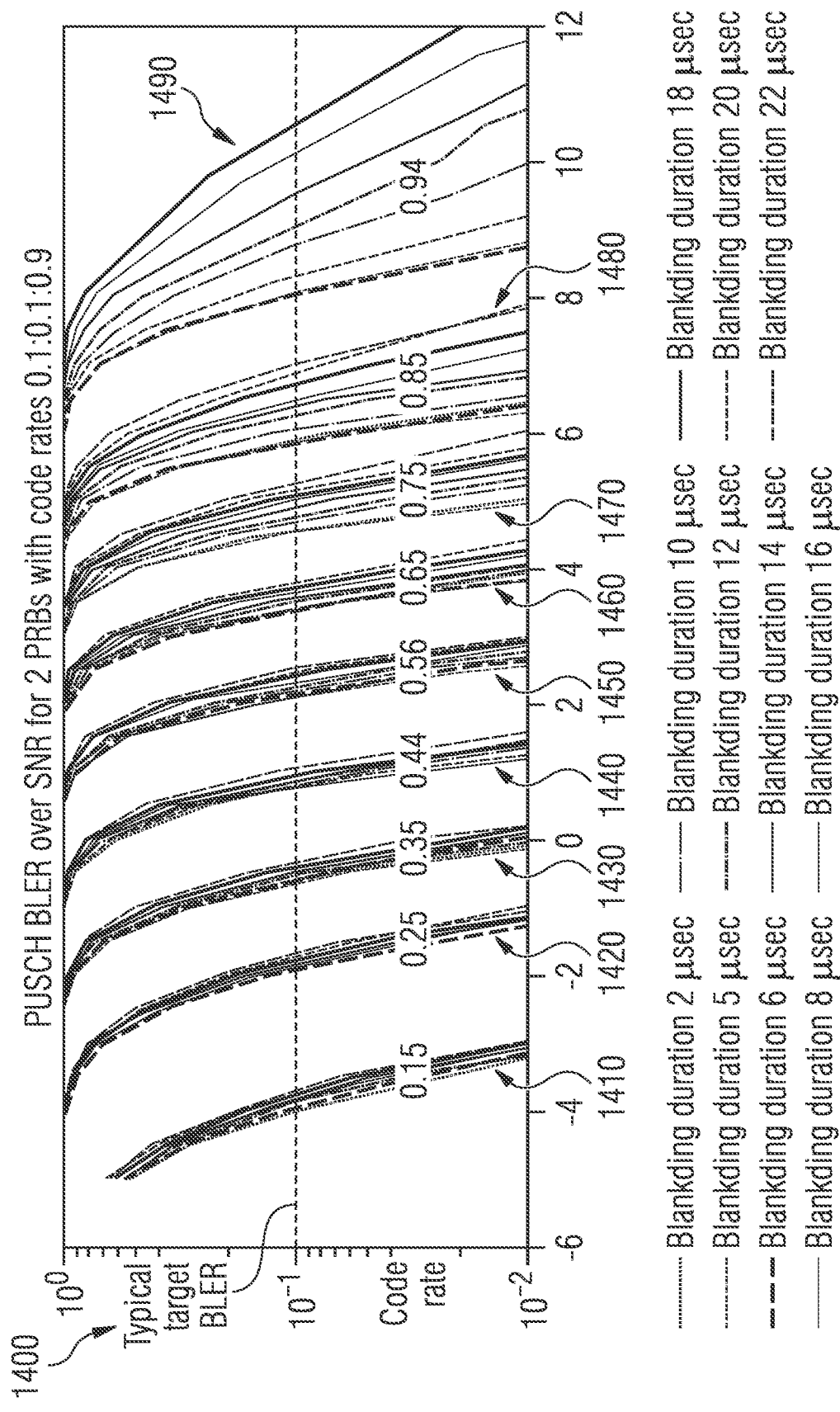
FIG. 14 illustrates exemplary courses of a block error rate for different coding rates.

The effect of changing the bandwidth is illustrated in FIG. 14 for a PUSCH uplink. In FIG. 14, the effect of changing the bandwidth is emulated by blanking a certain length of the first OFDM symbol of a TTI. Blanking (i.e. no useful data) is a worst case assumption for the effect of changing the bandwidth. Also the small PUSCH uplink with only two allocated PRBs for the TTI is kind of a worst case scenario since the code block size for the Turbo decoder is small.

FIG. 14 illustrates the BLER of the PUSCH uplink over its Signal-to-Noise Ratio (SNR) for different coding rates and different blanking durations. As a reference, a typical target BLER of $10^{-1}$ is illustrated in FIG. 14 by means of line 1400.

A first group of BLER courses 1410 over its SNR for a coding rate of 0.15 is illustrated on the left side of FIG. 14. The group of BLER courses 1410 comprises the BLER courses for different durations of the blanking (emulating different time periods required by the transmit path for changing the bandwidth from a first bandwidth to a second bandwidth). Similarly, further groups of BLER courses 1420, 1430, 1440, 1450, 1460, 1470, 1480 and 1490 for coding rates of 0.25, 0.35, 0.44, 0.56, 0.65, 0.75, 0.85 and 0.94 are illustrated.

It is evident from FIG. 14 that even for large blanking durations, the impact is relative small (e.g. the bandwidth of the SNR for achieving the typical target BLER 1400 is less than 0.5 dB). This is because only one out of 12 OFDM symbols with data is only partially affected. Hence, more than $11/12$ of the data transmission remains untouched. Only for coding rates greater than 0.85, the degradations are larger. However, such high coding rates are not realistic for a small number of allocated PRBs. Additionally, a safe guard may be used when the bandwidth is switched.

The PUCCH with only one allocated PRB has a different coding scheme. Hence, the impact might be slight larger (e.g. also because of the smaller size). However, the general coding is more robust with rate ½ than the bad high coding rate cases of the PUSCH. Since the PUCCH with one allocated PRB belongs always to a small setting, switching may be blocked here (see above), or switching may be moved to an adjacent TTI (see above).

The SRS pilot symbols in a Frequency-Division Duplexing (FDD) system are (when configured) at the end of an OFDM symbol at the end of the TTI, and in Time-Division Duplexing configurations at the end of a special subframe when switching from downlink to uplink. The SRS pilot symbols usually have many PRBs, hence, they may belong to the large bandwidth option. As described above, switching may be done at the beginning of the next TTI, so that the SRS pilot symbols are not affected.

Figure 15:
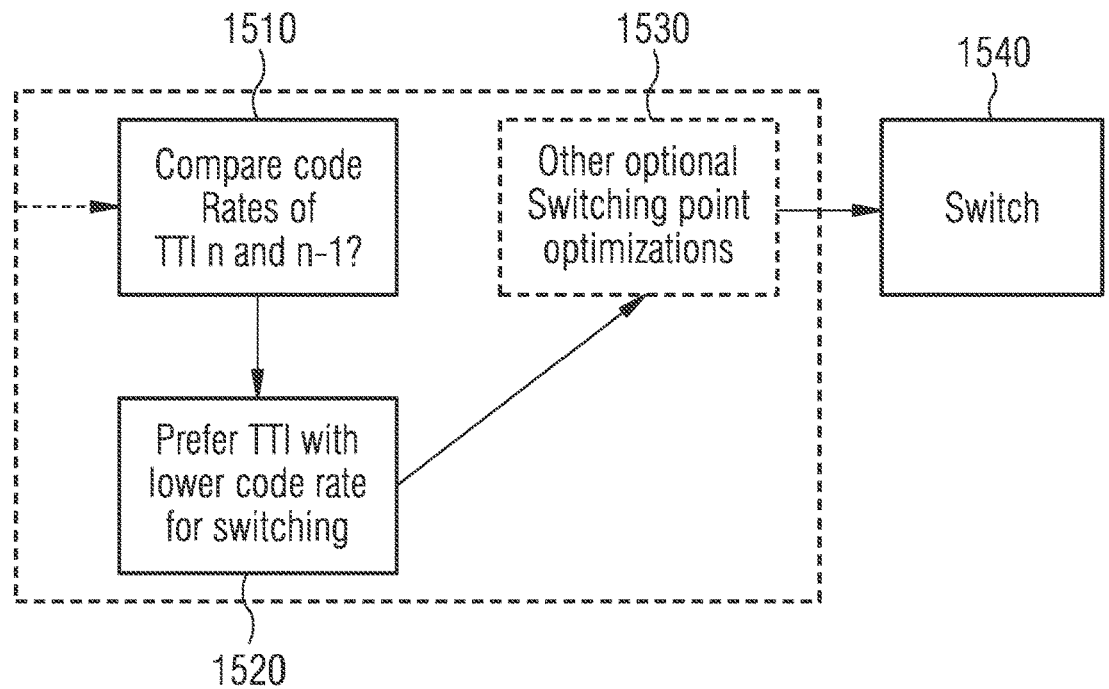
FIG. 15 illustrates an example of a block diagram of a fifth criterion for selecting a point in time for changing the bandwidth used for processing a baseband transmit signal.

A block diagram depicting the selection of the switching time based on the coding robustness is illustrated in FIG. 15. Comparison block 1510 compares a first coding robustness of data of the baseband transmit signal related to the first TTI n−1 to a second coding robustness of data of the baseband transmit signal related to the second TTI n. Selection block 1520 then decides to switch in the more robust one of TTIs n−1 and n. That is, based on a time period required by the transmit path for changing the bandwidth from a first bandwidth to a second bandwidth, the selection block 1520 may adjust the start time, so that changing the bandwidth from the first bandwidth to the second bandwidth takes place while the transmit path processes data of the baseband transmit signal related to the one of the first TTI n−1 and the second TTI n exhibiting higher coding robustness.

As said above, the coding robustness of data of the baseband transmit signal related to a certain TTI may be based on at least one of a code rate, a transport block size, a MCS, a modulation, a code block size and a code type of the data of the baseband transmit signal related to the TTI.

Further, an optional optimization block 1530 may determine further optimizations of the switching point before switching block 1540 switches the bandwidth used for processing the baseband transmit signal.

In order to compensate for (small) coding gain losses due to changing the bandwidth, the transmit power may be increased (e.g. by 1 dB) for the affected TTI (if it is not at the maximum power). Accordingly, a better SNR at the base station may offset the loss of coded bits. For example, for PUCCH the transmit power is often far below the maximum transmit power because of its robustness. Accordingly, the transmit power may be increased for TTIs related to PUCCH data.

For example, based on the expected (adjusted) switching times and the known robustness of the first and second TTIs n−1 and n (i.e. based on coding scheme and rate, number of allocated PRBs, or number of pilots), an expected performance degradation may be estimated. For example, the performance degradation may be calculated as an equivalent of X dB of Signal-to-Interference-plus-Noise Ratio (SINR) at the receiving base station. In order to compensate for this degradation, the transmit power may, e.g., be increased by Y dB (with Y being less, equal or more than X) if the transmit power is not at the maximum power. Further, it may be checked if the increased power consumption due to the increased transmit power offsets the gain by the transmit path switching (i.e. the bandwidth switching).

Figure 16:
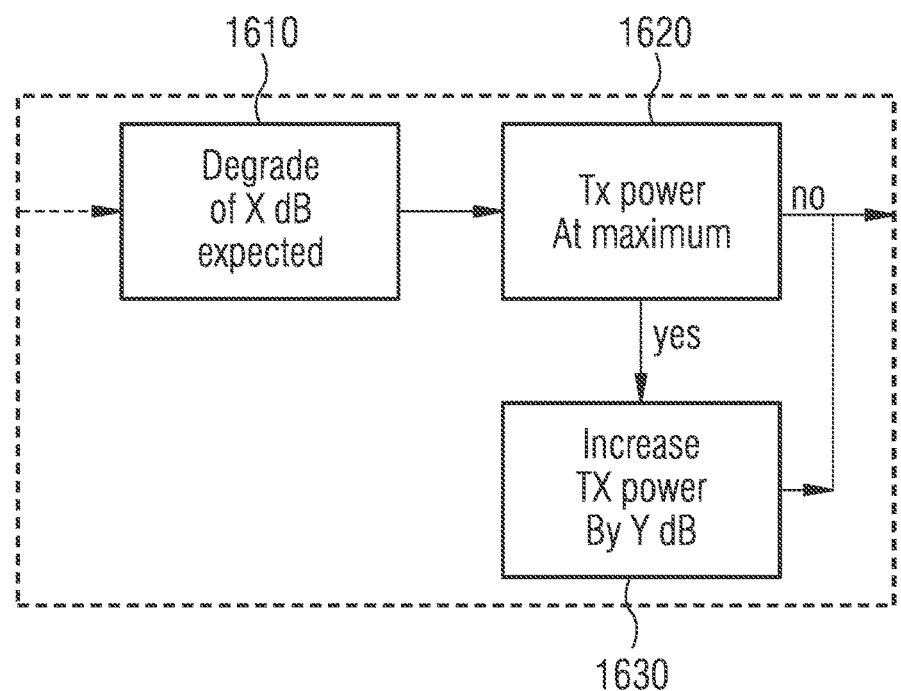
FIG. 16 illustrates an example of a block diagram of a criterion for increasing a power of a radio frequency transmit signal.

The above described increase of signal power is illustrated in the block diagram of FIG. 16. A calculation block 1610 calculates for the radio frequency transmit signal generated by the transmit path based on the baseband transmit signal a signal degradation of the radio frequency transmit signal due to changing the bandwidth from a first bandwidth to a second bandwidth. A comparison block 1620 compares the power of the radio frequency transmit signal to a predefined signal power (e.g. the maximum signal power for the radio frequency transmit signal supported by the transmit path, or the maximum signal power for the radio frequency transmit signal according to a communication standard). If the power of the radio frequency transmit signal is smaller than the predefined signal power, an increase block 1630 increases the power of the radio frequency transmit signal for a signal section of the radio frequency transmit signal relating to data of the baseband transmit signal that is processed by the transmit path while the bandwidth is changed from the first bandwidth to the second band-width.

The proposed method (e.g. implemented as algorithm) was described above considering mainly the first and second TTIs n−1 and n. However, as described above, further past and future TTIs may be taken into account to further improve the switching decision. For example, at the time of the decision already information on the numbers of allocated PRBs for future TTIs n+1, n+2, . . . may be known to a control circuit for the transmitter or the transmit path (e.g. because the processing of the relevant uplink control information in the downlink of TTI n−4 is complete, or some regular patterns like SRS or periodic reporting anyway specify the number of allocated PRBs). This may also be supported by some history algorithm based on past TTIs, which may, e.g., identify certain patterns of voice calls or make other predictions possible. This may then, e.g., be used for not switching from TTI n−1 to TTI n, if there is again a switch in the opposite direction soon after (e.g. from TTI n to TTI n+1). However, if switching is mandatory, the prediction may be overwritten as definite information is always available at the point of the final decision.

That is, the method may comprise generating a third comparison result by comparing, to the threshold value, a third number of PRBs allocated to the transmitter for a third TTI succeeding the second transmission time interval, and adjusting the bandwidth further based on the third comparison result. The third number of allocated PRBs may be based on at least one of information received from a base station, information on respective numbers of PRBs allocated to the transmitter for a plurality of TTIs preceding the first TTI, and information on types of data periodically occurring in the baseband transmit signal.

That is, a large history may be considered for prediction of already available (dynamic or periodic) scheduling information for future TTIs.

Furthermore, an overarching control (e.g. implemented as algorithm) may be used, which checks, e.g., the resulting error rates for PUSCH (e.g. by means of BLER based on Physical Hybrid-ARQ Indicator Channel, PHICH, or re-transmission grants) and PUCCH (e.g. based on unwanted re-transmissions, MCS or rank not matching the reported Channel Quality Indicator, CQI) in switching and non-switching TTIs. This may allow to ensure that the transmit path switching does not break things and that the overall performance of the transmitter is good.

That is, the method may additionally comprise determining, based on information received from a base station, a signal error of a radio frequency transmit signal generated by the transmit path based on the baseband transmit signal due to adjusting the bandwidth. If the signal error exceeds an error threshold, adjusting the bandwidth may be disabled.

To summarize, if degradation cannot be avoided, an algorithm may look for the lowest impact and apply countermeasures or even block switching.

As discussed above, a serving base station may allocate a certain bandwidth for radio frequency transmit signals to a mobile device. Hence, the proposed method may further ensure that the frequency of the baseband transmit signal complies with the allocated bandwidth. For example, if the second bandwidth is smaller than the first bandwidth and a bandwidth of a radio frequency transmit signal generated by the transmit path based on the baseband transmit signal is the first bandwidth (i.e. the allocated bandwidth is the first bandwidth), the method may further comprise controlling the transmit path to shift a frequency of the baseband transmit signal processed by the transmit path using the second bandwidth to a frequency assigned to the first bandwidth. As a consequence, after shifting the baseband transmit signal to the frequency assigned to the first bandwidth, the baseband transmit signal is at the same frequency position as if it had been processed by the transmit path using the higher first band-width.

Figure 17:
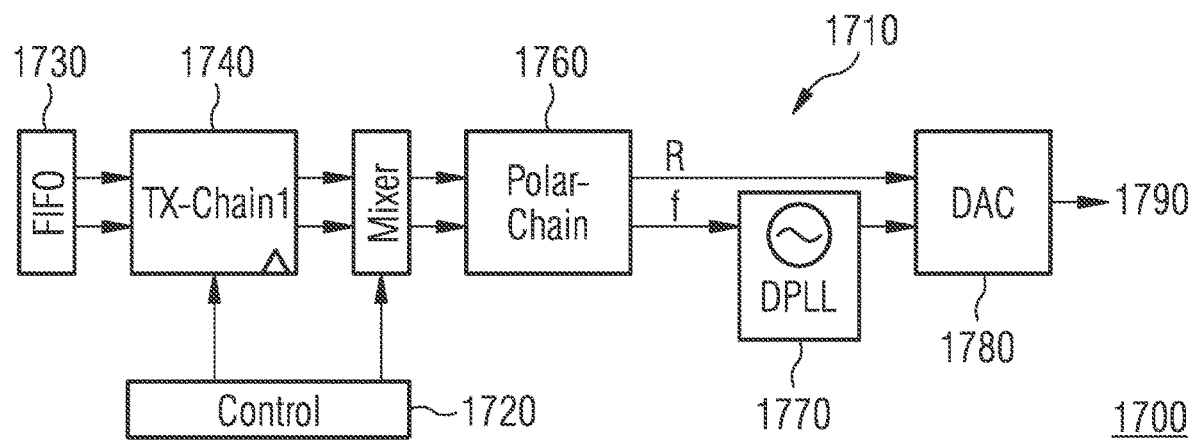
FIG. 17 illustrates an example of a transmitter.

An exemplary polar transmitter 1700 supporting the proposed control scheme is illustrated in FIG. 17. The polar transmitter 1700 comprises a transmit path 1710 and an apparatus 1720 for controlling the transmit path 1710 according to the proposed control scheme.

A digital frontend 1730 (illustrated as First In-First Out, FIFO, buffer) provides a baseband transmit signal. A first processing section 1740 of the transmit path 1710 receives and processes the baseband transmit signal. The apparatus 1720 adjusts the bandwidth of the first processing section 1740 of the transmit path 1710 used for processing the baseband transmit signal. The frequency translation of the baseband transmit signal (i.e. the allocated RBs) to the desired frequency is accomplished by mixing circuit 1750. Also the mixing circuit 1750 is controlled by the apparatus 1720.

For example, if a bandwidth for radio frequency transmit signals allocated to transmitter 1700 by a serving base station is a higher first bandwidth, whereas the first processing section 1740 is controlled to process the baseband transmit signal using a lower second bandwidth, the apparatus 1720 controls the mixing circuit 1750 to shift the frequency of the baseband transmit signal to a frequency assigned to the first bandwidth.

As a consequence, the polar section 1760 of the transmit path 1710 receives the baseband transmit signal at the same frequency position as if it had been processed by the first processing section 1740 using the higher first bandwidth. Accordingly, the polar section 1760 may conventionally generate the radius component and the phase component for driving (digital) Phase-Locked Loop (PLL) 1770 and Digital-to-Analog Converter (DAC) 1780 for generating radio frequency transmit signal 1790 based on the baseband transmit signal.

As discussed above, breathing transmitters according to the proposed scheme may be based on a pure resource allocation situation. In order to improve the scheme in terms of combating Error Vector Magnitude (EVM) issues arising because of the transient time when changing the bandwidth, information on the MCS may be used for adjusting the switch time for switching from a first bandwidth to a second bandwidth.

For example, for LTE wireless communication, specification 36.213 of the 3GPP defines the modulation and TBS index table (table 7.1.7.1-1) and the transport block size (table 7.1.7.2.1-1) which may be used for determining the modulation and the coding rate related to transmission in a current SubFrame (SF), i.e. a current TTI. A higher coding rate transmission allows more data to be transmitted over a channel with a relatively small number of redundant bits, which results in higher data rates. For poor channel conditions, a lower coding rate adds more redundant bits to enable successful decoding of the payload. During an uplink transmission, a transmitter may have the information on the number of allocated PRBs, the associated payload and eventually the coding rate used for the current transmission.

According to transmission theory, higher coding rate transmissions require a higher SNR in order to achieve the same BLER as lower coding rate transmissions. Hence, a mechanism for switching the bandwidth may further be based on the MCS information. For example, the time instance of switching the bandwidth based on the MCS of adjacent SFs (TTIs) to shift the resulting transient distortions to the SF having lower MCS. Placing the transient distortion period in SFs having lower MCS may ensure a better reception quality probability at a base station compared to schemes not taking into account this information.

As discussed above, one design criterion for a battery powered cellular system is to minimize power without negatively impacting system performance. For high bandwidth transmissions, switching the size of an iFFT, a bandwidth etc. used for baseband processing to save power when the number of allocated PRBs is below a threshold (e.g. six or less) may impose a higher risk of re-transmission for higher code rate transmissions if transients are present in the resulting radio frequency transmit signal. Using MCS (and in particular coding rate) information along with the current resource allocation conditions to "adjust" the position of the transients may ensure an improved system performance by reducing the re-transmission probability.

Figure 18:
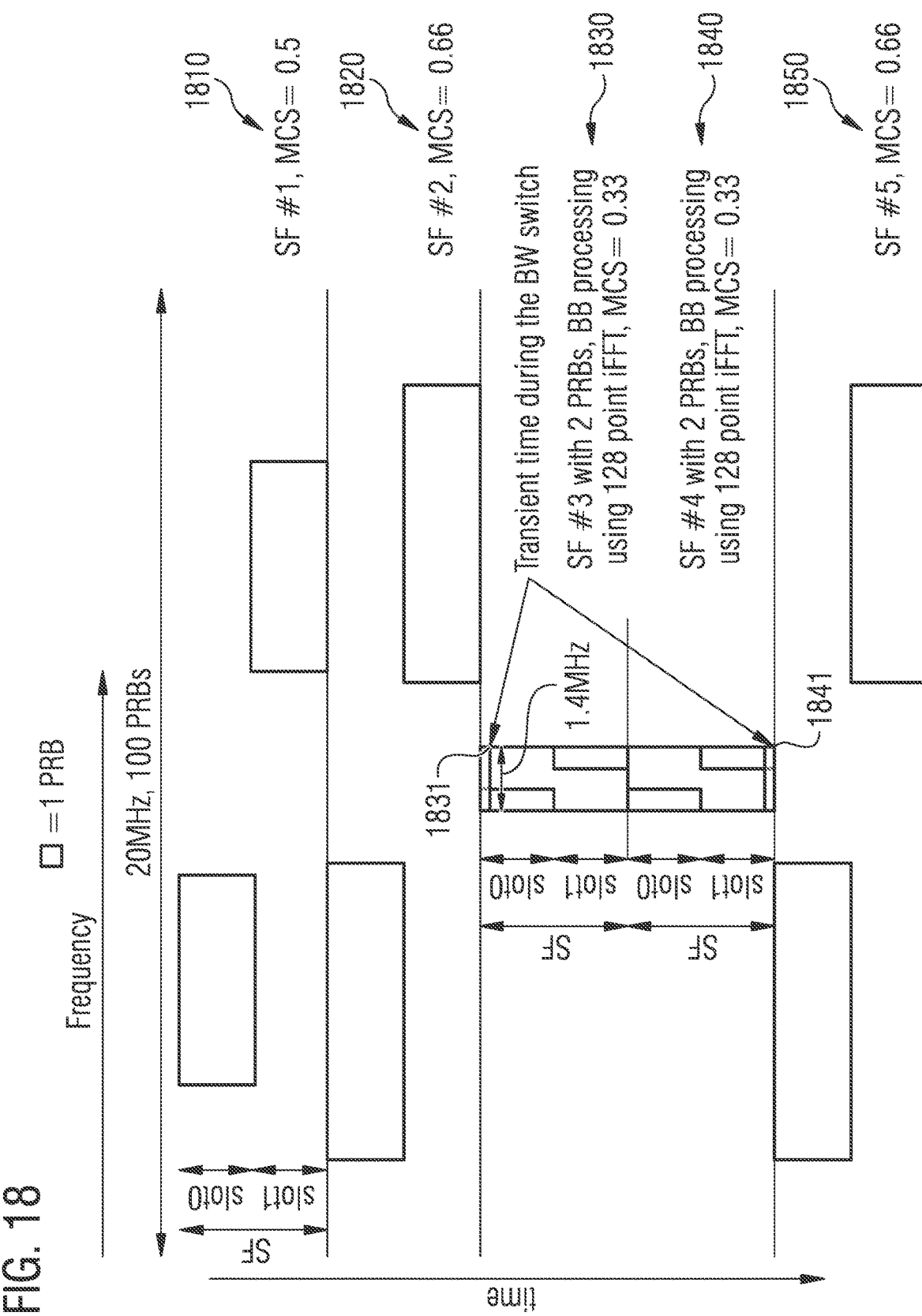
FIG. 18 illustrates an example of a bandwidth of a baseband transmit signal for a sequence of transmission time intervals.

This technique is illustrated in FIG. 18 depicting the bandwidth of a baseband transmit signal for a sequence of TTIs. Five consecutive TTIs 1810, 1820, 1830, 1840 and 1850 are illustrated in FIG. 18.

The threshold value for deciding on switching the bandwidth used for processing the baseband signal is set to 6 PRBs in the example of FIG. 18. 20 PRBs are allocated to the transmitter for TTI 1810. 28 PRBs are allocated to the transmitter for the TTIs 1820 and 1850. 2 PRBs are allocated to the transmitter for TTIs 1830 and 1840. That is, for TTIs 1810, 1820 and 1850, the baseband transmit signal is to be processed by the transmit path using a higher first bandwidth (e.g. 20 MHz) since the numbers of allocated PRBs are above the threshold. For TTIs 1830 and 1840, the baseband transmit signal may be processed by the transmit path using a lower second bandwidth (e.g. 1.4 MHz) since the numbers of allocated PRBs are below the threshold. Together with reduced bandwidth, the transmit path may further use an iFFT of reduced size (128 points instead of 2048 points) and/or a reduced sample rate (e.g. 1.92 MHz instead of 30.72 MHz) for processing the baseband transmit signal.

That is, bandwidth switching occurs between TTIs 1820 and 1830 as well as between TTIs 1840 and 1850. The adjustment of the switching time is based on the MCSs allocated to the different TTIs. In other words, adjusting the start time for changing the bandwidth from a first bandwidth to a second bandwidth may be based on information about a first MCS allocated to a first TTI and a second MCS allocated to the second TTI.

The decision to switch the bandwidth and the iFFT size is based on the previous, current TTI to be transmitted over the air and the received configuration for the next TTI. In FIG. 18, the MCS for TTI 1820 is higher than that of TTI 1830. Accordingly, the transient time 1831 is pushed to the start of TTI 1830. Likewise, since the MCS of TTI 1840 is lower than that of TTI 1850, the transient time 1841 is finished before the start of TTI 1850. Hence, the scheme "protects" the TTI with higher MCS from the transient effects because of the bandwidth an iFFT size change in a breathing transmitter. That is, FIG. 18 illustrates an example of an improved breathing transmitter, in which the transient during the iFFT size switching is shifted to the TTI with lower MCS.

Figure 19:
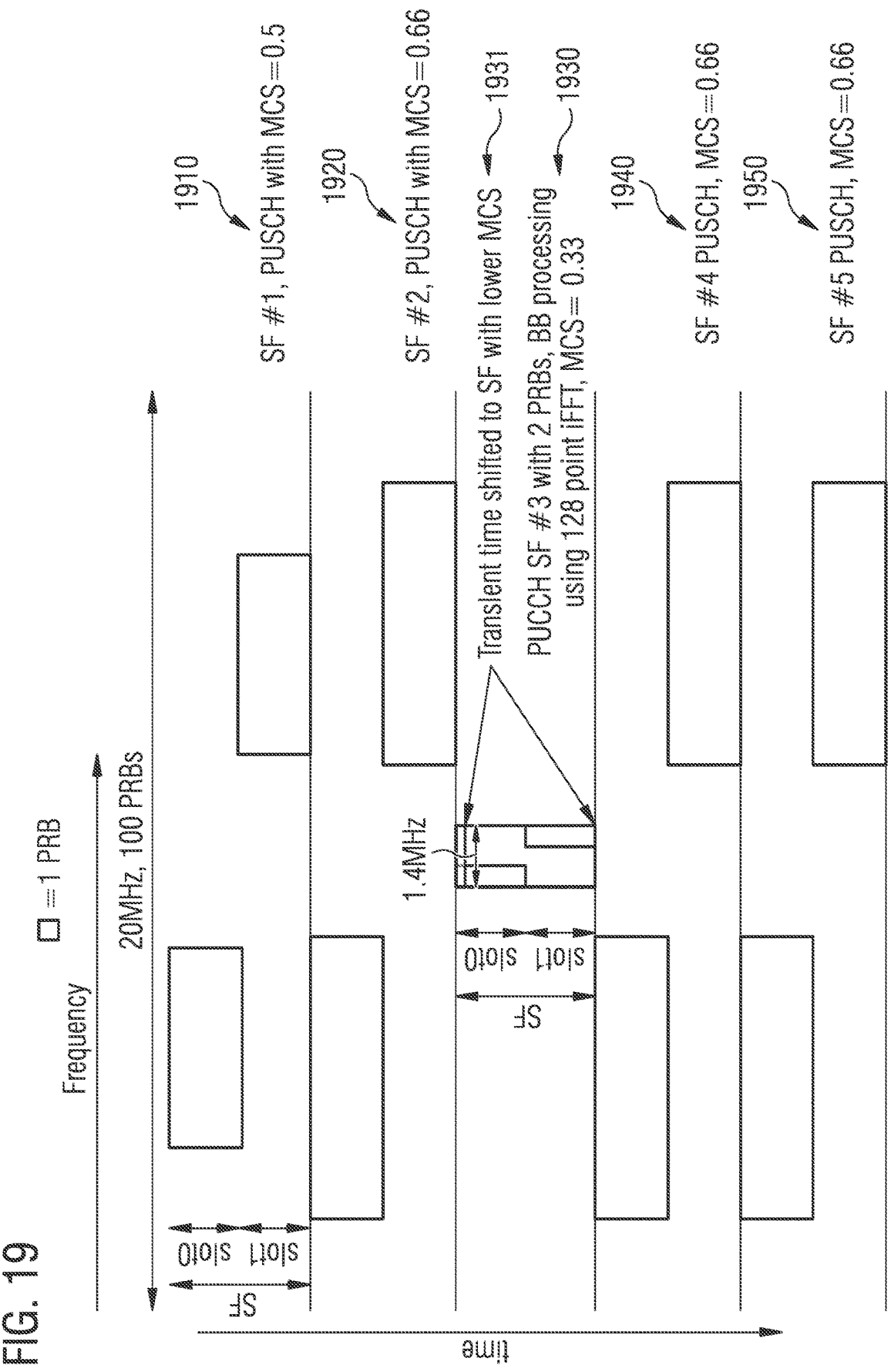
FIG. 19 illustrates another example of a bandwidth of a baseband transmit signal for a sequence of transmission time intervals.

Similarly, FIG. 19 illustrates the bandwidth of a baseband transmit signal for another sequence of TTIs. Five consecutive TTIs 1910, 1920, 1930, 1940 and 1950 are illustrated in FIG. 19.

In the example of FIG. 19, again a threshold of 6 PRBs is used. More than 6 PRBs are allocated to the transmitter for the TTIs 1910, 1920, 1940 und 1950. 2 PRBs are allocated to the transmitter for TTI 1930. That is, for TTIs 1910, 1920, 1940 und 1950, the baseband transmit signal is to be processed by the transmit path using a higher first bandwidth (e.g. 20 MHz) since the numbers of allocated PRBs are above the threshold. For TTI 1830, the baseband transmit signal may be processed by the transmit path using a lower second bandwidth (e.g. 1.4 MHz) since the number of allocated PRBs is below the threshold. Again, the size of an iFFT and a sample rate used for processing the baseband transmit signal may be reduced together with the bandwidth.

In the example of FIG. 19, the resource allocation changes in subsequent TTIs (e.g. since PUSCH, PUCCH and again PUSCH transmission is scheduled for consecutive TTIS 1920, 1930 and 1940). That is, bandwidth switching occurs between TTIs 1920 and 1930 as well as between TTIs 1930 and 1940. Comparing the MCSs TTIs 1920, 1930 and 1940, transmitter breathing may occur such that the transient periods 1931 are at the start and the end of PUCCH (i.e. TTI 1930). Since PUCCH transmission is more robustly encoded compared to PUSCH, the probability of PUCCH decoding errors is lower.

As indicated above, the information about the MCSs of the TTIs may comprise information about the coding rates of the data of the baseband transmit signal related to the respective TTIs. Hence, the proposed method may comprise comparing a first code rate of data of the baseband transmit signal related to a first TTI to a second code rate of data of the baseband transmit signal related to a second TTI. The first and the second code rate are based on the information about the first MCS allocated to the first TTI and the second MCS allocated to the second TTI. Further the method may comprise adjusting the start time for changing the bandwidth from a first bandwidth to a second bandwidth based on a time period required by the transmit path for changing the bandwidth from the first bandwidth to the second bandwidth, so that changing the bandwidth from the first bandwidth to the second bandwidth takes place while the transmit path processes data of the baseband transmit signal related to the one of the first TTI and the second TTI exhibiting the lower code rate.

For example, MCS deltas (i.e. differences between the MCSs of consecutive TTIs) for deciding on the position of the transient due to transmitter breathing may be adjustable (programmable). An optimum value which balances the power saving without sacrificing the system performance may, e.g., be based on lab/field measurements.

Figure 20:
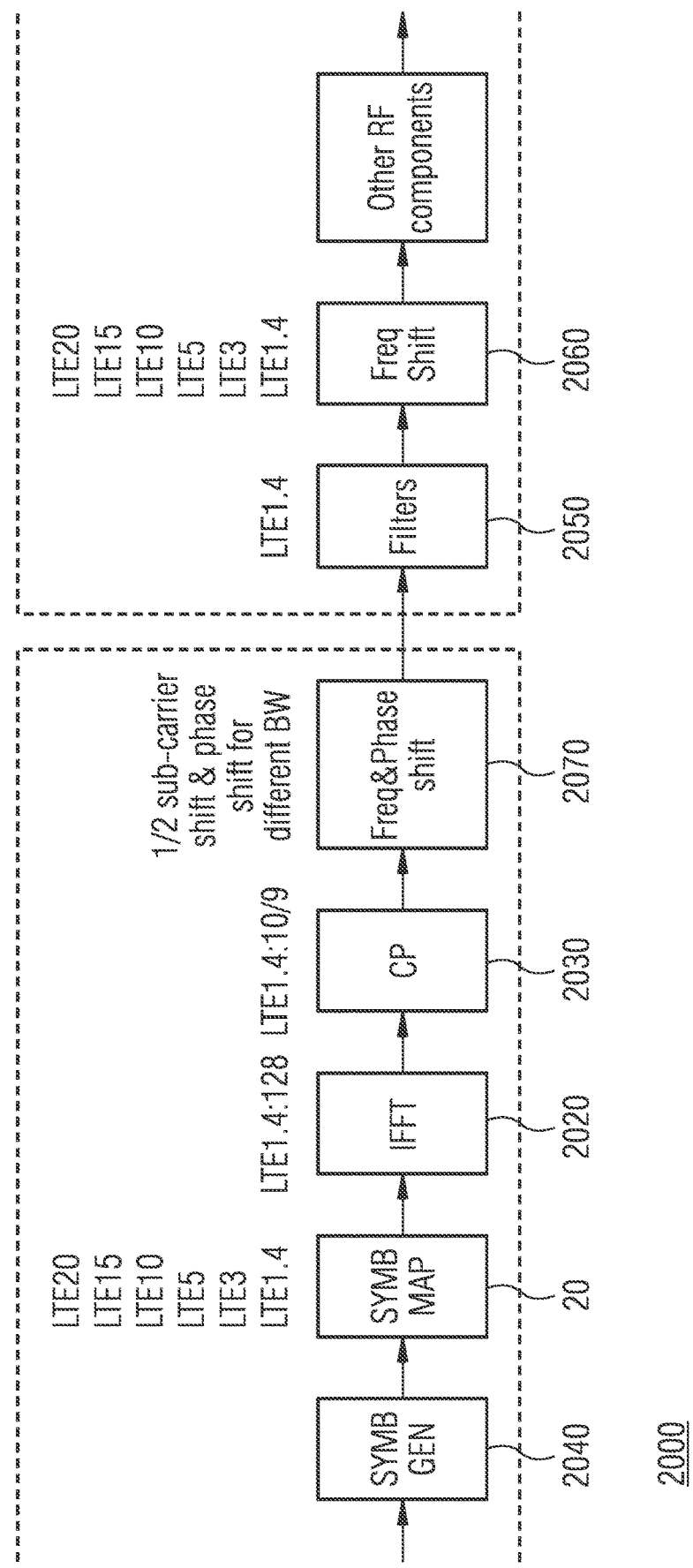
FIG. 20 illustrates an example of a transmitter.

An example of a transmitter 2000 using the proposed bandwidth controlled baseband processing is illustrated in FIG. 20. The transmitter 2000 is illustrated as transmitter for generating a radio frequency transmit signal according to the LTE standard. However, it is to be noted that the proposed bandwidth controlled baseband processing may be used for any other mobile communications standard, too.

The proposed bandwidth controlled baseband processing is implemented in transmitter 2000 in that the LTE symbols are generated in the baseband (e.g. zero-frequency or low frequencies) with a small iFFT for the small bandwidth and exploiting the roll-characteristic of the filter chain. The shift of the data related to the PRBs may then, e.g., be accomplished by adding a frequency control word to the input of a (digital) PLL which operates in a two-point manner (see FIG. 23 for further details).

Accordingly, a significant power saving in the presence of only a few allocated PRBs due to the smaller iFFT and the reduced sample rate throughout the DFE filter chain may be achieved.

Moreover, if the data related to the PRBs as computed by the (digital) baseband was placed at DC (i.e. zero frequency), it did not experience the roll-of characteristic of the IQ-filter chain. On the contrary, transmitter 2000 exploits the sharp roll-off characteristic of the existing filter chain to meet spectral mask requirements without additional filtering. This may lead to a smaller current consumption and less required are on a semiconductor chip.

If, e.g., six PRBs or less are allocated to transmitter 2000, the transmit path 2010 of transmitter 2000 may process the baseband signal with a bandwidth of only 1.4 MHz. This is illustrated in FIG. 20 by means of iFFT block 2020, the cyclic prefix block 2030 and the filtering block 2050 which are processing the baseband signal using a configuration for 1.4 MHz signal bandwidth. For example, the iFFT size might be 128 points, and the size of the cyclic prefix may be fixed for PUSCH/PUCCH data to normal (10/9) or extended (32) mode. Further, the transmit path 2010 comprises an additional frequency shift block 2060 to shift the signal to the wanted frequency (e.g. related to the bandwidth of the resulting radio frequency transmit signal expected by the serving base station).

Compared to processing the baseband signal using conventional large bandwidth processing (e.g. at 20 MHz bandwidth), the symbol mapping block 2040 and the frequency & phase shift block 2070 for applying the ½ sub-carrier shift are modified. In the symbol mapping block 2040, different zero padding positions are used. The frequency & phase shift block 2070 adds another phase shift for taking into account the different bandwidths used for processing.

That is, if the baseband signal is processed with a smaller second bandwidth instead of the larger first bandwidth of the resulting radio frequency transmit signal that is generated by the transmit path 2010 based on the baseband transmit signal, the transmit path 2010 is controlled to shift a phase of the baseband transmit signal processed by the transmit path using the second bandwidth. For example, shifting the phase of the baseband transmit signal by the frequency & phase shift block 2070 may be based on a difference between a frequency of data of the baseband transmit signal related to an allocated PRB (when processed using the smaller second bandwidth) and a desired frequency of the data at the first bandwidth. That is, shifting the phase of the baseband transmit signal may be based on the difference between the actual frequency position of data related to an allocated PRB used at signal processing using the smaller second bandwidth, and the frequency position of the data if it was processed using the conventional (and larger) first bandwidth. Additionally, shifting the phase of the baseband transmit signal may further be based on a length of the cyclic prefix used by the transmit path 2010 for the second bandwidth.

By means of the above blocks, the transmit path 2010 filters the baseband transmit signal. In order to make use of the sharp roll-off characteristic of the filter chain, starting from an edge of the frequency range, data of the baseband transmit signal related to one or more allocated PRBs is continuously arranged within a frequency range used by the transmit path 2010 for processing the baseband transmit signal based on the used (e.g. the small) bandwidth. That is data related to allocated PRBs is placed at the edge of the filter chain in the frequency domain in order to exploit the roll-off characteristic of the filter chain.

In the following, a few mathematical expression are given for describing how the frequency & phase shift block 2070 in the baseband domain and the frequency shift block 2060 in the radio frequency domain of the transmit path 2010 work together to generate the wanted radio frequency signal. In the following exemplary expressions, it is assumed that the wanted radio frequency transmit signal exhibits a bandwidth of 20 MHz (i.e. the radio frequency transmit signal is a LTE20 signal).

The time continuous signal for an antenna port p of a Single-Carrier Frequency-Division Multiple Access (SC-FDMA) symbol l in the uplink slot is defined by:

$$s_l^{(p)}(t) = \sum_{k=-\lfloor N_{RB}^{UL} N_{sc}^{RB}/2 \rfloor}^{\lfloor N_{RB}^{UL} N_{sc}^{RB}/2 \rfloor - 1} a_{k^{(-)},l}^{(p)} \cdot e^{j2\pi(k+1/2)\Delta f(t-N_{CP,l}T_s)} \qquad (1)$$

To make it easier to understand, only a single sub-carrier is taken into consideration in the following expressions, but the single sub-carrier may be extended to multi-tones by summing these single tones. Supposing that the sampling rate is 30.72 MHz, a simplified expression for expression (1) is $$s(n) = a_k \cdot \exp\left(j2\pi(k+1/2)\frac{n-N_{cp}}{2048}\right). \tag{2}$$

k+½ is the actual location of sub-carrier k at the frequency domain. Replacing k+½ by p+q in expression (2), where q means the offset inside the 6 PRBs of sub-carrier k, and p means how many sub-carriers it could shift from q to k+½. Expression (2) may be further re-written as $$s_{p,q}(n) = a_k \cdot \exp\left(j2\pi(p+q)\frac{n-N_{cp}}{2048}\right), \tag{3}$$

which represents the wanted radio frequency transmit signal.

Supposing that the output of the IFFT for a SC-FDMA symbol is $$a_k \cdot \exp\left(j2\pi q \frac{n-N_{cp}}{2048}\right) n = 0, 1, \ldots, 2047, 2048, \ldots, 2048 + N_{cp} - 1 \tag{4}$$

and that the frequency shift block 2060 in the radio frequency domain of the transmit path 2010 performs a phase continuous up-conversion to the baseband signal $$\exp\left(j2\pi p \frac{n}{2048}\right) \tag{5}$$
$$n = 0, 1, 2, \ldots, 2048, \ldots, \ldots$$

without consideration of the possible phase rotation, the up-converted BB output is:

$$s'_{p,q}(n) = a_k \cdot \exp\left(j2\pi(p+q)\frac{n-N_{cp}}{2048}\right) \cdot \exp\left(j2\pi P \frac{N_{cp}}{2048}\right). \tag{6}$$

Comparing expressions (3) and (6), the difference between the wanted signal and the shifted BB signal is:

$$\exp\left(j2\pi p \frac{N_{cp}}{2048}\right). \tag{7}$$

When this difference is compensated by the frequency & phase shift block 2070 in the baseband domain, the resulting signal is:

$$s''_{p,q}(n) = s'_{p,q}(n) \cdot \exp\left(-j2\pi p \frac{N_{cp}}{2048}\right) = s_{p,q}(n). \tag{8}$$

The above equations and formulas are based on single tone, but may be extended to multi-tones within 6 PRBs. Then, with the frequency shift, the wanted RF signal is generated from the baseband with a small size IFFT.

But noticing that in expressions (4) and (5), the definition of n is not completely the same, only in the first SC-FDMA symbol (l=0) they are the same. n is accumulated in expression (5) but not in expression (4), so for the lth (l~=0)) SC-FDMA symbol $$s''_{p,q}(n) = s'_{p,q}(n) \cdot \exp\left(-j2\pi p \frac{N_{cp,l} + \ldots + N_{cp,0} + l \cdot 2048}{2048}\right) = s_{p,q}(n) \tag{9}$$

and $$s_{p,q}(n) = a_k \cdot \exp\left(j2\pi q \frac{n-N_{cp}}{2048}\right) \exp \tag{10}$$

$$\left(-j2\pi p \frac{N_{cp,l} + \ldots + N_{cp,0} + l \cdot 2048}{2048}\right) \exp\left(j2\pi p \frac{n}{2048}\right)$$

For example, the three exponential operations in expression (10) may be implemented separately in the iFFT block 2020, the frequency & phase shift block 2070 and the frequency shift block 2060.

Figure 21:
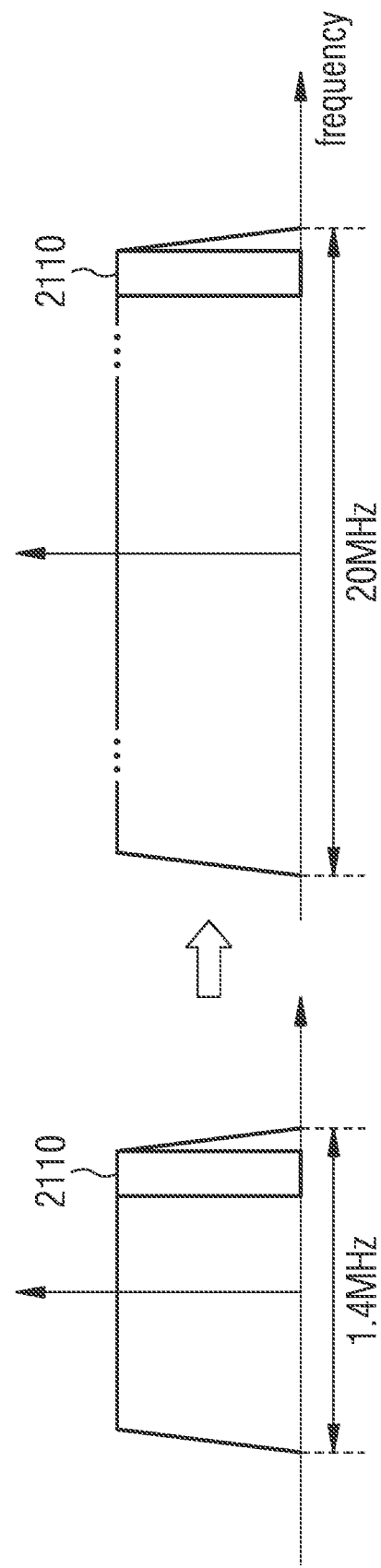
FIG. 21 illustrates an example of a frequency shift.

The shift of signal generated from the narrow to the wanted frequency is illustrated in FIG. 21. On the left side of FIG. 21, the baseband transmit signal was processed using 1.4 MHz bandwidth. The baseband transmit signal comprises data 2110 related to a single allocated PRB. In order to make use of the sharp roll-off characteristic, the data 2110 related to a single allocated PRB is placed at the edge of the frequency range that is dictated by the small bandwidth of 1.4 MHz. Using the frequency shift block 2060, the frequency of the baseband transmit signal, i.e. of the data 2110 related to a single allocated PRB, is shifted by a frequency shift to a frequency assigned (related) to the bandwidth of 20 MHz since the serving base station expects the resulting radio frequency transmit signal to have a bandwidth of 20 MHz.

Figure 22:
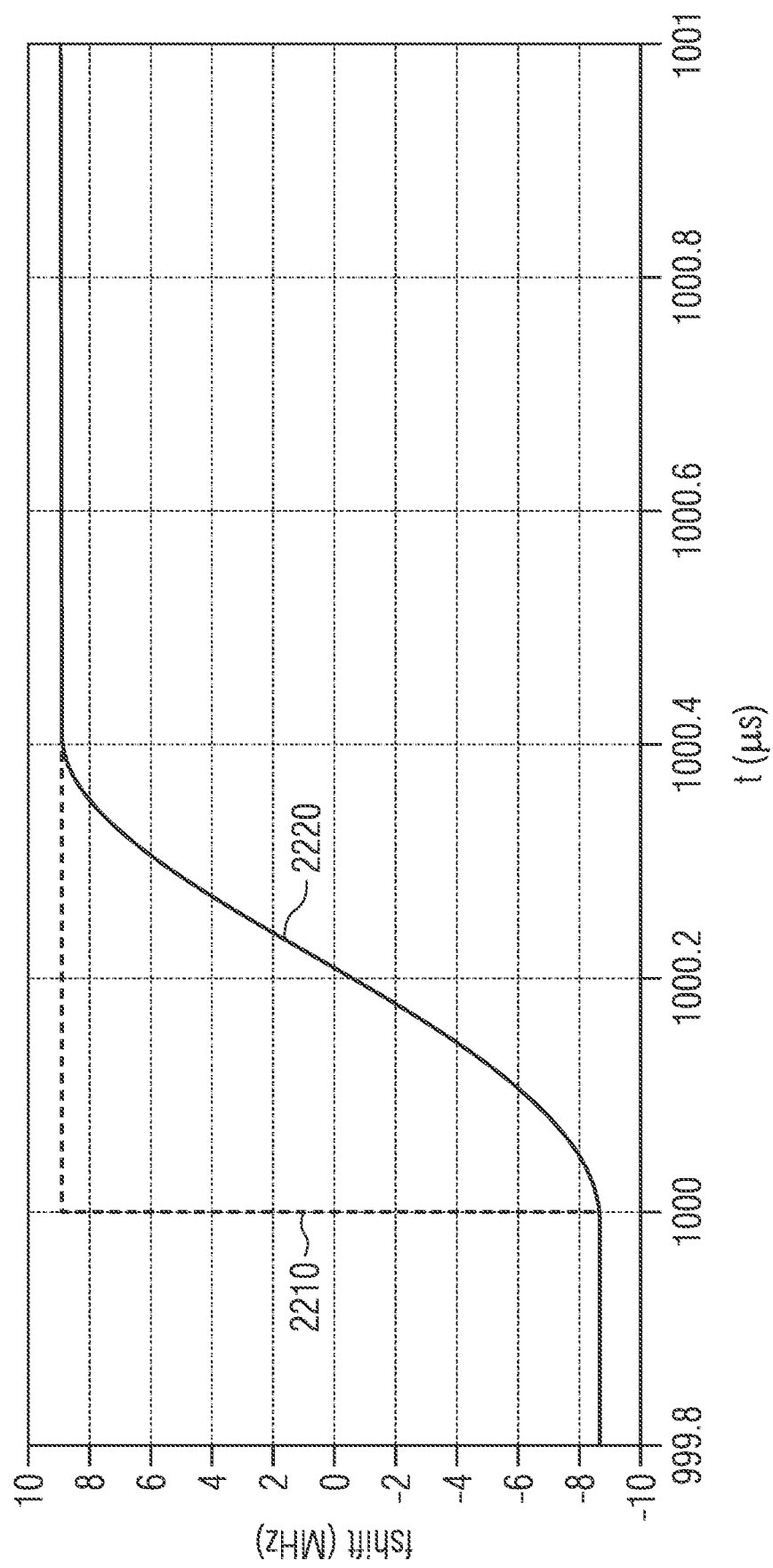
FIG. 22 illustrates another example of a frequency shift.

Two different embodiments of the applied frequency shift are illustrated in FIG. 22. Line 2210 illustrates a rectangular frequency step in the time domain, whereas line 2220 illustrates a smoothed trajectory. In this specific case, the line 2220 follows a sinusoidal shape. However, other characteristics may be used as well (e.g. erfc(x), sin^2(x), etc.). In another embodiment, a simple low-pass filter may be applied to the rectangular frequency step so that the output of the filter follows a smoothed step-response. In other words, the frequency shift may relate to one of a single rectangular frequency step in the time domain, a plurality of rectangular frequency steps in the time domain, or a non-rectangular frequency trajectory in the time domain.

A variety of examples for controlling a transmit path to implement the frequency shift are illustrated in FIGS. 23 to 26.

Figure 23:
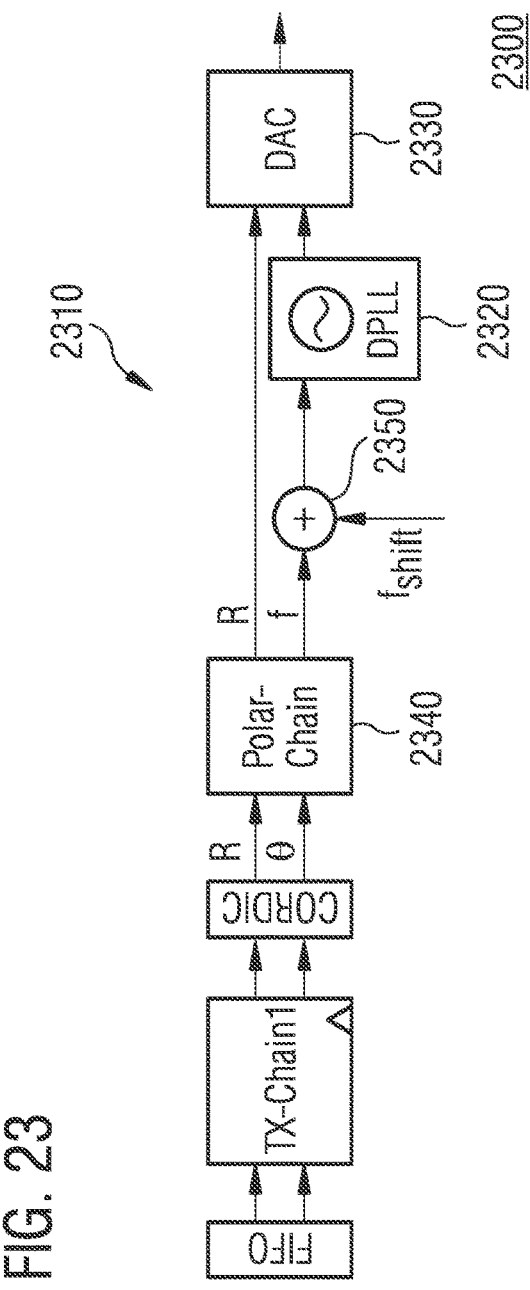
FIG. 23 illustrates an example of a transmitter for applying a frequency shift.

FIG. 23 illustrates a transmit path 2310 of a transmitter 2300 using polar modulation for generating the radio frequency transmit signal based on the baseband transmit signal. The transmit path 2310 is controlled to shift the frequency of the baseband transmit signal by modifying the control of (digital) PLL 2320 that supplies an oscillation signal to DAC 2330 of the transmit path 2310. In particular, a combiner 2350 combines a frequency control f from processing circuitry 2340 of the transmit path 2310 that operates in the polar domain with another frequency control word $f_{shift}$ indicative of the frequency shift. That is, the frequency step is applied to the frequency control word generated by the processing circuitry 2340.

Figure 24:
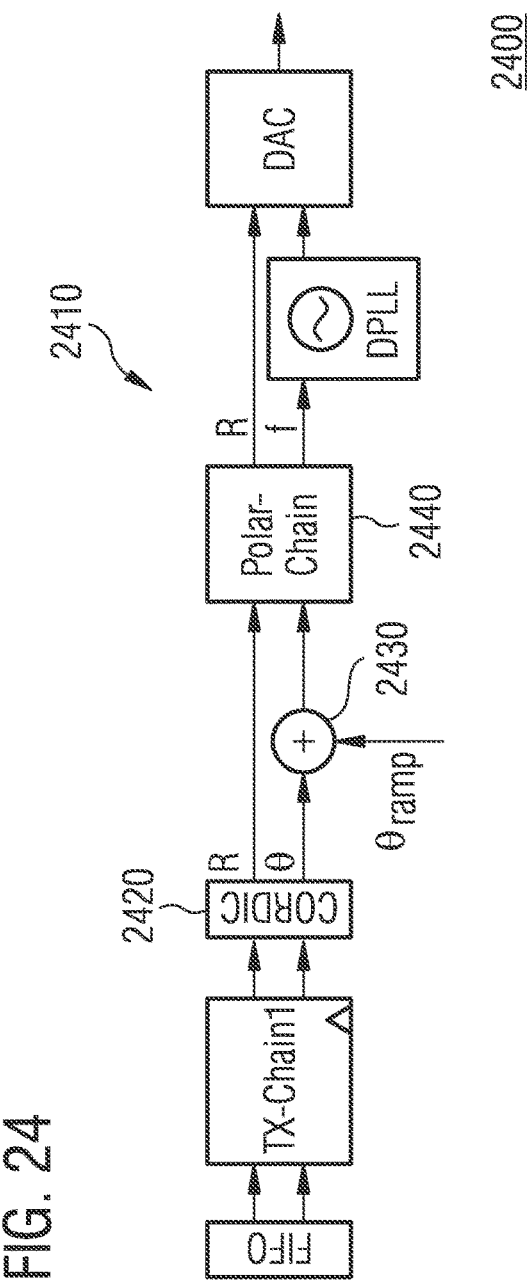
FIG. 24 illustrates another example of a transmitter for applying a frequency shift.

An alternative implementation is illustrated in FIG. 24. Transmit path 2410 of transmitter 2400 in FIG. 24 again uses polar modulation for generating the radio frequency transmit signal based on the baseband transmit signal. In the example of FIG. 24, the information about the frequency shift is applied to the phase information at the Coordinate Rotation Digital Computer (CORDIC) 2420 output by means of combiner 2430. Since the phase is the integral of the frequency, a frequency step corresponds to a ramp. In other words, transmit path 2410 is controlled to shift the frequency of the baseband transmit signal by modifying phase information Θ input to processing circuitry 2430 of the transmit path 2410 that operates in the polar domain by a phase value $\Theta_{ramp}$ related to the frequency shift.

Figure 25:
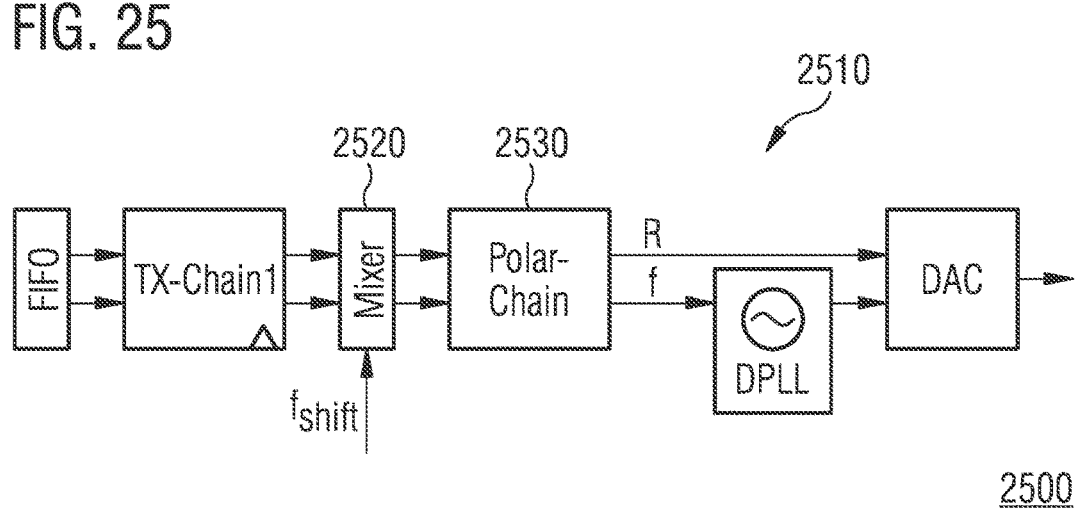
FIG. 25 illustrates still another example of a transmitter for applying a frequency shift.

A still further implementation is illustrated in FIG. 25, which illustrates a transmit path 2510 of transmitter 2500 that again uses polar modulation for generating the radio frequency transmit signal based on the baseband transmit signal. For transmit path 2510, the frequency shift is performed in IQ domain through a mixer 2520 of the transmit path 2510 which performs the operation $(i+j\cdot q)\cdot \exp(j2\pi\cdot f_{shift}\cdot t)$. In other words, transmit path 2410 is controlled to shift the frequency of the baseband transmit signal by controlling mixer 2520 to shift the baseband transmit signal by the frequency shift $f_{shift}$, and to supply the frequency shifted baseband transmit signal to processing circuitry 2530 of the transmit path 2510 that operates in the polar domain.

Figure 26:
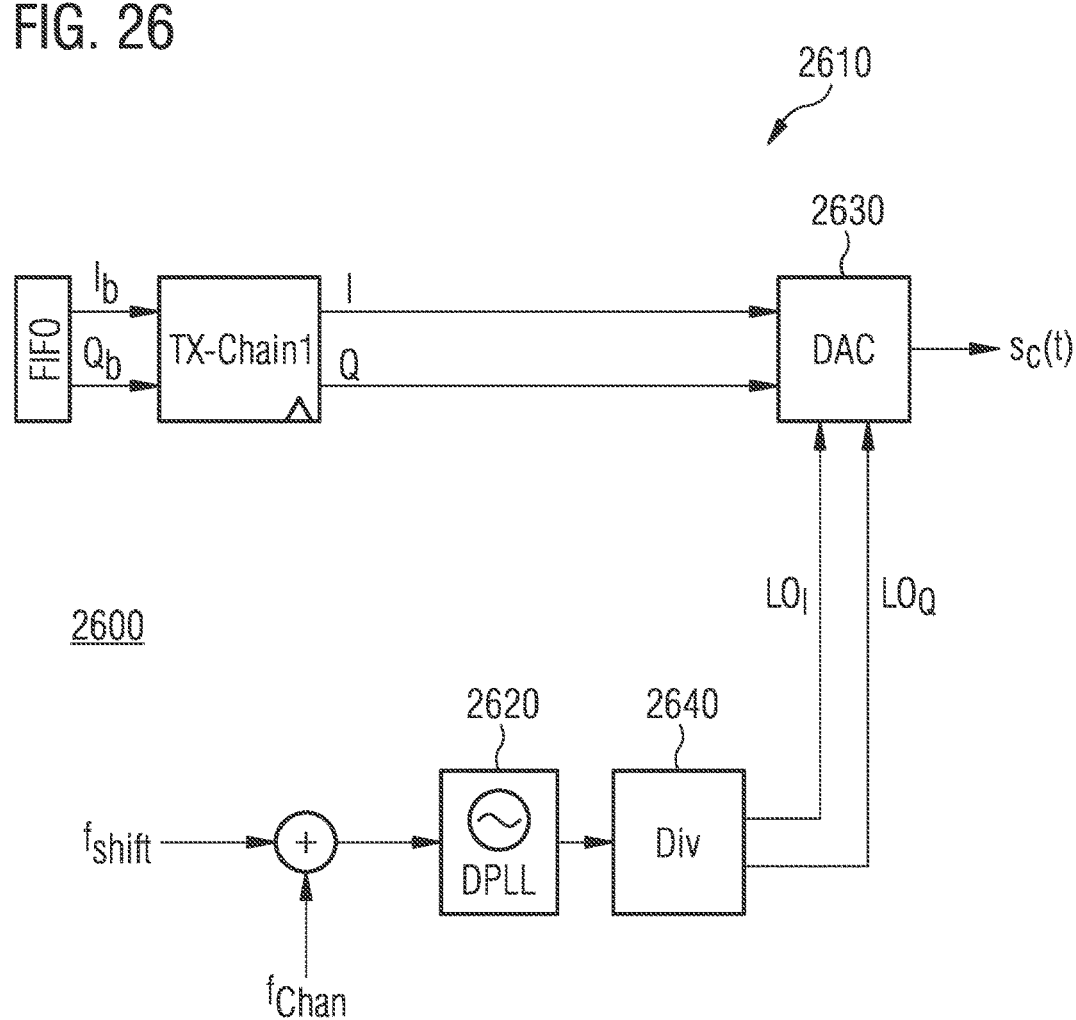
FIG. 26 illustrates a further example of a transmitter for applying a frequency shift.

In FIG. 26, an implementation for Cartesian modulation is illustrated. Transmit path 2610 of transmitter 2600 uses Cartesian modulation for generating a radio frequency transmit signal based on the baseband transmit signal. In the Cartesian modulator 2610, the frequency shift is applied by changing the control word of PLL 2620 that generates an oscillation signal for a DAC 2630 of the transmit path 2610 (here the oscillation is further frequency divided by divider 2640 before it is supplied to DAC 2630). To accomplish a fast frequency shift, the frequency step is added in a two-point modulation manner. In other words, transmit path 2610 is controlled to shift the frequency of the baseband transmit signal by controlling PLL 2620 to operate as a two-point modulator based on a first frequency control word $f_{Chan}$ indicative of a carrier frequency of the radio frequency transmit signal and a second frequency control word $f_{shift}$ indicative of the frequency shift.

Figure 27:
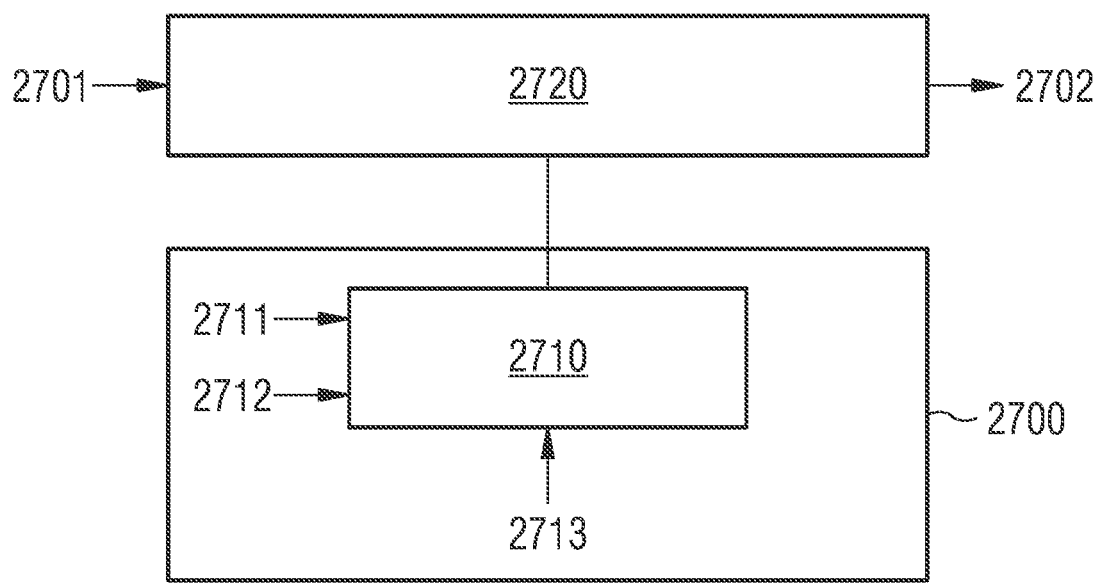
FIG. 27 illustrates an example of an apparatus for controlling a bandwidth used for processing a baseband transmit signal.

In order to summarize the above described bandwidth control, FIG. 27 further illustrates an apparatus 2700 for controlling a bandwidth used for processing a baseband transmit signal 2701 by a transmit path 2720 of a transmitter. Based on the baseband transmit signal 2701, the transmit path 2720 generates a radio frequency transmit signal 2702. The apparatus 2700 comprises a processor circuit 2710. The processor circuit 2710 is configured to generate a first comparison result by comparing, to a threshold value 2713, a first number of PRBs 2711 allocated to the transmitter for a first TTI. Further the processor circuit 2710 is configured to generate a second comparison result by comparing, to the threshold value 2713, a second number of PRBs 2712 allocated to the transmitter for a subsequent second TTI.

Based on the first and the second comparison results, the processor circuit 2710 is configured to adjust the bandwidth used for processing the baseband transmit signal 2701 by transmit path 2720. For example, the processor circuit 2710 may be configured to supply a control signal to the transmit path 2720 or to processing circuitry of the transmit path 2720 that is indicative of the bandwidth to be used for processing the baseband transmit signal 2701.

By adjusting the bandwidth based on the actual number of allocated PRBs for a certain TTI, processing the baseband transmit signal 2701 with an unnecessary high bandwidth may be avoided. As a consequence, a power consumption of the transmit path 2720 may be lowered. In other words, a power-efficiency of the transmit path 2720 may be increased by apparatus 2700.

The processor circuit 2710 may, in some examples, further be configured to execute one or more additional optional features corresponding to one or more aspects of the proposed technique for controlling a bandwidth used for processing a baseband transmit signal in a transmit path or one or more examples described above.

Generally speaking, some examples of the present disclosure relate to a means for controlling a bandwidth used for processing a baseband transmit signal by a transmit path of a transmitter. The means comprises a means for generating a first comparison result by comparing, to a threshold value, a first number of PRBs allocated to the transmitter for a first TTI. Further, the means comprises a means for generating a second comparison result by comparing, to the threshold value, a second number of PRBs allocated to the transmitter for a subsequent second TTI. The means additionally comprises a means for adjusting the bandwidth based on the first and the second comparison results.

In the following another technique for controlling a bandwidth used for processing a baseband transmit signal in a transmit path is described in connection with FIGS. 28 to 30.

Figure 28:
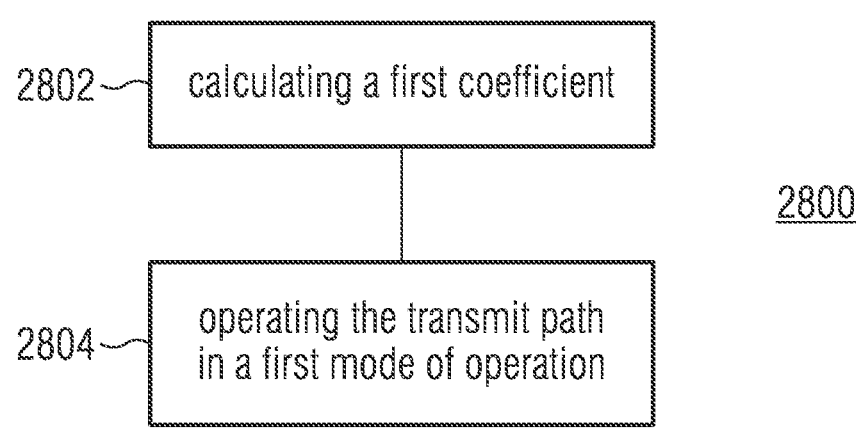
FIG. 28 illustrates a flowchart of another example of a method for controlling a bandwidth used for processing a baseband transmit signal.

FIG. 28 illustrates another method 2800 for controlling a bandwidth used for processing a baseband transmit signal by a transmit path of a transmitter. Method 2800 comprises calculating 2802 a first coefficient indicative of a power saving due to processing the baseband transmit signal using a lower second bandwidth instead of a first bandwidth. If the first coefficient exceeds a first threshold value for a first time period, method 2800 further comprises operating the transmit path in a first mode of operation in which the bandwidth is switchable from the first bandwidth to the second bandwidth.

If the first coefficient exceeds the first threshold value, a significant saving in power by switching to lower bandwidth operation may be achieved. Accordingly, the transmit path is operated in the first mode of operation which allows to switch from first bandwidth to the lower second bandwidth.

On the contrary, if the first coefficient does not exceed the first threshold value for the first time period, method 2800 may further comprise operating the transmit path in a second mode of operation in which the bandwidth is non-adjustably set to the first bandwidth. The low value of the first coefficient may indicate that there is no significant saving in power by switching to a lower bandwidth. Accordingly, it may be advantageous for the transmit path to continue using the first bandwidth.

As discussed above, switching a bandwidth/sampling/size of an iFFT used for processing the baseband transmit signal by the transmit path may cause signal degradation of the resulting radio frequency transmit signal. By calculating the first coefficient and comparing it to the threshold, method 2800 may allow to balance the penalty and the benefit of switching. In other words, method 2800 may be understood as a cost metric.

The first coefficient may be calculated for each TTI anew. For example, for first and second TTIs immediately succeeding each other, calculating 2802 the first coefficient may comprise calculating the first coefficient for a first TTI, and calculating the first coefficient for a second TTI based on the first coefficient.

Operating 2804 the transmit path in the first mode of operation may, e.g., comprise changing the bandwidth from the first bandwidth to the second bandwidth, if a number of PRBs allocated to the transmitter for a TTI is zero. That is, method 2800 may use available transmission gaps (i.e. empty TTIs) for switching in order to avoid signal degradation.

On the other hand, if no transmission gaps are available, a penalty metric may be used for deciding on switching to the lower second bandwidth.

For example, if a non-zero number of PRBs is allocated to the transmitter for each TTI within a second time period, operating 2804 the transmit path in the first mode of operation may comprise calculating for at least one TTI a second coefficient indicative of a signal degradation of a radio frequency transmit signal generated by the transmit path due to changing the bandwidth from the first bandwidth to the second bandwidth. The radio frequency transmit signal is generated by the transmit path based on the baseband transmit signal. If the second coefficient is smaller than a second threshold value, operating 2804 the transmit path in the first mode of operation may further comprise changing the bandwidth from the first bandwidth to the second bandwidth. That is, if the penalty (signal degradation) due to switching the bandwidth is low enough, the bandwidth used by the transmit path for processing the baseband transmit signal may be lowered although no natural transmission gap (i.e. empty TTI) is available.

Accordingly, operating 2804 the transmit path in the first mode of operation may further comprise adjusting a start time for changing the bandwidth from the first bandwidth to the second bandwidth. Also, operating 2804 the transmit path in the first mode of operation may comprise adjusting a start time for changing the bandwidth from the second bandwidth back to the first bandwidth. Further details of how to adjust the start time for changing the bandwidth are explained below in connection with FIG. 29.

Further, if the first coefficient falls below the first threshold value, the method 2800 may further comprise switching from operating 2804 the transmit path in the first mode of operation to operating the transmit path in the second mode of operation in which the bandwidth used for processing the baseband transmit signal is non-adjustably set to the first bandwidth. That is, if no significant saving in power by switching to a lower bandwidth is achievable any more, the transmit path is controlled to again use the first bandwidth continuously for processing the baseband transmit signal.

In a cell of a cellular network, the serving base station typically allocates a certain bandwidth for radio frequency transmit signals to a mobile device. Hence, method 2800 may further ensure that the frequency of the baseband transmit signal complies with the allocated band-width. For example, if a bandwidth of a radio frequency transmit signal generated by the transmit path based on the baseband transmit signal is the first bandwidth (i.e. the allocated bandwidth is the first bandwidth), method 2800 may further comprise controlling the transmit path to shift a frequency of the baseband transmit signal processed by the transmit path using the second bandwidth to a frequency assigned to the first bandwidth. As a consequence, after shifting the baseband transmit signal to the frequency assigned to the first bandwidth, the baseband transmit signal is at the same frequency position as if it had been processed by the transmit path using the higher first bandwidth. Accordingly, the generation of the resulting radio frequency transmit signal is not affected by processing the baseband transmit signal using the lower second bandwidth. However, since the baseband transmit signal was processed by the transmit path using the lower second bandwidth, the baseband transmit signal is processed more power-efficient.

In addition to the bandwidth, also further processing parameters within the transmit path may be adapted. For example, method 2800 may further comprise controlling the transmit path to process the baseband transmit signal using a first sample rate for the first bandwidth, and controlling the transmit path to process the baseband transmit signal using a second sample rate for the second bandwidth. Further, method 2800 may comprise controlling the transmit path to process the baseband transmit signal using an inverse Fourier transformation (e.g. an iFFT) of a first size for the first bandwidth, and controlling the transmit path to process the baseband transmit signal using an inverse Fourier transformation of a second size for the second bandwidth. Accordingly, a lower sample rate and/or an inverse Fourier transformation of smaller size may be used together with a smaller bandwidth for processing the baseband transmit signal. By adapting one or more further processing parameters, the processing of the baseband transmit signal by the transmit path may be further optimized in terms of energy-efficiency.

Switching between sampling rates may involve signal degradation due to, e.g., filter delays and other baseband/radio frequency limitations. Method 2800 may, hence, allow to balance the penalty and the benefit of switching and saving in power by using knowledge on transmission gaps, selecting the TTI (SF) for switching based on a metric or pro-actively switching back to the larger bandwidth based on predicting traffic patterns. Method 2800 may, hence, be understood as a kind of a state machine based holistic technique that utilizes a penalty and power save metric based on traffic patterns as decision criteria for switching dynamically. Method 2800 may allow to extract the benefit of switching to a lower sample rate/band-width/ . . . while minimizing the impact of signal quality degradation due to the switching.

The proposed method attempts to take advantage of the power savings due to the lower band-width/sample rate/etc. operation of the transmit path while minimizing at the same time the impact of switching by using a kind of a state machine approach which may take one of the following actions:

Placing the switch point in naturally available gaps if possible (e.g. measurement gaps; TDD receive SFs; Discontinuous Reception, DRX, gaps; cell SRS; PUCCH Discontinuous Transmission, DTX). The state machine may be consciously aware of available gaps due to base station configuration and may inherently bias waiting thresholds to switch in configured gaps whenever possible.

In no gaps are available, the state machine may pick a TTI (SF) for switching based on a calculated penalty metric. The penalty metric may be derived based on the content being carried in the current SF, code rate and/or Quality of Service (QoS) of the traffic. On top, the transmit power in the SF selected for switching may be boosted (by a small amount) to offset the loss in quality.

In other words, the method comprise increasing a power of a radio frequency transmit signal generated by the transmit path based on the baseband transmit signal for a signal section of the radio frequency transmit signal relating to data of the baseband transmit signal that is processed by the transmit path while the bandwidth is changed from the first bandwidth to the second bandwidth, or vice versa.

For example, the following SFs (TTIs) may be biased to have low penalty and, hence, favor switching:

a) PUCCH subframes carrying an Acknowledgment (ACK)/Non-Acknowledgment (NACK) when downlink traffic has low QOS. Further, PUCCH is well protected and few samples being degraded in PUCCH should not impact decoding.

b) PUCCH subframes carrying Channel Quality Indicator (CQI)/Rank Indicator (RI), if the channel condition is quite static. Hence, missing the CQI/RI will not hurt performance.

c) PUSCH subframes carrying low priority data (low QoS).

In all states, the state machine may continuously evaluate a save metric based on, e.g., current transmit power, duty cycle of transmission, percentage of time spent in low bandwidth and/or traffic type. A high value of the metric may indicate significant saving in power by switching to lower bandwidth operation. Conversely, lower value of metric indicates that there may be no significant saving in power by switching to lower bandwidth. Accordingly, it may be better if the mobile device operates at the bandwidth allocated (expected) by the serving cell. If the duty cycle of high bandwidth transmissions or the traffic QoS goes up during operation, the save metric may be automatically lowered to favor a return (or stick) to high bandwidth/sample rate/etc. operation, and vice versa. That is, the state machine may adapt to on-going traffic patterns.

Also, the state machine may proactively switch back to higher bandwidth/sample rate/etc. based on information from higher layers like Buffer Status Report (BSR), type of traffic expected (QoS, bandwidth). Hence, the state machine may take action based on predicted future traffic patterns. This may, e.g., be done by instantly lowering the save metric when the BSR indicates large pending data to be sent to the base station.

In other words, operating the transmit path in the first mode of operation may comprise changing the bandwidth from the lower second bandwidth back to the first bandwidth, if one of the following conditions occurs:

1) an amount of pending data for transmission exceeds a third threshold value;

2) a predefined type of data is scheduled for transmission in a future TTI; or 3) a number of PRBs exceeding a threshold value is allocated to the transmitter for a future TTI.

Figure 29:
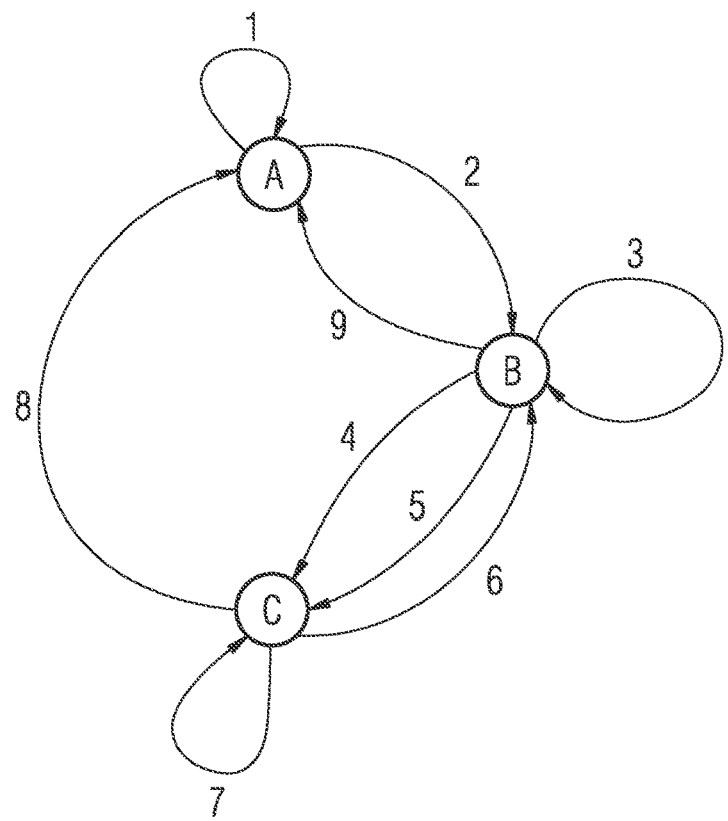
FIG. 29 illustrates an example of a state machine implementing the method for controlling a bandwidth used for processing a baseband transmit signal.

FIG. 29 illustrates a state machine based implementation of the proposed method for controlling a bandwidth used for processing a baseband transmit signal by a transmit path of a transmitter.

The state machine comprises three states A, B and C. State A denotes a high bandwidth/high sample rate/big size of iFFT/etc. operation of the transmit path. The mobile device/transmit-ter/transmit path is not prepared for any bandwidth/sample rate/iFFT size/etc. switch and uses a fixed bandwidth/sample rate/iFFT size/etc. (e.g. as dictated by the cell bandwidth). That is, state A corresponds to a mode of operation of the transmit path in which the bandwidth used for processing the baseband transmit signal is non-adjustably set to a first bandwidth.

State B denotes also a high bandwidth/high sample rate/big size of iFFT/etc. operation of the transmit path. However, the mobile device/transmitter/transmit path is actively looking to switch to a lower bandwidth/sample rate/iFFT size/etc. if possible.

State C denotes low bandwidth/low sample rate/small size of iFFT/etc. operation of the transmit path. The mobile device/transmitter/transmit path may try to stay in this state as long as the conditions are favorable.

That is, states B and C correspond to another mode of operation of the transmit path in which the bandwidth used for processing the baseband transmit signal is switchable from the first bandwidth to a lower second bandwidth, and vice versa.

The state machine (implemented in, e.g., a mobile device) starts in state A and evaluates a power safe benefit $P_{save}$ to switch to lower bandwidth/lower sample rate/smaller size of iFFT/etc. If the metric is above a certain threshold $P_{save\_threshold}$ for a continuous duration of $P_{save\_T1}$ (e.g. some milliseconds), the state machine switches to state B via transition path 2. Else, the state machine continues to stay in state A (indicated by path 1) and does not attempt to switch to lower bandwidth/lower sample rate/smaller size of iFFT/etc.

In other words, a first coefficient $P_{save}$ indicative of a power saving due to processing the baseband transmit signal using a lower second bandwidth instead of a first bandwidth is calculated. If the first coefficient $P_{save}$ exceeds a first threshold value $P_{save\_threshold}$ for a first time period $P_{save\_T1}$, the transmit path is operated in a first mode of operation in which the bandwidth is switchable from the first bandwidth to the second bandwidth. If the first coefficient $P_{save}$ does not exceed the first threshold value $P_{save\_threshold}$ for the first time period $P_{save\_T1}$, the transmit path is operated in a second mode of operation in which the bandwidth is non-adjustably set to the first bandwidth.

The first coefficient (i.e. the power saving benefit) for a second TTI may be calculated based on an expression which is mathematically correspondent to $$P_{save}(TTI_2) = (1-v) \cdot P_{save}(TTI_1) + v \cdot P_{inst} \quad (11),$$

with $P_{save}(TTI_2)$ denoting the first coefficient for the second TTI, $P_{save}(TTI_1)$ denoting the first coefficient for a preceding first TTI, v denoting a constant (e.g. the innovation factor for the Infinite Impulse Response, IIR, filtered metric), and $P_{inst}$ denoting a power saving potential for a current transmission time interval. For example, $P_{inst}$ may be zero in case of a PUSCH transmission using full system bandwidth and a maximum value $P_{max}$ in case lowest bandwidth transmission is sufficient.

From state B, the state machine attempts to move to state C via transition path 4 at the first available "natural" opportunity by looking for transmission gaps as mentioned earlier. Such gaps may, for example, be available on account of the cell configuration. In other words, if the transmit path is operated in the first mode of operation, the method may comprise changing the bandwidth from the first bandwidth to the lower second bandwidth, if a number of PRBs allocated to the transmitter for a TTI is zero.

The state machine is aware of the gap positions. A timer threshold $T_{TimerB}$ may be chosen such that the state machine is inherently biased to wait in state B until any gap is available or the configured gap is hit (indicated by path 3). If the state machine has been in state B for more than $T_{TimerB}$ (e.g. some milliseconds), it tries to force the switching in an active SF (i.e. a TTI with a non-zero number of PRBs allocated to the transmitter). For example, once timer threshold $T_{TimerB}$ is crossed in state B, a penalty metric $P_{penalty}$ may be continuously evaluated for each SF (TTI) with active transmission. The first TTI where $P_{penalty}$ is less than $P_{penalty\_threshold}$ may be used for switching to state C (indicated by transmission path 5).

In other words, if a non-zero number of PRBs is allocated to the transmitter for each TTI within a second time period $T_{TimerB}$, operating the transmit path in the first mode of operation may comprise calculating for at least one TTI a second coefficient $P_{penalty}$ indicative of a signal degradation of a radio frequency transmit signal due to changing the bandwidth from the first bandwidth to the second bandwidth. The radio frequency transmit signal is generated by the transmit path based on the baseband transmit signal. If the second coefficient $P_{penalty}$ is smaller than a second threshold value $P_{penalty\_threshold}$, the method may further comprise changing the bandwidth from the first bandwidth to the second bandwidth.

As described above, calculating the second coefficient $P_{penalty}$ may be based on at least one of a type of data of the baseband transmit signal related to the TTI, a code rate of data of the baseband transmit signal related to the TTI, and a desired QoS for the TTI.

Further, operating the transmit path in the first mode of operation may comprise adjusting a start time for changing the bandwidth from the first bandwidth to the second bandwidth. For example, adjusting the start time for changing the bandwidth from the first bandwidth to the lower second bandwidth may be based on a time period required by the transmit path for changing the bandwidth from the first bandwidth to the second bandwidth, so that changing the bandwidth from the first bandwidth to the second bandwidth takes place while the transmit path processes data of the baseband transmit signal related to the TTI for which the second coefficient $P_{penalty}$ is smaller than the second threshold value $P_{penalty}$ threshold, or while the transmit path does not processes data of the baseband transmit signal since the number of allocated PRBs is zero for the TTI.

State C is the most power efficient state of operation. The state machine tries to remain in state C (indicated by path 7) and may toggle back to state B (indicated by transition path 6) if, e.g., a grant with large bandwidth allocation is detected or one of the above mentioned criteria occurs. Transitions from state C to state B may follow similar criteria as the transition from state B to state C (as described above). The transitions from state C to state B may be different in so far that:

1) there may be no timer based trigger for switching from state C to state B. The trigger may be instantaneous (e.g. switch as soon as possible to avoid missing the uplink grant). The deadline for switching may, e.g., depend on the relation between downlink grant detection and uplink transmission as defined by 3GPP standards;
2) if no "natural" opportunity (i.e. empty TTI) is found before the deadline, a switch to the cell bandwidth may be forced by setting the second threshold value $P_{penalty\_threshold}$ to zero for the last SF (TTI) before switch.

In other words, while operating the transmit path in the first mode of operation, the method may comprise changing the bandwidth from the lower second bandwidth to the first band-width, if one of the following conditions occurs:
1) an amount of pending data for transmission exceeds a third threshold value;
2) a predefined type of data is scheduled for transmission in a future TTI; or
3) a number of PRBs exceeding a fourth threshold value is allocated to the transmitter for a future TTI.

Additionally, the proposed method may further comprise adjusting a start time for changing the bandwidth from the second bandwidth to the first bandwidth. For example, the method may comprise adjusting the start time for changing the bandwidth from the second bandwidth to the first bandwidth based on a time period required by the transmit path for changing the bandwidth from the second bandwidth to the first bandwidth, so that changing the bandwidth from the second bandwidth to the first bandwidth takes place during a next time period in which the transmit path does not process data of the baseband transmit signal (since zero PRBs are allocated to the transmitter for a TTI which the first coefficient still exceeds the first threshold value, i.e. for a TTI preceding the future TTI). Also, the method may comprise adjusting the start time for changing the bandwidth from the second bandwidth to the first bandwidth based on a time period required by the transmit path for changing the bandwidth from the second bandwidth to the first bandwidth, so that changing the bandwidth from the second bandwidth to the first bandwidth takes place while the transmit path processes data of the baseband transmit signal that precedes data of the baseband transmit signal related to the future TTI.

If the state machine continues to remain in states B and C (i.e. the first mode of operation of the transmit path), there may be performance loss due to frequent switching between states B and C when high bandwidth uplink is started while the state machine and, hence, the transmit path/transmitter/mobile device is in state C. In order to prevent performance loss, the power save metric $P_{save}$ may be updated continuously based on traffic patterns. When metric $P_{save}$ no longer satisfies the threshold (e.g. $P_{save\_threshold}$+hysteresis), a transition to state A may be enforced from both state B and state C (indicated by transition paths 8 and 9).

In other words, if the first coefficient $P_{save}$ falls below the first threshold value $P_{save\_threshold}$, the method may further comprise switching from operating the transmit path in the first mode of operation to operating the transmit path in the second mode of operation in which the bandwidth used for processing the baseband transmit signal is non-adjustably set to the first bandwidth.

Further, if the second bandwidth is currently used in the first mode of operation, switching from operating the transmit path in the first mode of operation to operating the transmit path in the second mode of operation may comprise changing the bandwidth from the second bandwidth to the first bandwidth, and adjusting the start time for changing the bandwidth from the second bandwidth to the first bandwidth.

The transitions may be based on indications from higher layers about, e.g., BSR status, Scheduling Request (SR) sent, Message 3 (Msg3) grant, or a traffic pattern (e.g. high QoS, high bandwidth). These indications from higher layers may also be used to reset the save metric $P_{save}$ in order to cause a natural transition from state B or C back to state A. Using the above indications may allow the transmit path/transmitter/mobile device to switch ahead of time and avoid performance loss for critical applications.

That is, in the course of switching from operating the transmit path in the first mode of operation to operating the transmit path in the second mode of operation, the method may comprise adjusting the start time for changing the bandwidth from the second bandwidth to the first bandwidth based on a time period required by the transmit path for changing the bandwidth from the second bandwidth to the first bandwidth, so that changing the bandwidth from the second bandwidth to the first bandwidth takes place while the transmit path processes:
1) no data of the baseband transmit signal since zero PRBs are allocated to the transmitter for a TTI for which the first coefficient still exceeds the first threshold value; or
2) data of the baseband transmit signal related to a last TTI for which the first coefficient exceeds the first threshold value.

Figure 30:
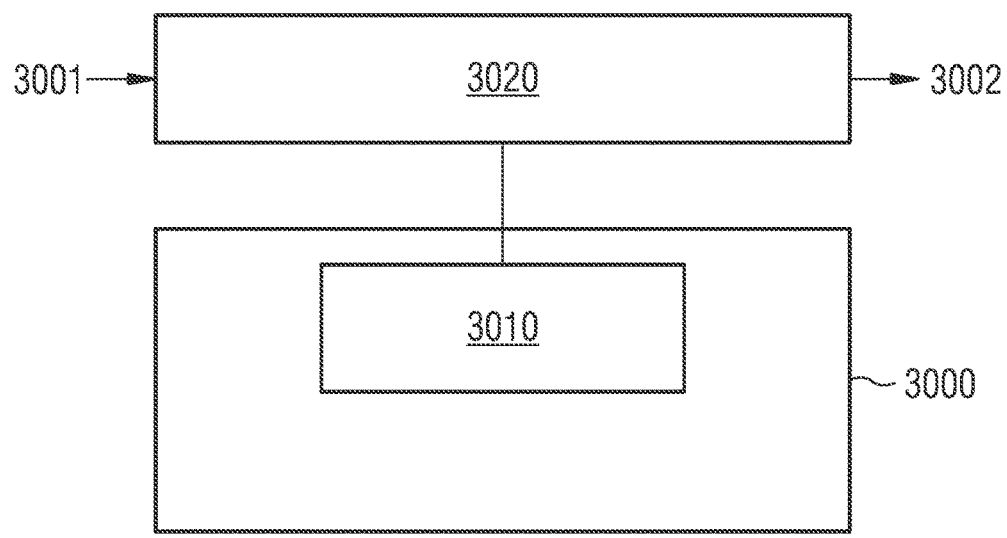
FIG. 30 illustrates an example of an apparatus for controlling a bandwidth used for processing a baseband transmit signal.

In implementation of the proposed method is illustrated in FIG. 30, which illustrates an apparatus 3000 for controlling a bandwidth used for processing a baseband transmit signal 3001 by a transmit path 3020 of a transmitter. Based on the baseband transmit signal 3001, the transmit path 3020 generates a radio frequency transmit signal 3002. The apparatus 3000 comprises a processor circuit 3010. The processor circuit 3010 is configured to calculate a first coefficient indicative of a power saving due to processing the baseband transmit signal 3001 using a lower second bandwidth instead of a first bandwidth.

If the first coefficient exceeds a first threshold value for a first time period, the processor circuit 3010 is configured to control the transmit path 3020 to operate in a first mode of operation in which the bandwidth is switchable from the first bandwidth to the second band-width.

If the first coefficient does not exceed the first threshold value for the first time period, the processor circuit 3010 may be further configured to control the transmit path 3020 to operate in a second mode of operation in which the bandwidth is non-adjustably set to the first band-width.

As discussed above, switching a bandwidth/sampling/size of an iFFT used for processing the baseband transmit signal 3001 by the transmit path 3020 may cause signal degradation of the resulting radio frequency transmit signal 3002. By calculating the first coefficient and comparing it to the threshold, apparatus 3000 may allow to balance the penalty and the benefit of switching. A power-efficiency of the transmit path 3020 may be increased by apparatus 3000.

The processor circuit 3010 may, in some examples, further be configured to execute one or more additional optional features corresponding to one or more aspects of the proposed technique for controlling a bandwidth used for processing a baseband transmit signal in a transmit path or one or more examples described above.

Generally speaking, some examples of the present disclosure relate to a means for controlling a bandwidth used for processing a baseband transmit signal by a transmit path of a transmitter. The means comprises a means for calculating a first coefficient indicative of a power saving due to processing the baseband transmit signal using a lower second bandwidth instead of a first bandwidth. Further, the means comprises a means for controlling the transmit path to operate in a first mode of operation in which the bandwidth is switchable from the first bandwidth to the second bandwidth, if the first coefficient exceeds a first threshold value for a first time period.

The means may optionally further comprises a means for controlling the transmit path to operate in a second mode of operation in which the bandwidth is non-adjustably set to the first bandwidth, if the first coefficient does not exceed the first threshold value for the first time period.

While transmission aspects were discussed in the first part of the present disclosure, aspects related to reception of radio frequency signals are discussed below in the second part of the present disclosure with reference to FIGS. 31 to 33.

Receivers are commonly optimized to be able to receive signals in the presence of interferers and leaked blockers from transmitters. However, in some operation modes like Physical Downlink Control Channel (PDCCH)-only, only downlink control data is received and no blocker is present. In addition no interferers may be present at the antenna. However, such operation modes do not require the above mentioned heavily optimized receiver configurations.

Figure 31:
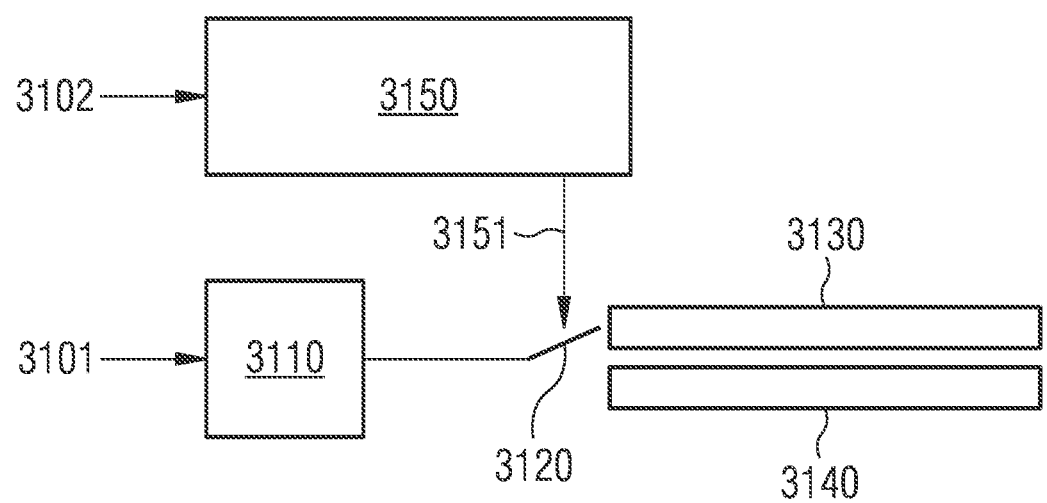
FIG. 31 illustrates an example of a receiver for a wireless communication system.

FIG. 31 illustrates a receiver 3100 for a wireless communication system which is adapted to such operation modes.

Receiver 3100 comprises a mixer 3110 configured to generate an analog receive signal based on a radio frequency receive signal 3101. For example, the radio frequency receive signal 3101 may be provided by an antenna to which the receiver 3100 is coupled (e.g. via intermediate components like a Low Noise Amplifier, LNA, or a frequency selective filter).

Further, receiver 3100 comprises a switch 3120 configured to couple one of a first signal processing chain 3130 and a second signal processing chain 3140 to the mixer 3110.

The first and second signal processing chains 3130 and 3140 comprises components or circuitry required to process the analog receive signal. Some examples of first signal and second processing chains 3130 and 3140, therefore, may comprise one or more filters, an Analog-to-Digital Converter (ADC), a (fractional) sample rate converter, or a decimator for signal processing. However, the term signal processing chain as used herein shall not be construed to include all the components technically necessary in order to process the analog receive signal. To the contrary, a signal processing chain used in the context of the present description may comprise only a subset of those components or elements.

A linearity of the second signal processing chain 3140 is lower than the linearity of the first signal processing chain 3130. Linearity is the behavior of a circuit, in which the output signal strength varies in direct proportion to the input signal strength. In a linear device, the output-to-input signal amplitude ratio is substantially the same, no matter what the strength of the input signal (as long it is not too strong). Hence, a high linearity may be generally be preferred, but not be necessary for each receive situation.

Additionally or alternatively, a noise level of the second signal processing chain 3140 is higher than the noise level of the first signal processing chain 3130. The noise level describes the amount of noise (i.e. unwanted modifications that a signal may suffer during processing) present in a circuit. The higher the noise level, the higher the chance of an unwanted signal modification. Hence, a low noise level may be generally be preferred, but not be necessary for each receive situation.

A control circuit 3150 of the receiver 3100 is configured to control the switch 3120 to couple one of the first signal processing chain 3130 and the second signal processing chain 3140 to the mixer 3110 based on information 3102 on an operation mode of the receiver 3100, i.e. based on the operation mode of the receiver 3100. For example, the control circuit 3150 may be configured to supply a control signal 3151 to switch 3120.

The operation mode of the receiver 3100 indicates if the receiver 3100 is in a receive situation in which interferers and blockers are present or not. For example, the operation mode may be determined based on a transmit activity of an associated transmitter (e.g. transmitter implemented in mobile device or transceiver comprising the receiver 3100), or measurements on the presence of blockers or interferers at the antenna. Further, information on downlink scheduling for the receiver 3100 (or a mobile device comprising the receiver 3100) may be used to determine the operation mode of the receiver 3100.

By means of control circuit 3150, the receiver 3100 may go into a low-linearity and/or high noise mode. Since the requirements for in terms of linearity and/or noise level for the second signal processing chain 3140 are lower, the components of the second signal processing chain 3140 may be optimized in terms of power consumption (power-efficiency). A power consumption of the second signal processing chain 3140 may, hence, be lower than a power consumption of the first signal processing chain 3130. That is, the second signal processing chain 3140 may provide low performance, low power consumption operation signal processing. Accordingly, a power consumption of the receiver 3100 may be reduced for situations in which the receiver 3100 is not obstructed by blockers or interferers.

Due to the reduced linearity requirements for the second signal processing chain 3140, the first signal processing chain 3130 may, e.g., comprises a first ADC, and the second signal processing chain 3140 may comprises a second ADC with a lower dynamic range than the first ADC. The second ADC may be optimized for low power consumption instead of high dynamic. For example, the first ADC may be a sigma-delta ADC, whereas the second ADC may be a Successive-Approximation-Register (SAR) ADC.

For example, the control circuit 3150 may control the switch 3120 to couple the second signal processing chain 3140 o the mixer 3110 if the operation mode of the receiver 3100 is one of an idle mode (i.e. associated transmitter is not active or not in use), or an operation mode in which the radio frequency receive signal 3101 comprises only downlink control data (e.g. PDCCH data).

In order to save further power, the control circuit 3150 may be configured to adjust a bias (voltage and/or current) for the mixer 3110 based on the operation mode of the receiver 3100. For example, the bias for the mixer 3110 may be lowered if the second signal processing chain 3140 is coupled to the mixer 3110 by means of the switch 3120, or if the operation mode of the receiver 3100 is a low linearity receive mode. Accordingly, a linearity of the mixer 3110 may be reduced to an acceptable level and at the same the power consumption of the receiver 3100 may be further reduced.

As described above, an amplifier (e.g. a LNA) may be coupled to an input of the mixer 3110 and configured to supply the radio frequency receive signal 310 to the mixer 3110. The control circuit 3150 may be configured to further adjust a bias (voltage and/or current) for the amplifier based on the operation mode of the receiver 3100. Similarly, the bias for the amplifier may be lowered if the second signal processing chain 3140 is coupled to the mixer 3110 by means of the switch 3120, or if the operation mode of the receiver 3100 is a low linearity receive mode. Accordingly, a linearity of the amplifier may be reduced to an acceptable level and at the same the power consumption of the receiver 3100 may be further reduced.

That is, in addition to using the lower signal processing chain 3140, the amplifier and the mixer 3110 may be re-configured to power saving bias states.

Figure 32:
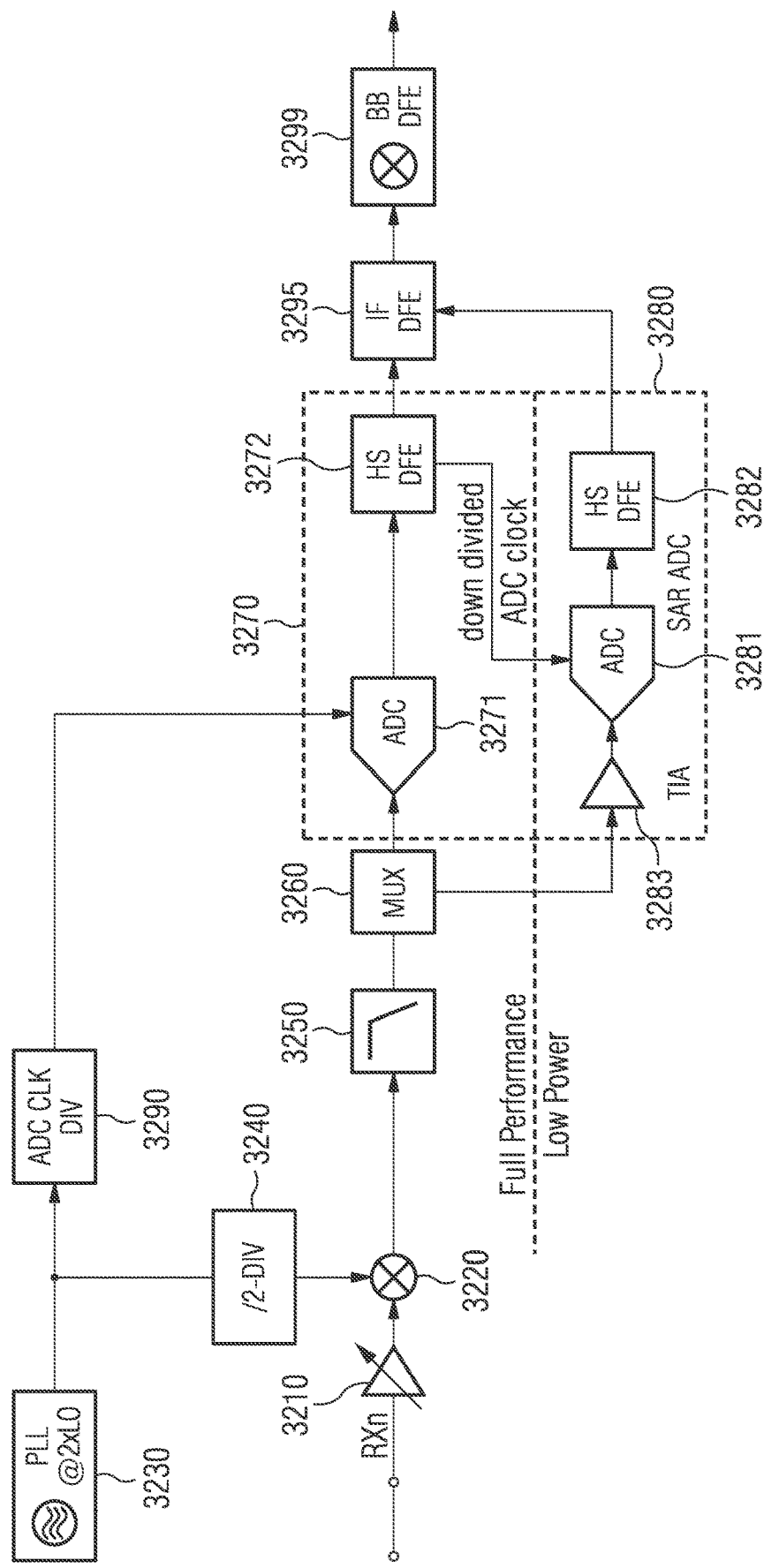
FIG. 32 illustrates another example of a receiver for a wireless communication system.

A more detailed example of a receiver 3200 for a wireless communication system according to the present disclosure is illustrated in FIG. 32.

Receiver 3200 comprises a LNA 3210 receiving and amplifying a radio frequency receive signal (e.g. from an antenna or a frequency selective filter). The LNA 3210 supplies the amplified radio frequency receive signal to mixer 3220. The mixer 3220 further receives an oscillation signal for down-mixing the radio frequency receive signal. For example, a PLL 3230 may generate a reference oscillation signal, and a frequency divider 3240 may generate the oscillation signal based on the reference oscillation signal (e.g. by halving the frequency). The mixer 3220 generates an analog receive signal based on the radio frequency receive signal. Further, the receiver 3250 comprises a low pass filter 3260 for filtering the analog receive signal.

A switch for coupling one of a first signal processing chain 3270 and a second signal processing chain 3280 to the mixer 3220 is implemented by means of multiplexer 3260. A linearity of the second signal processing chain 3280 is lower than the linearity of the first signal processing chain 3270. Additionally, a noise level of the second signal processing chain 3280 may be higher than the noise level of the first signal processing chain 3270. That is, the first signal processing chain 3270 may be understood as a full performance signal processing chain, whereas the second signal processing chain 3280 may be understood as a low performance signal processing chain. As discussed above, the second signal processing chain 3280 may, however, be optimized in terms energy efficiency due to the lower requirements for signal processing.

A control circuit (not illustrated) controls multiplexer 3260 to couple one of the first signal processing chain 3270 and the second signal processing chain 3280 to the mixer 3220 based on an operation mode of the receiver 3200 (e.g. an idle mode, or an operation mode in which the radio frequency receive signal comprises only downlink control data). In other words, by providing multiplexer 3260 the signal after the mixer 3220 may be switched to the low power chain.

The control circuit may further adjust a bias for the LNA 3210 based on the operation mode of the receiver in order to reduce a linearity and a power consumption of the LNA 3210 in certain operation modes of the receiver 3200. Additionally, the control circuit may adjust a bias for mixer 3220 based on the operation mode of the receiver in order to reduce a linearity and a power consumption of the mixer 3220 in certain operation modes of the receiver 3200.

The first signal processing chain 3270 comprises a first ADC 3271, and the second signal processing chain 3280 comprises a second ADC 3281 with a lower dynamic range than the first ADC 3271. Additionally, the first signal processing chain 3270 comprises a first high speed Digital FrontEnd (DFE) 3272, and the second signal processing chain 3280 comprises a second DFE 3282. For example, DFEs 3272 and 3282 may be used for decimating the analog receive signal.

The first ADC 3271 is clocked by means of another oscillation signal that is generated by another divider 3290 based on the reference oscillation signal. The second ADC 3281 may, e.g., be clocked by a further down-divided version of the other oscillation signal for the first ADC 3271. The second ADC 3281 may, hence, be operated on a different (lower) frequency compared to the first ADC 3271. Further, a bit-length of the output of the second ADC 3281 may be reduced compared to the first ADC 3271. Accordingly, a power consumption of the second ADC 3281 and the second signal processing chain 3280 may be reduced compared to the first ADC 3271 and the first signal processing chain 3270.

As indicated in FIG. 32, the first and/or the second signal processing chains 3270, 3280 may comprises further optional elements. For example, the second signal processing chain 3280 further comprise a Transimpedance Amplifier 3283 coupled to the input of the second ADC 3281.

For example, after the high speed decimation, the signal may be fed back into the high performance DFE (indicated by intermediate frequency DFE 3295 and baseband DFE 3299). Alternatively, a dedicated DFE chain to further reduce the power consumption in low-linearity use cases may be used. That is, the first signal processing path 3270 and the second signal processing path 3270 may be coupled to a processing circuit configured to supply a digital baseband signal to a baseband processor based on a digital signal supplied to the processing circuit by the first signal processing path 3270 or the second signal processing path 3280. Alternatively, the first signal processing path 3270 and the second signal processing path 3280 may be coupled to a baseband processor configured to process a digital baseband signal supplied to the baseband processor by the first signal processing path 3270 or the second signal processing path 3280.

In other words, receiver 3200 implements an alternative parallel path in the analog baseband to exploit, e.g., lower linearity and/or noise requirements in certain use cases for power saving. By having the freedom to optimize only for the low performance use case, a different architecture and building blocks may be used for the alternative parallel path. This may allow significantly higher power saving than just reconfiguring the main receive path (i.e. the full performance signal processing chain). This may be beneficial for, e.g., wearable cellular products, where power use cases like PDCCH-only and idle (in which the receiver is active without the transmitter) are important.

Compared to solutions in which a complete additional receiver chain with dedicated input port is used as low power and low performance receiver, the receiver according to the present disclosure may allow to keep the phase of the oscillation signal used for down-mixing the radio frequency receive signal constant when switching into the low performance mode since the same mixer and oscillation signal path are used. This may allow the receiver to seamlessly switch between high performance and low performance mode without losing phase continuity. Accordingly, the channel estimation in the baseband may be preserved and, hence, a further power saving may be achieved.

Another disadvantage of a complete additional receiver is the extra input port that increases the complexity of the radio frequency frontend and requires time accurate switching in the frontend, when a path switch is performed.

Figures 33, 34:
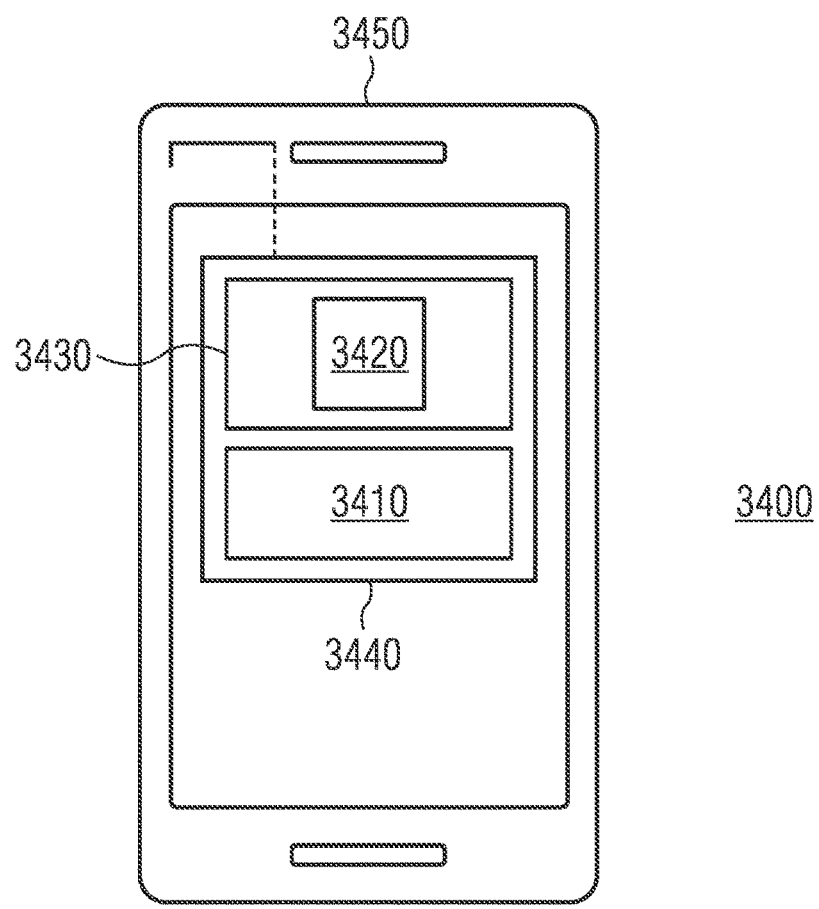
FIG. 33 illustrates a flowchart of an example of a method for a receiver.
FIG. 34 illustrates an example of a mobile device comprising a receiver according to the present disclosure and/or an apparatus for controlling a bandwidth used for processing a baseband transmit signal according to the present disclosure.

An example of a method 3300 for a receiver is illustrated by means of a flowchart in FIG. 33. The receiver comprises a mixer configured to generate an analog receive signal based on a radio frequency receive signal, and a switch configured to couple one of a first signal processing chain and a second signal processing chain to the mixer. A linearity of the second signal processing chain is lower than the linearity of the first signal processing chain and/or a noise level of the second signal processing chain is higher than the noise level of the first signal processing chain. The method 3300 comprises controlling 3302 the switch to couple one of the first signal processing chain and the second signal processing chain to the mixer based on an operation mode of the receiver.

More details and aspects of the method are mentioned in connection with the proposed technique or one or more examples described above (e.g. FIGS. 31 and 32). The method may comprise one or more additional optional features corresponding to one or more aspects of the proposed technique or one or more examples described above.

Generally speaking, some examples of the present disclosure relate to a means for receiving a radio frequency receive signal. The means comprises a means for generating an analog receive signal based on the radio frequency receive signal. Further, the means comprises a means for coupling one of a first signal processing chain and a second signal processing chain to the means for generating the analog receive signal, wherein a linearity of the second signal processing chain is lower than the linearity of the first signal processing chain and/or a noise level of the second signal processing chain is higher than the noise level of the first signal processing chain. Additionally, the means comprises a means for controlling the means for coupling to couple one of the first signal processing chain and the second signal processing chain to the mixer based on an operation mode of the means for receiving the radio frequency receive signal.

An example of an implementation using a receiver and/or an apparatus for controlling a bandwidth used for processing a baseband transmit signal according to one or more aspects of the proposed architecture or one or more examples described above is illustrated in FIG. 34. FIG. 34 schematically illustrates an example of a mobile device 3400 (e.g. mobile phone, smartphone, tablet-computer, or laptop) comprising at least one of a receiver 3410 for a wireless communication system according to an example described herein, and an apparatus 3420 for controlling a bandwidth used for processing a baseband transmit signal according to an example described herein.

For example, a transmitter 3430 comprising a transmit path (not illustrated) may comprise the apparatus 3420 for controlling a bandwidth used for processing a baseband transmit signal.

A transceiver (modem) 3440 may comprise the receiver 3410 and the transmitter 3430. At least one antenna element 3450 of the mobile device 3400 may be coupled to the receiver 3410, the transmitter 3430, or the transceiver 3440.

To this end, a mobile device with reduced power consumption may be provided

The proposed baseband processing technique as well as the proposed receive technique are not limited to mobile devices. The proposed baseband processing technique as well as the proposed receive technique may be used in any electronic device processing baseband signals or receiving radio frequency signals.

Wireless communication circuits using apparatuses and transmitters according to the proposed technique or one or more of the examples described above may be configured to operate according to one of the $3^{rd}$ Generation Partnership Project (3GPP)-standardized mobile communication networks or systems. The mobile or wireless communication system may correspond to, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN).

The examples as described herein may be summarized as follows:

Example 1 is a method for controlling a bandwidth used for processing a baseband transmit signal by a transmit path of a transmitter, the method comprising: generating a first comparison result by comparing, to a threshold value, a first number of physical resource blocks allocated to the transmitter for a first transmission time interval; generating a second comparison result by comparing, to the threshold value, a second number of physical resource blocks allocated to the transmitter for a subsequent second transmission time interval; and adjusting the bandwidth based on the first and the second comparison results.

In example 2, the first transmission time interval in the method of example 1 immediately precedes the second transmission time interval.

In example 3, the first transmission time interval in the method of example 1 is the last transmission time interval preceding the second transmission time interval for which a non-zero number of physical resource blocks is allocated to the transmitter.

In example, 4, adjusting the bandwidth in the method of any of examples 1 to 3 comprises maintaining the bandwidth unchanged, if both of the first and the second comparison result respectively indicate that the number of allocated physical resource blocks is below the threshold value, if both of the first and the second comparison result respectively indicate that the number of allocated physical resource blocks is above the threshold value, or if the second number of physical resource blocks is zero.

In example 5, adjusting the bandwidth in the method of any of examples 1 to 4 comprises changing the bandwidth from a first bandwidth to a second bandwidth, if one of the first and the second comparison results indicates that the number of allocated physical resource blocks is below the threshold value and the other one of the first and the second comparison results indicates that the number of allocated physical resource blocks is above the threshold value.

In example 6, the method of example 5 further comprises adjusting a start time for changing the bandwidth from the first bandwidth to the second bandwidth.

In example 7, adjusting the start time for changing the bandwidth in the method of example 6 is based on at least one of the first number of physical resource blocks and the second number of physical resource blocks.

In example 8, if the first number of physical resource blocks is zero, adjusting the start time for changing the bandwidth in the method of example 7 comprises adjusting the start time based on a time period required by the transmit path for changing the bandwidth from the first bandwidth to the second bandwidth, so that changing the bandwidth from the first bandwidth to the second bandwidth is finished before the transmit path starts processing data of the baseband transmit signal related to the second transmission time interval.

In example 9, if the first number of physical resource blocks is below the threshold value and the second number of physical resource blocks is above the threshold value, adjusting the start time for changing the bandwidth in the method of example 7 or example 8 comprises adjusting the start time to a point in time at which the transmit path processes data of the baseband transmit signal related to the second transmission time interval.

In example 10, adjusting the start time for changing the bandwidth in the method of any of examples 6 to 9 is based on at least one of a type of data of the baseband transmit signal related to the first transmission time interval and the type of data of the baseband transmit signal related to the second transmission time interval.

In example 11, if the type of data of the baseband transmit signal related to the first transmission time interval or the second transmission time interval is a predefined type of data, adjusting the start time for changing the bandwidth in the method of example 10 comprises adjusting the start time based on a time period required by the transmit path for changing the bandwidth from the first bandwidth to the second bandwidth, so that changing the bandwidth from the first bandwidth to the second bandwidth takes place while the transmit path processes data of the baseband transmit signal related to the other of the first transmission time interval and the second transmission time interval.

In example 12, adjusting the bandwidth in the method of any of examples 1 to 11 comprises maintaining the bandwidth unchanged, if a type of data of the baseband transmit signal related to the first transmission time interval and the type of data of the baseband transmit signal related to the second transmission time interval are both predefined types of data.

In example 13, the predefined type of data in the method of example 11 or example 12 is data for a Physical Uplink Control Channel, data for a Sounding Reference Signal, or data for re-transmission.

In example 14, adjusting the start time for changing the bandwidth in the method of any of examples 6 to 13 comprises: comparing a first coding robustness of data of the baseband transmit signal related to the first transmission time interval to a second coding robustness of data of the baseband transmit signal related to the second transmission time interval; and adjusting the start time based on a time period required by the transmit path for changing the bandwidth from the first bandwidth to the second bandwidth, so that changing the bandwidth from the first bandwidth to the second bandwidth takes place while the transmit path processes data of the baseband transmit signal related to the one of the first transmission time interval and the second transmission time interval exhibiting higher coding robustness.

In example 15, the first coding robustness in the method of example 14 is based on at least one of a code rate, a transport block size, a modulation and coding scheme, a modulation, a code block size and a code type of the data of the baseband transmit signal related to the first transmission time interval.

In example 16, the method of any of examples 5 to 15 further comprises: calculating a signal degradation of a radio frequency transmit signal generated by the transmit path due to changing the bandwidth from the first bandwidth to the second bandwidth, the radio frequency transmit signal being based on the baseband transmit signal; and, if the power of the radio frequency transmit signal is smaller than a predefined signal power, increasing a power of the radio frequency transmit signal for a signal section of the radio frequency transmit signal relating to data of the baseband transmit signal that is processed by the transmit path while the bandwidth is changed from the first bandwidth to the second bandwidth.

In example 17, the predefined signal power in the method of example 16 is the maximum signal power for the radio frequency transmit signal supported by the transmit path, or the maximum signal power for the radio frequency transmit signal according to a communication standard.

In example 18, the second bandwidth in the method of any of examples 5 to 17 is smaller than the first bandwidth, wherein a bandwidth of a radio frequency transmit signal generated by the transmit path based on the baseband transmit signal is the first bandwidth, and wherein the method further comprises controlling the transmit path to shift a frequency of the baseband transmit signal processed by the transmit path using the second bandwidth by a frequency shift to a frequency assigned to the first bandwidth.

In example 19, the frequency shift in the method of example 18 relates to one of a single rectangular frequency step in the time domain, a plurality of rectangular frequency steps in the time domain, or a non-rectangular frequency trajectory in the time domain.

In example 20, the method of any of examples 1 to 19 further comprises generating a third comparison result by comparing, to the threshold value, a third number of physical resource blocks allocated to the transmitter for a third transmission time interval succeeding the second transmission time interval, wherein adjusting the bandwidth is further based on the third comparison result.

In example 21, the third number of physical resource blocks in the method of example 20 is based on at least one of information received from a base station, information on respective numbers of physical resource blocks allocated to the transmitter for a plurality of transmission time intervals preceding the first transmission time interval, and information on types of data periodically occurring in the baseband transmit signal.

In example 22, adjusting the start time for changing the bandwidth in the method of example 6 is based on information about a first modulation and coding scheme allocated to the first transmission time interval and a second modulation and coding scheme allocated to the second transmission time interval.

In example 23, the method of example 22 further comprises: comparing a first code rate of data of the baseband transmit signal related to the first transmission time interval to a second code rate of data of the baseband transmit signal related to the second transmission time interval, wherein the first and the second code rate are based on the information about the first modulation and coding scheme allocated to the first transmission time interval and the second modulation and coding scheme allocated to the second transmission time interval; and adjusting the start time based on a time period required by the transmit path for changing the bandwidth from the first bandwidth to the second bandwidth, so that changing the bandwidth from the first bandwidth to the second bandwidth takes place while the transmit path processes data of the baseband transmit signal related to the one of the first transmission time interval and the second transmission time interval exhibiting the lower code rate.

In example 24, the method of any of examples 5 to 23 further comprises: controlling the transmit path to process the baseband transmit signal using a first sample rate for the first bandwidth; and controlling the transmit path to process the baseband transmit signal using a second sample rate for the second bandwidth.

In example 25, the method of any of examples 5 to 24 further comprises: controlling the transmit path to process the baseband transmit signal using an inverse Fourier transformation of a first size for the first bandwidth; and controlling the transmit path to process the baseband transmit signal using an inverse Fourier transformation of a second size for the second band-width.

In example 26, the second bandwidth in the method of example 25 is smaller than the first bandwidth, wherein a bandwidth of a radio frequency transmit signal generated by the transmit path based on the baseband transmit signal is the first bandwidth, and wherein the method further comprises: controlling the transmit path to shift a phase of the baseband transmit signal processed by the transmit path using the second bandwidth based on a difference between a frequency of data of the baseband transmit signal related to an allocated physical resource bock and a desired frequency of the data at the first bandwidth.

In example 27, controlling the transmit path to shift the phase of the baseband transmit signal in the method of example 26 is further based on a length of a cyclic prefix used by the transmit path for the second bandwidth.

In example 28, the method of any of examples 1 to 27 further comprises controlling the transmit path to filter the baseband transmit signal, wherein, starting from an edge of the frequency range, data of the baseband transmit signal related to one or more allocated physical resource blocks is continuously arranged within a frequency range used by the transmit path for processing the baseband transmit signal based on the bandwidth.

In example 29, the method of any of examples 1 to 28 further comprises: determining, based on information received from a base station, a signal error of a radio frequency transmit signal due to adjusting the bandwidth, the radio frequency signal being generated by the transmit path based on the baseband transmit signal; and disabling adjusting the bandwidth if the signal error exceeds an error threshold.

Example 30 is an apparatus for controlling a bandwidth used for processing a baseband transmit signal by a transmit path of a transmitter, the apparatus comprising a processor circuit configured to: generate a first comparison result by comparing, to a threshold value, a first number of physical resource blocks allocated to the transmitter for a first transmission time interval; generate a second comparison result by comparing, to the threshold value, a second number of physical resource blocks allocated to the transmitter for a subsequent second transmission time interval; and adjust the bandwidth based on the first and the second comparison results.

In example 31, the first transmission time interval in the apparatus of example 30 immediately precedes the second transmission time interval.

In example 32, the first transmission time interval in the apparatus of example 30 is the last transmission time interval preceding the second transmission time interval for which a non-zero number of physical resource blocks is allocated to the transmitter.

In example 33, the processor circuit in the apparatus of any of examples 30 to 32 is configured to maintain the bandwidth unchanged, if both of the first and the second comparison result respectively indicate that the number of allocated physical resource blocks is below the threshold value, if both of the first and the second comparison result respectively indicate that the number of allocated physical resource blocks is above the threshold value, or if the second number of physical resource blocks is zero.

In example 34, the processor circuit in the apparatus of any of examples 30 to 33 is configured to change the bandwidth from a first bandwidth to a second bandwidth, if one of the first and the second comparison results indicates that the number of allocated physical resource blocks is below the threshold value and the other one of the first and the second comparison results indicates that the number of allocated physical resource blocks is above the threshold value.

In example 35, the processor circuit in the apparatus of example 34 is configured to adjust a start time for changing the bandwidth from the first bandwidth to the second bandwidth.

In example 36, the processor circuit in the apparatus of example 35 is configured to adjust the start time for changing the bandwidth based on at least one of the first number of physical resource blocks and the second number of physical resource blocks.

In example 37, if the first number of physical resource blocks is zero, the processor circuit in the apparatus of example 36 is configured to adjust the start time based on a time period required by the transmit path for changing the bandwidth from the first bandwidth to the second bandwidth, so that changing the bandwidth from the first bandwidth to the second bandwidth is finished before the transmit path starts processing data of the baseband transmit signal related to the second transmission time interval.

In example 38, if the first number of physical resource blocks is below the threshold value and the second number of physical resource blocks is above the threshold value, the processor circuit in the apparatus of example 36 or example 37 is configured to adjust the start time to a point in time at which the transmit path processes data of the baseband transmit signal related to the second transmission time interval.

In example 39, the processor circuit in the apparatus of any of examples 35 to 38 is configured to adjust the start time for changing the bandwidth is based on at least one of a type of data of the baseband transmit signal related to the first transmission time interval and the type of data of the baseband transmit signal related to the second transmission time interval.

In example 40, if the type of data of the baseband transmit signal related to the first transmission time interval or the second transmission time interval is a predefined type of data, the processor circuit in the apparatus of example 39 is configured to adjust the start time based on a time period required by the transmit path for changing the bandwidth from the first bandwidth to the second bandwidth, so that changing the bandwidth from the first bandwidth to the second bandwidth takes place while the transmit path processes data of the baseband transmit signal related to the other of the first transmission time interval and the second transmission time interval.

In example 41, the processor circuit in the apparatus of any of examples 30 to 40 is configured to maintain the bandwidth unchanged, if a type of data of the baseband transmit signal related to the first transmission time interval and the type of data of the baseband transmit signal related to the second transmission time interval are both predefined types of data.

In example 42, the predefined type of data in the apparatus of example 40 or example 41 is data for a Physical Uplink Control Channel, data for a Sounding Reference Signal, or data for re-transmission.

In example 43, the processor circuit in the apparatus of any of examples 35 to 42 is configured to: compare a first coding robustness of data of the baseband transmit signal related to the first transmission time interval to a second coding robustness of data of the baseband transmit signal related to the second transmission time interval; and adjust the start time based on a time period required by the transmit path for changing the bandwidth from the first bandwidth to the second bandwidth, so that changing the bandwidth from the first bandwidth to the second bandwidth takes place while the transmit path processes data of the baseband transmit signal related to the one of the first transmission time interval and the second transmission time interval exhibiting higher coding robustness.

In example 44, the first coding robustness in the apparatus of example 43 is based on at least one of a code rate, a transport block size, a modulation and coding scheme, a modulation, a code block size and a code type of the data of the baseband transmit signal related to the first transmission time interval.

In example 45, the processor circuit in the apparatus of any of examples 34 to 44 is further configured to: calculate a signal degradation of a radio frequency transmit signal generated by the transmit path due to changing the bandwidth from the first bandwidth to the second bandwidth, the radio frequency transmit signal being based on the baseband transmit signal; and if the power of the radio frequency transmit signal is smaller than a predefined signal power, increase a power of the radio frequency transmit signal for a signal section of the radio frequency transmit signal relating to data of the baseband transmit signal that is processed by the transmit path while the bandwidth is changed from the first bandwidth to the second band-width.

In example 46, the predefined signal power in the apparatus of example 45 is the maximum signal power for the radio frequency transmit signal supported by the transmit path, or the maximum signal power for the radio frequency transmit signal according to a communication standard.

In example 47, the second bandwidth in the apparatus of any of examples 34 to 46 is smaller than the first bandwidth, wherein a bandwidth of a radio frequency transmit signal generated by the transmit path based on the baseband transmit signal is the first bandwidth, and the processor circuit is configured to control the transmit path to shift a frequency of the baseband transmit signal processed by the transmit path using the second bandwidth by a frequency shift to a frequency assigned to the first bandwidth.

In example 48, the frequency shift in the apparatus of example 47 relates to one of a single rectangular frequency step in the time domain, a plurality of rectangular frequency steps in the time domain, or a non-rectangular frequency trajectory in the time domain.

In example 49, if the transmit path uses polar modulation for generating the radio frequency transmit signal based on the baseband transmit signal, the processor circuit in the apparatus of example 47 or example 48 is configured to control the transmit path to shift the frequency of the baseband transmit signal by: controlling a phase-locked loop of the transmit path that supplies an oscillation signal to a digital-to-analog converter of the transmit path to generate the oscillation signal based on a frequency control word indicative of the frequency shift; or modifying phase information input to processing circuitry of the transmit path that operates in the polar domain by a phase value related to the frequency shift; or controlling a mixer of the transmit path to shift the baseband transmit signal by the frequency shift, and to supply the frequency shifted baseband transmit signal to processing circuitry of the transmit path that operates in the polar domain.

In example 50, if the transmit path uses Cartesian modulation for generating the radio frequency transmit signal based on the baseband transmit signal, the processor circuit in the apparatus of example 47 or example 48 is configured to control the transmit path to shift the frequency of the baseband transmit signal by controlling a phase-locked loop of the transmit path that generates an oscillation signal for a digital-to-analog converter of the transmit path to operate as a two-point modulator based on a first frequency control word indicative of a carrier frequency of the radio frequency transmit signal and a second frequency control word indicative of the frequency shift.

In example 51, the processor circuit in the apparatus of any of examples 30 to 50 is further configured to: generate a third comparison result by comparing, to the threshold value, a third number of physical resource blocks allocated to the transmitter for a third transmission time interval succeeding the second transmission time interval; and adjust the bandwidth further based on the third comparison result.

In example 52, the third number of physical resource blocks in the apparatus of example 51 is based on at least one of information received from a base station, information on respective numbers of physical resource blocks allocated to the transmitter for a plurality of transmission time intervals preceding the first transmission time interval, and information on types of data periodically occurring in the baseband transmit signal.

In example 53, the processor circuit in the apparatus of example 35 is configured to adjust the start time for changing the bandwidth based on information about a first modulation and coding scheme allocated to the first transmission time interval and a second modulation and coding scheme allocated to the second transmission time interval.

In example 54, the processor circuit in the apparatus of example 53 is further configured to: compare a first code rate of data of the baseband transmit signal related to the first transmission time interval to a second code rate of data of the baseband transmit signal related to the second transmission time interval, wherein the first and the second code rate are based on the information about the first modulation and coding scheme allocated to the first transmission time interval and the second modulation and coding scheme allocated to the second transmission time interval; and adjust the start time based on a time period required by the transmit path for changing the bandwidth from the first bandwidth to the second bandwidth, so that changing the bandwidth from the first bandwidth to the second bandwidth takes place while the transmit path processes data of the baseband transmit signal related to the one of the first transmission time interval and the second transmission time interval exhibiting the lower code rate.

In example 55, the processor circuit in the apparatus of any of examples 34 to 54 is further configured to control the transmit path to: process the baseband transmit signal using a first sample rate for the first bandwidth; and process the baseband transmit signal using a second sample rate for the second bandwidth.

In example 56, the processor circuit in the apparatus of any of examples 34 to 55 is further configured to control the transmit path to: process the baseband transmit signal using an inverse Fourier transformation of a first size for the first bandwidth; and process the baseband transmit signal using an inverse Fourier transformation of a second size for the second band-width.

In example 57, the second bandwidth in the apparatus of example 56 is smaller than the first bandwidth, wherein a bandwidth of a radio frequency transmit signal generated by the transmit path based on the baseband transmit signal is the first bandwidth, and wherein the processor circuit is further configured to control the transmit path to shift a phase of the baseband transmit signal processed by the transmit path using the second bandwidth based on a difference between a frequency of data of the baseband transmit signal related to an allocated physical resource bock and a desired frequency of the data at the first bandwidth.

In example 58, the processor circuit in the apparatus of example 57 is further configured to control the transmit path to shift the phase of the baseband transmit signal based on a length of a cyclic prefix used by the transmit path for the second bandwidth.

In example 59, the processor circuit in the apparatus of any of examples 30 to 58 is further configured to control the transmit path to filter the baseband transmit signal, wherein, starting from an edge of the frequency range, data of the baseband transmit signal related to one or more allocated physical resource blocks is continuously arranged within a frequency range used by the transmit path for processing the baseband transmit signal based on the bandwidth.

In example 60, the processor circuit in the apparatus of any of examples 30 to 59 is further configured to: determine, based on information received from a base station, a signal error of a radio frequency transmit signal due to adjusting the bandwidth, the radio frequency signal being generated by the transmit path based on the baseband transmit signal; and disable adjusting the bandwidth if the signal error exceeds an error threshold.

Example 61 is a means for controlling a bandwidth used for processing a baseband transmit signal by a transmit path of a transmitter, the means comprising: a means for generating a first comparison result by comparing, to a threshold value, a first number of physical resource blocks allocated to the transmitter for a first transmission time interval; a means for generating a second comparison result by comparing, to the threshold value, a second number of physical resource blocks allocated to the transmitter for a subsequent second transmission time interval; and a means for adjusting the bandwidth based on the first and the second comparison results.

In example 62, the means for adjusting the bandwidth in the means of example 61 is configured to change the bandwidth from a first bandwidth to a second bandwidth, if one of the first and the second comparison results indicates that the number of allocated physical resource blocks is below the threshold value and the other one of the first and the second comparison results indicates that the number of allocated physical resource blocks is above the threshold value.

Example 63 is a method for controlling a bandwidth used for processing a baseband transmit signal by a transmit path of a transmitter, the method comprising: calculating a first coefficient indicative of a power saving due to processing the baseband transmit signal using a lower second bandwidth instead of a first bandwidth; and if the first coefficient exceeds a first threshold value for a first time period, operating the transmit path in a first mode of operation in which the bandwidth is switchable from the first bandwidth to the second bandwidth.

In example 64, if the first coefficient does not exceed the first threshold value for the first time period, the method in the method of example 63 further comprises operating the transmit path in a second mode of operation in which the bandwidth is non-adjustably set to the first bandwidth.

In example 65, calculating the first coefficient in the method of example 63 or example 64 comprises: calculating the first coefficient for a first transmission time interval; and calculating the first coefficient for a second transmission time interval based on the first coefficient, the second transmission time interval immediately succeeding the first transmission time interval.

In example 66, calculating the first coefficient for the second transmission time interval in the method of example 65 is based on an expression which is mathematically correspondent to $P_{save}(TTI_2)=(1-v) \cdot P_{save}(TTI_1)+v \cdot P_{inst}$, with $P_{save}(TTI_2)$ denoting the first coefficient for the second transmission time interval, $P_{save}(TTI_1)$ denoting the first coefficient for the first transmission time interval, v denoting a constant, and $P_{inst}$ denoting a power saving potential for a current transmission time interval.

In example 67, operating the transmit path in the first mode of operation in the method of any of examples 63 to 66 comprises changing the bandwidth from the first bandwidth to the second bandwidth, if a number of physical resource blocks allocated to the transmitter for a transmission time interval is zero.

In example 68, if a non-zero number of physical resource blocks is allocated to the transmitter for each transmission time interval within a second time period, operating the transmit path in the first mode of operation in the method of any of examples 63 to 67 comprises: calculating for at least one transmission time interval a second coefficient indicative of a signal degradation of a radio frequency transmit signal generated by the transmit path due to changing the bandwidth from the first bandwidth to the second bandwidth, the radio frequency transmit signal being based on the baseband transmit signal; and changing the bandwidth from the first bandwidth to the second bandwidth, if the second coefficient is smaller than a second threshold value.

In example 69, calculating the second coefficient in the method of example 68 is based on at least one of a type of data of the baseband transmit signal related to the transmission time interval, a code rate of data of the baseband transmit signal related to the transmission time interval, and a desired quality of service for the transmission time interval.

In example 70, operating the transmit path in the first mode of operation in the method of any of examples 67 to 69 comprises adjusting a start time for changing the bandwidth from the first bandwidth to the second bandwidth.

In example 71, adjusting the start time for changing the bandwidth in the method of example 70 comprises adjusting the start time based on a time period required by the transmit path for changing the bandwidth from the first bandwidth to the second bandwidth, so that changing the bandwidth from the first bandwidth to the second bandwidth takes place while the transmit path processes data of the baseband transmit signal related to the transmission time interval.

In example 72, operating the transmit path in the first mode of operation in the method of any of examples 63 to 71 comprises changing the bandwidth from the second bandwidth to the first bandwidth, if one of the following conditions occurs: an amount of pending data for transmission exceeds a third threshold value; a predefined type of data is scheduled for transmission in a future transmission time interval; a number of physical resource blocks exceeding a fourth threshold value is allocated to the transmitter for a future transmission time interval.

In example 73, the method of example 72 further comprises adjusting a start time for changing the bandwidth from the second bandwidth to the first bandwidth.

In example 74, adjusting the start time for changing the bandwidth from the second bandwidth to the first bandwidth in the method of example 73 comprises adjusting the start time based on a time period required by the transmit path for changing the bandwidth from the second bandwidth to the first bandwidth, so that changing the bandwidth from the second bandwidth to the first bandwidth takes place during a next time period in which the transmit path does not process data of the baseband transmit signal.

In example 75, adjusting the start time for changing the bandwidth from the second bandwidth to the first bandwidth in the method of example 73 or example 74 comprises adjusting the start time based on a time period required by the transmit path for changing the bandwidth from the second bandwidth to the first bandwidth, so that changing the bandwidth from the second bandwidth to the first bandwidth takes place while the transmit path processes data of the baseband transmit signal that precedes data of the baseband transmit signal related to the future transmission time interval.

In example 76, if the first coefficient falls below the first threshold value, the method of any of examples 63 to 75 further comprises switching from operating the transmit path in the first mode of operation to operating the transmit path in a second mode of operation in which the bandwidth used for processing the baseband transmit signal is non-adjustably set to the first bandwidth.

In example 77, if the second bandwidth is used in the first mode of operation, switching from operating the transmit path in the first mode of operation to operating the transmit path in the second mode of operation in the method of example 76 comprises: changing the bandwidth from the second bandwidth to the first bandwidth; and adjusting a start time for changing the bandwidth from the second bandwidth to the first bandwidth.

In example 78, adjusting the start time for changing the bandwidth from the second bandwidth to the first bandwidth in the method of example 77 comprises adjusting the start time based on a time period required by the transmit path for changing the bandwidth from the second bandwidth to the first bandwidth, so that changing the bandwidth from the second bandwidth to the first bandwidth takes place while the transmit path: does not process data of the baseband transmit signal since zero physical resource blocks are allocated to the transmitter for a transmission time interval for which the first coefficient still exceeds the first threshold value; or processes data of the baseband transmit signal related to a last transmission time interval for which the first coefficient exceeds the first threshold value.

In example 79, the method of any of examples 63 to 78 further comprises increasing a power of a radio frequency transmit signal generated by the transmit path based on the baseband transmit signal for a signal section of the radio frequency transmit signal relating to data of the baseband transmit signal that is processed by the transmit path while the bandwidth is changed from the first bandwidth to the second bandwidth or vice versa.

In example 80, a bandwidth of a radio frequency transmit signal generated in the method of any of examples 63 to 79 by the transmit path based on the baseband transmit signal is the first bandwidth, wherein the method further comprises shifting a frequency of the baseband transmit signal processed by the transmit path using the second bandwidth to a frequency assigned to the first bandwidth.

In example 81, the method of any of examples 63 to 80 further comprises: controlling the transmit path to process the baseband transmit signal using a first sample rate for the first bandwidth; and controlling the transmit path to process the baseband transmit signal using a second sample rate for the second bandwidth.

In example 82, the method of any of examples 63 to 81 further comprises: controlling the transmit path to process the baseband transmit signal using an inverse Fourier transformation of a first size for the first bandwidth; and controlling the transmit path to process the baseband transmit signal using an inverse Fourier transformation of a second size for the second band-width.

Example 83 is an apparatus for controlling a bandwidth used for processing a baseband transmit signal by a transmit path of a transmitter, the apparatus comprising a processor circuit configured to: calculate a first coefficient indicative of a power saving due to processing the baseband transmit signal using a lower second bandwidth instead of a first bandwidth; and, if the first coefficient exceeds a first threshold value for a first time period, control the transmit path to operate in a first mode of operation in which the bandwidth is switchable from the first bandwidth to the second bandwidth.

In example 84, if the first coefficient does not exceed the first threshold value for the first time period, the processor circuit in the apparatus of example 83 is configured to control the transmit path to operate in a second mode of operation in which the bandwidth is non-adjustably set to the first bandwidth.

In example 85, the processor circuit in the apparatus of example 83 or example 84 is configured to: calculate the first coefficient for a first transmission time interval; and calculate the first coefficient for a second transmission time interval based on the first coefficient, the second transmission time interval immediately succeeding the first transmission time interval.

In example 86, the processor circuit in the apparatus of example 85 is configured to calculate the first coefficient for the second transmission time interval based on an expression which is mathematically correspondent to $P_{save}(TTI_2)= (1-v) \cdot P_{save}(TTI_1)+v \cdot P_{inst}$, with $P_{save}(TTI_2)$ denoting the first coefficient for the second transmission time interval, $P_{save}(TTI_1)$ denoting the first coefficient for the first transmission time interval, v denoting a constant, and $P_{inst}$ denoting a power saving potential for a current transmission time interval.

In example 87, the processor circuit in the apparatus of any of examples 83 to 86 is configured to control the transmit path to change the bandwidth from the first bandwidth to the second bandwidth in the first mode of operation, if a number of physical resource blocks allocated to the transmitter for a transmission time interval is zero.

In example 88, if the transmit path operates in the first mode of operation and if a non-zero number of physical resource blocks is allocated to the transmitter for each transmission time interval within a second time period, the processor circuit in the apparatus of any of examples 83 to 87 is configured to calculate for at least one transmission time interval a second coefficient indicative of a signal degradation of a radio frequency transmit signal generated by the transmit path due to changing the bandwidth from the first bandwidth to the second band-width, the radio frequency transmit signal being based on the baseband transmit signal; and control the transmit path to change the bandwidth from the first bandwidth to the second bandwidth, if the second coefficient is smaller than a second threshold value.

In example 89, the processor circuit in the apparatus of example 88 is configured to calculate the second coefficient based on at least one of a type of data of the baseband transmit signal related to the transmission time interval, a code rate of data of the baseband transmit signal related to the transmission time interval, and a desired quality of service for the transmission time interval.

In example 90, if the transmit path operates in the first mode of operation, the processor circuit in the apparatus of any of examples 87 to 89 is configured to adjust a start time for changing the bandwidth from the first bandwidth to the second bandwidth.

In example 91, processor circuit in the apparatus of example 90 is configured to adjust the start time based on a time period required by the transmit path for changing the bandwidth from the first bandwidth to the second bandwidth, so that changing the bandwidth from the first bandwidth to the second bandwidth takes place while the transmit path processes data of the baseband transmit signal related to the transmission time interval.

In example 92, the processor circuit in the apparatus of any of examples 83 to 91 is configured to control the transmit path to change the bandwidth from the second bandwidth to the first bandwidth in the first mode of operation, if one of the following conditions occurs: an amount of pending data for transmission exceeds a third threshold value; a predefined type of data is scheduled for transmission in a future transmission time interval; a number of physical resource blocks exceeding a fourth threshold value is allocated to the transmitter for a future transmission time interval.

In example 93, the processor circuit in the apparatus of example 92 is configured to adjust a start time for changing the bandwidth from the second bandwidth to the first bandwidth.

In example 94, the processor circuit in the apparatus of example 93 is configured to adjust the start time for changing the bandwidth from the second bandwidth to the first bandwidth based on a time period required by the transmit path for changing the bandwidth from the second bandwidth to the first bandwidth, so that changing the bandwidth from the second bandwidth to the first bandwidth takes place during a next time period in which the transmit path does not processes data of the baseband transmit signal.

In example 95, the processor circuit in the apparatus of example 93 or example 94 is configured to adjust the start time for changing the bandwidth from the second bandwidth to the first bandwidth based on a time period required by the transmit path for changing the bandwidth from the second bandwidth to the first bandwidth, so that changing the bandwidth from the second bandwidth to the first bandwidth takes place while the transmit path processes data of the baseband transmit signal that precedes data of the baseband transmit signal related to the future transmission time interval.

In example 96, if the first coefficient falls below the first threshold value, the processor circuit in the apparatus of any of examples 83 to 95 is configured to control the transmit path to switch from operating in the first mode of operation to operating in a second mode of operation in which the bandwidth used for processing the baseband transmit signal is non-adjustably set to the first bandwidth.

In example 97, if the second bandwidth is used in the first mode of operation, the processor circuit in the apparatus of example 96 is configured to control the transmit path to switch from operating in the first mode of operation to operating in the second mode of operation by: controlling the transmit path to change the bandwidth from the second bandwidth to the first bandwidth; and adjusting a start time for changing the bandwidth from the second bandwidth to the first bandwidth.

In example 98, the processor circuit in the apparatus of example 97 is configured to adjust the start time for changing the bandwidth from the second bandwidth to the first bandwidth based on a time period required by the transmit path for changing the bandwidth from the second bandwidth to the first bandwidth, so that changing the bandwidth from the second bandwidth to the first bandwidth takes place while the transmit path: does not process data of the baseband transmit signal since zero physical resource blocks are allocated to the transmitter for a transmission time interval for which the first coefficient still exceeds the first threshold value; or processes data of the baseband transmit signal related to a last transmission time interval for which the first coefficient exceeds the first threshold value.

In example 99, the processor circuit in the apparatus of any of examples 83 to 98 is configured to control the transmit path to increase a power of a radio frequency transmit signal generated by the transmit path based on the baseband transmit signal for a signal section of the radio frequency transmit signal relating to data of the baseband transmit signal that is processed by the transmit path while the bandwidth is changed from the first bandwidth to the second bandwidth or vice versa.

In example 100, a bandwidth of a radio frequency transmit signal generated by the transmit path in the apparatus of any of examples 83 to 99 based on the baseband transmit signal is the first bandwidth, wherein the processor circuit is configured to control the transmit path to shift a frequency of the baseband transmit signal processed by the transmit path using the second bandwidth to a frequency assigned to the first bandwidth.

In example 101, the processor circuit in the apparatus of any of examples 83 to 100 is configured to: control the transmit path to process the baseband transmit signal using a first sample rate for the first bandwidth; and control the transmit path to process the baseband transmit signal using a second sample rate for the second bandwidth.

In example 102, the processor circuit in the apparatus of any of examples 83 to 101 is configured to: control the transmit path to process the baseband transmit signal using an inverse Fourier transformation of a first size for the first bandwidth; and control the transmit path to process the baseband transmit signal using an inverse Fourier transformation of a second size for the second bandwidth.

Example 103 is a means for controlling a bandwidth used for processing a baseband transmit signal by a transmit path of a transmitter, the means comprising: a means for calculating a first coefficient indicative of a power saving due to processing the baseband transmit signal using a lower second bandwidth instead of a first bandwidth; and a means for controlling the transmit path to operate in a first mode of operation in which the bandwidth is switchable from the first bandwidth to the second bandwidth, if the first coefficient exceeds a first threshold value for a first time period.

In example 104, the means of example 103 further comprises a means for controlling the transmit path to operate in a second mode of operation in which the bandwidth is non-adjustably set to the first bandwidth, if the first coefficient does not exceed the first threshold value for the first time period.

Example 105 is a receiver for a wireless communication system, comprising: a mixer configured to generate an analog receive signal based on a radio frequency receive signal; a switch configured to couple one of a first signal processing chain and a second signal processing chain to the mixer, wherein a linearity of the second signal processing chain is lower than the linearity of the first signal processing chain and/or a noise level of the second signal processing chain is higher than the noise level of the first signal processing chain; and a control circuit configured to control the switch to couple one of the first signal processing chain and the second signal processing chain to the mixer based on an operation mode of the receiver.

In example 106, the first signal processing path and the second signal processing path in the receiver of example 105 are coupled to a processing circuit configured to supply a digital baseband signal to a baseband processor based on a digital signal supplied to the processing circuit by the first signal processing path or the second signal processing path.

In example 107, the first signal processing path and the second signal processing path in the receiver of example 105 are coupled to a baseband processor configured to process a digital baseband signal supplied to the baseband processor by the first signal processing path or the second signal processing path.

In example 108, the first signal processing chain in the receiver of any of examples 105 to 107 comprises a first analog-to-digital-converter, wherein the second signal processing chain comprises a second analog-to-digital-converter with a lower dynamic range than the first analog-to-digital-converter.

In example 109, the control circuit in the receiver of any of examples 105 to 108 is configured to adjust a bias for the mixer based on the operation mode of the receiver.

In example 110, receiver of any of examples 105 to 109 further comprises an amplifier coupled to an input of the mixer and configured to supply the radio frequency receive signal to the mixer, wherein the control circuit is configured to adjust a bias for the amplifier based on the operation mode of the receiver.

In example 111, the switch in the receiver of any of examples 105 to 110 is a multiplexer.

In example 112, a power consumption of the second signal processing chain in the receiver of any of examples 105 to 111 is lower than a power consumption of the first signal processing chain.

In example 113, the control circuit in the receiver of any of examples 105 to 112 is configured to control the switch to couple the second signal processing chain to the mixer if the operation mode of the receiver is one of an idle mode, or an operation mode in which the radio frequency receive signal comprises only downlink control data.

Example 114 is a means for receiving a radio frequency receive signal, comprising: a means for generating an analog receive signal based on the radio frequency receive signal; a means for coupling one of a first signal processing chain and a second signal processing chain to the means for generating the analog receive signal, wherein a linearity of the second signal processing chain is lower than the linearity of the first signal processing chain and/or a noise level of the second signal processing chain is higher than the noise level of the first signal processing chain; and a means for controlling the means for coupling to couple one of the first signal processing chain and the second signal processing chain to the mixer based on an operation mode of the means for receiving the radio frequency receive signal.

In example 115, a power consumption of the second signal processing chain in the means of example 114 is lower than a power consumption of the first signal processing chain.

Example 116 is a method for a receiver comprising a mixer configured to generate an analog receive signal based on a radio frequency receive signal, and comprising a switch configured to couple one of a first signal processing chain and a second signal processing chain to the mixer, wherein a linearity of the second signal processing chain is lower than the linearity of the first signal processing chain and/or a noise level of the second signal processing chain is higher than the noise level of the first signal processing chain, the method comprising controlling the switch to couple one of the first signal processing chain and the second signal processing chain to the mixer based on an operation mode of the receiver.

In example 117, controlling the switch in the method of example 116 comprises controlling the switch to couple the second signal processing chain to the mixer if the operation mode of the receiver is one of an idle mode, or an operation mode in which the radio frequency receive signal comprises only downlink control data.

In example 118, the method of example 116 or example 117 further comprises adjusting a bias for the mixer based on the operation mode of the receiver.

In example 119, the receiver in the method of any of examples 116 to 118 further comprises an amplifier coupled to an input of the mixer and configured to supply the radio frequency receive signal to the mixer, the method further comprising adjusting a bias for the amplifier based on the operation mode of the receiver.

In example 120, a power consumption of the second signal processing chain in the method of any of examples 116 to 119 is lower than a power consumption of the first signal processing chain.

Example 121 is a transmitter comprising a transmit path and an apparatus for controlling a bandwidth used for processing a baseband transmit signal according to any of examples 30 to 60, or an apparatus for controlling a bandwidth used for processing a baseband transmit signal according to any of examples 82 to 102.

Example 122 is a transceiver comprising a transmitter according example 121, or a receiver according to any of examples 105 to 113.

Example 123 is a mobile device comprising a receiver according to any of examples 105 to 113, a transmitter according to example 121, or a transceiver according to example 122.

In example 124, the mobile device of example 123 further comprises at least one antenna element coupled to the receiver, to the transmitter or to the transceiver.

Example 125 is a non-transitory computer readable medium having stored thereon a program having a program code for performing the method of any of examples 1 to 29, the method of any of examples 63 to 82 or the method of any of examples 116 to 120, when the program is executed on a computer or processor.

Example 126 is a computer program having a program code configured to perform the method of any of examples 1 to 29, the method of any of examples 63 to 82 or the method of any of examples 116 to 120, when the computer program is executed on a computer or processor.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as non-transitory computer readable media or digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A method for controlling a bandwidth used for processing a baseband transmit signal by a transmit path of a transmitter, the method comprising:
generating a first comparison result by comparing, to a threshold value, a first number of physical resource blocks allocated to the transmitter for a first transmission time interval;
generating a second comparison result by comparing, to the threshold value, a second number of physical resource blocks allocated to the transmitter for a subsequent second transmission time interval; and
adjusting the bandwidth based on the first and the second comparison results.

2. The method of claim 1, wherein the first transmission time interval immediately precedes the second transmission time interval.

3. The method of claim 1, wherein the first transmission time interval is the last transmission time interval preceding the second transmission time interval for which a non-zero number of physical resource blocks is allocated to the transmitter.

4. The method of claim 1, wherein adjusting the bandwidth comprises:
maintaining the bandwidth unchanged, if both of the first and the second comparison result respectively indicate that the number of allocated physical resource blocks is below the threshold value, if both of the first and the second comparison result respectively indicate that the number of allocated physical resource blocks is above the threshold value, or if the second number of physical resource blocks is zero.

5. The method of claim 1, wherein adjusting the bandwidth comprises:
changing the bandwidth from a first bandwidth to a second bandwidth, if one of the first and the second comparison results indicates that the number of allocated physical resource blocks is below the threshold value and the other one of the first and the second comparison results indicates that the number of allocated physical resource blocks is above the threshold value.

6. The method of claim 5, further comprising:
adjusting a start time for changing the bandwidth from the first bandwidth to the second bandwidth.

7. The method of claim 6, wherein adjusting the start time for changing the bandwidth is based on at least one of the first number of physical resource blocks and the second number of physical resource blocks.

8. The method of claim 7, wherein, if the first number of physical resource blocks is zero, adjusting the start time for changing the bandwidth comprises:
adjusting the start time based on a time period required by the transmit path for changing the bandwidth from the first bandwidth to the second bandwidth, so that changing the bandwidth from the first bandwidth to the second bandwidth is finished before the transmit path starts processing data of the baseband transmit signal related to the second transmission time interval.

9. The method of claim 7, wherein, if the first number of physical resource blocks is below the threshold value and the second number of physical resource blocks is above the threshold value, adjusting the start time for changing the bandwidth comprises:
adjusting the start time to a point in time at which the transmit path processes data of the baseband transmit signal related to the second transmission time interval.

10. The method of claim 6, wherein adjusting the start time for changing the bandwidth is based on at least one of a type of data of the baseband transmit signal related to the first transmission time interval and the type of data of the baseband transmit signal related to the second transmission time interval.

11. The method of claim 10, wherein, if the type of data of the baseband transmit signal related to the first transmission time interval or the second transmission time interval is a predefined type of data, adjusting the start time for changing the bandwidth comprises:
adjusting the start time based on a time period required by the transmit path for changing the bandwidth from the first bandwidth to the second bandwidth, so that changing the bandwidth from the first bandwidth to the second bandwidth takes place while the transmit path processes data of the baseband transmit signal related to the other of the first transmission time interval and the second transmission time interval.

12. The method of claim 11, wherein the predefined type of data is data for a Physical Uplink Control Channel, data for a Sounding Reference Signal, or data for re-transmission.

13. The method of claim 6, wherein adjusting the start time for changing the bandwidth comprises:
comparing a first coding robustness of data of the baseband transmit signal related to the first transmission time interval to a second coding robustness of data of the baseband transmit signal related to the second transmission time interval; and
adjusting the start time based on a time period required by the transmit path for changing the bandwidth from the first bandwidth to the second bandwidth, so that changing the bandwidth from the first bandwidth to the second bandwidth takes place while the transmit path processes data of the baseband transmit signal related to the one of the first transmission time interval and the second transmission time interval exhibiting higher coding robustness.

14. The method of claim 13, wherein the first coding robustness is based on at least one of a code rate, a transport block size, a modulation and coding scheme, a modulation, a code block size and a code type of the data of the baseband transmit signal related to the first transmission time interval.

15. The method of claim 6, wherein adjusting the start time for changing the bandwidth is based on information about a first modulation and coding scheme allocated to the first transmission time interval and a second modulation and coding scheme allocated to the second transmission time interval.

16. The method of claim 15, further comprising:
comparing a first code rate of data of the baseband transmit signal related to the first transmission time interval to a second code rate of data of the baseband transmit signal related to the second transmission time interval, wherein the first and the second code rate are based on the information about the first modulation and coding scheme allocated to the first transmission time interval and the second modulation and coding scheme allocated to the second transmission time interval; and
adjusting the start time based on a time period required by the transmit path for changing the bandwidth from the first bandwidth to the second bandwidth, so that changing the bandwidth from the first bandwidth to the second bandwidth takes place while the transmit path processes data of the baseband transmit signal related to the one of the first transmission time interval and the second transmission time interval exhibiting the lower code rate.

17. The method of claim 5, wherein the method further comprises:
calculating a signal degradation of a radio frequency transmit signal generated by the transmit path due to changing the bandwidth from the first bandwidth to the second bandwidth, the radio frequency transmit signal being based on the baseband transmit signal; and
if the power of the radio frequency transmit signal is smaller than a predefined signal power, increasing a power of the radio frequency transmit signal for a signal section of the radio frequency transmit signal relating to data of the baseband transmit signal that is processed by the transmit path while the bandwidth is changed from the first bandwidth to the second bandwidth.

18. The method of claim 17, wherein the predefined signal power is the maximum signal power for the radio frequency transmit signal supported by the transmit path, or the maximum signal power for the radio frequency transmit signal according to a communication standard.

19. The method of claim 5, wherein the second bandwidth is smaller than the first bandwidth, wherein a bandwidth of a radio frequency transmit signal generated by the transmit path based on the baseband transmit signal is the first bandwidth, and wherein the method further comprises:
controlling the transmit path to shift a frequency of the baseband transmit signal processed by the transmit path using the second bandwidth by a frequency shift to a frequency assigned to the first bandwidth.

20. The method of claim 5, wherein the method further comprises:
controlling the transmit path to process the baseband transmit signal using a first sample rate for the first bandwidth; and
controlling the transmit path to process the baseband transmit signal using a second sample rate for the second bandwidth.

21. The method of claim 5, wherein the method further comprises:
controlling the transmit path to process the baseband transmit signal using an inverse Fourier transformation of a first size for the first bandwidth; and
controlling the transmit path to process the baseband transmit signal using an inverse Fourier transformation of a second size for the second bandwidth.

22. The method of claim 1, wherein adjusting the bandwidth comprises:
maintaining the bandwidth unchanged, if a type of data of the baseband transmit signal related to the first transmission time interval and the type of data of the baseband transmit signal related to the second transmission time interval are both predefined types of data.

23. The method of claim 1, further comprising:
generating a third comparison result by comparing, to the threshold value, a third number of physical resource blocks allocated to the transmitter for a third transmission time interval succeeding the second transmission time interval, wherein adjusting the bandwidth is further based on the third comparison result.

24. The method of claim 23, wherein the third number of physical resource blocks is based on at least one of information received from a base station, information on respective numbers of physical resource blocks allocated to the transmitter for a plurality of transmission time intervals preceding the first transmission time interval, and information on types of data periodically occurring in the baseband transmit signal.

25. The method of claim 1, further comprising:
determining, based on information received from a base station, a signal error of a radio frequency transmit signal due to adjusting the bandwidth, the radio frequency signal being generated by the transmit path based on the baseband transmit signal; and
disabling adjusting the bandwidth if the signal error exceeds an error threshold.

* * * * *